US012650581B2

(12) United States Patent
Chang et al.

(10) Patent No.: US 12,650,581 B2
(45) Date of Patent: Jun. 9, 2026

(54) IMAGING OPTICAL SYSTEM, CAMERA MODULE AND ELECTRONIC DEVICE

(71) Applicant: LARGAN PRECISION CO., LTD., Taichung City (TW)

(72) Inventors: Pei-Chi Chang, Taichung City (TW); Chien-Pang Chang, Taichung City (TW); Yu-Chen Lai, Taichung City (TW); Ming-Ta Chou, Taichung City (TW); Wen-Yu Tsai, Taichung City (TW); Kuo-Chiang Chu, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 932 days.

(21) Appl. No.: 17/933,885

(22) Filed: Sep. 21, 2022

(65) Prior Publication Data

US 2023/0115906 A1 Apr. 13, 2023

Related U.S. Application Data

(60) Provisional application No. 63/253,150, filed on Oct. 7, 2021.

(30) Foreign Application Priority Data

Jun. 2, 2022 (TW) .................................. 111120653

(51) Int. Cl.
*G02B 13/00* (2006.01)
*G02B 7/02* (2021.01)
(Continued)

(52) U.S. Cl.
CPC ........... *G02B 13/008* (2013.01); *G02B 7/021* (2013.01); *G02B 7/1805* (2013.01);
(Continued)

(58) Field of Classification Search
CPC ........ G02B 13/008; G02B 5/003; G02B 5/22; G02B 5/223; G02B 7/1805; G02B 7/021;
(Continued)

(56) References Cited

U.S. PATENT DOCUMENTS 9,188,707 B2 11/2015 Lin et al.
9,268,072 B2 2/2016 Hasegawa et al.
(Continued)

FOREIGN PATENT DOCUMENTS

CN 108700688 A 10/2018
CN 111201455 A 5/2020
(Continued)

*Primary Examiner* — Ephrem Z Mebrahtu
(74) *Attorney, Agent, or Firm* — McClure, Qualey & Rodack, LLP

(57) ABSTRACT

An imaging optical system includes an infrared light absorbing element, an infrared light reducing film and a plate element in order along a paraxial path. The infrared light absorbing element is made of an infrared light absorbing plastic material, and the infrared light absorbing element is configured to refract a light. The infrared light reducing film is closer to an image surface of the imaging optical system than an incident surface of the infrared light absorbing element to the image surface of the imaging optical system. The plate element is disposed between the infrared light reducing film and the image surface, the plate element includes a translucent portion, a holder portion and a taper structure coating. The taper structure coating is disposed on at least one of an incident surface and an exit surface of the translucent portion.

18 Claims, 43 Drawing Sheets

(51) Int. Cl.
 *G02B 7/18* (2021.01)
 *H04N 23/50* (2023.01)
(52) U.S. Cl.
 CPC ....... *G02B 13/006* (2013.01); *G02B 13/0065* (2013.01); *H04N 23/50* (2023.01)
(58) Field of Classification Search
 CPC .............. G02B 13/006; G02B 13/0065; H04N 23/50
 See application file for complete search history.

(56) References Cited

U.S. PATENT DOCUMENTS

| | | | |
|---|---|---|---|
| 9,772,433 | B2 | 9/2017 | Chang et al. |
| 2001/0004300 | A1 | 6/2001 | Tanaka et al. |
| 2005/0233113 | A1 | 10/2005 | Kotani et al. |
| 2006/0134433 | A1 | 6/2006 | Maula et al. |
| 2006/0199040 | A1 | 9/2006 | Yamada et al. |
| 2008/0102259 | A1 | 5/2008 | Nikolov et al. |
| 2009/0022954 | A1 | 1/2009 | Kotani et al. |
| 2009/0081361 | A1 | 3/2009 | Yamada et al. |
| 2009/0219620 | A1 | 9/2009 | Yamada et al. |
| 2010/0119782 | A1 | 5/2010 | Ohgane |
| 2010/0220377 | A1 | 9/2010 | Yamada et al. |
| 2011/0019277 | A1 | 1/2011 | Sager et al. |
| 2011/0176216 | A1 | 7/2011 | Kawauchi et al. |
| 2012/0075688 | A1 | 3/2012 | Yamada et al. |
| 2012/0081792 | A1 | 4/2012 | Neuffer |
| 2012/0176681 | A1 | 7/2012 | Chang et al. |
| 2012/0212827 | A1 | 8/2012 | Kakegawa |
| 2012/0275027 | A1 | 11/2012 | Okuno |
| 2013/0016430 | A1 | 1/2013 | Ogawa et al. |
| 2013/0027779 | A1 | 1/2013 | Okuno et al. |
| 2013/0140675 | A1 | 6/2013 | Chen et al. |
| 2013/0201562 | A1 | 8/2013 | Kawagishi et al. |
| 2013/0228942 | A1 | 9/2013 | Ohgane |
| 2013/0258480 | A1 | 10/2013 | Makino et al. |
| 2013/0260096 | A1 | 10/2013 | Shiki et al. |
| 2013/0271842 | A1 | 10/2013 | Miyahara et al. |
| 2013/0273317 | A1 | 10/2013 | Nakayama |
| 2013/0329295 | A1 | 12/2013 | Okuno |
| 2014/0016189 | A1 | 1/2014 | Tamura et al. |
| 2014/0063610 | A1 | 3/2014 | Murata et al. |
| 2014/0117397 | A1 | 5/2014 | Saeki et al. |
| 2014/0254019 | A1 | 9/2014 | Murata et al. |
| 2014/0320968 | A1 | 10/2014 | Murata et al. |
| 2014/0320970 | A1 | 10/2014 | Kamiyam et al. |
| 2014/0329072 | A1 | 11/2014 | Hirasawa et al. |
| 2015/0153484 | A1 | 6/2015 | Neuffer |
| 2015/0160377 | A1 | 6/2015 | Kuroda et al. |
| 2015/0185366 | A1* | 7/2015 | Bone .................. G02B 27/0018 |
| | | | 359/580 |
| 2015/0369967 | A1 | 12/2015 | Okuno et al. |
| 2016/0054476 | A1 | 2/2016 | Choi et al. |
| 2016/0216409 | A1 | 7/2016 | Schulz et al. |
| 2016/0377767 | A1 | 12/2016 | Sonoda et al. |
| 2017/0160437 | A1 | 6/2017 | Nakayama |
| 2017/0212278 | A1 | 7/2017 | Abe |
| 2017/0227742 | A1* | 8/2017 | Hsieh ................... G02B 27/027 |
| 2017/0276839 | A1 | 9/2017 | Teramoto |
| 2018/0100957 | A1 | 4/2018 | Ye et al. |
| 2018/0194619 | A1 | 7/2018 | Greer et al. |
| 2018/0203162 | A1 | 7/2018 | Schulz et al. |
| 2019/0016593 | A1 | 1/2019 | Greer et al. |
| 2019/0196064 | A1 | 6/2019 | Nakamura et al. |
| 2020/0240011 | A1 | 7/2020 | Kauppinen et al. |

FOREIGN PATENT DOCUMENTS

| | | | |
|---|---|---|---|
| DE | 102017219781 A1 | 5/2018 | |
| JP | 2001017907 A | 1/2001 | |
| TW | M591177 U | 2/2020 | |
| TW | I687717 B | 3/2020 | |
| TW | 202113424 A | 4/2021 | |
| TW | 202118835 A | 5/2021 | |
| WO | 2017146210 A1 | 8/2017 | |
| WO | WO-2018155634 A1 * | 8/2018 | ............. G02B 1/115 |

* cited by examiner

210

211

212

30

321

351

312

353

40

8E

IMAGING OPTICAL SYSTEM, CAMERA MODULE AND ELECTRONIC DEVICE

RELATED APPLICATIONS

This application claims priority to U.S. Provisional Application Ser. No. 63/253,150, filed Oct. 7, 2021 and Taiwan Application Serial Number 111120653, filed Jun. 2, 2022, which are herein incorporated by reference.

BACKGROUND

Technical Field

The present disclosure relates to an imaging optical system and a camera module. More particularly, the present disclosure relates to an imaging optical system and a camera module applicable to portable electronic devices.

Description of Related Art

In recent years, portable electronic devices have developed rapidly. For example, intelligent electronic devices and tablets have been filled in the lives of modern people, and camera modules and imaging optical systems thereof mounted on portable electronic devices have also prospered. However, as technology advances, the quality requirements of the imaging optical system and the camera module are becoming higher and higher.

In particular, the filter of the camera module of the prior art is disposed between the imaging lens assembly and the image sensor, wherein the filter can be configured to filter the infrared light and the ultraviolet light, but the present disclosure is not limited thereto. The filter can be usually configured to protect the image sensor to avoid the fine dust attaching on the photosensitive surface of the image sensor. However, the ghost image is easily formed under the condition of the filter irradiated via the glare, and the dimension of the filter is limited because of the assembling requirement and the filtering requirement of the light, so that the back focus of the imaging optical system is influenced, and hence the imaging optical system with the high quality and the compact size is hardly designed. Therefore, an imaging optical system, which can promote the freedom of design, needs to be developed.

SUMMARY

According to one aspect of the present disclosure, an imaging optical system includes an infrared light absorbing element, an infrared light reducing film and a plate element in order along a paraxial path. The infrared light absorbing element is made of an infrared light absorbing plastic material, and the infrared light absorbing element is configured to refract a light. The infrared light reducing film is closer to an image surface of the imaging optical system than an incident surface of the infrared light absorbing element to the image surface of the imaging optical system. The plate element is disposed between the infrared light reducing film and the image surface, the plate element is integrally formed, the plate element includes a translucent portion and a holder portion, wherein the translucent portion and the image surface are correspondingly disposed, and the holder portion surrounds the translucent portion, so as to keep the translucent portion on a specific position on the paraxial path. The plate element further includes a taper structure coating disposed on at least one of an incident surface and an exit surface of the translucent portion, the taper structure coating is gradually sparse towards an air direction, and a plurality of pores are formed on at least one of the incident surface and the exit surface of the translucent portion. The taper structure coating is mainly made of a ceramic material, and an average reflectivity of a light at a wavelength range between 420 nm and 680 nm is less than 0.98% via the taper structure coating. When an average crystal height of the taper structure coating is GH, a focal length of the imaging optical system is f, a distance between the infrared light absorbing element and the infrared light reducing film along the paraxial path is L1, and a distance between the infrared light reducing film and the taper structure coating along the paraxial path is L2, the following conditions are satisfied: 60 $nm \leq GH \leq 400$ nm; $0.0 \leq L1/f \leq 0.21$; and $0.21 \leq L2/f$.

According to one aspect of the present disclosure, a camera module includes the imaging optical system of the aforementioned aspect and an image sensor, wherein the image sensor is disposed on the image surface of the imaging optical system.

According to one aspect of the present disclosure, an electronic device includes at least one of the camera module of the aforementioned aspect.

According to one aspect of the present disclosure, an imaging optical system includes an infrared light absorbing element, an infrared light reducing film, a plate element and an anti-reflecting multilayer film in order along a paraxial path. The infrared light absorbing element is made of an infrared light absorbing plastic material, and the infrared light absorbing element is configured to refract a light. The infrared light reducing film is closer to an image surface of the imaging optical system than an incident surface of the infrared light absorbing element to the image surface of the imaging optical system. The plate element is disposed between the infrared light reducing film and the image surface, the plate element is integrally formed, the plate element includes a translucent portion and a holder portion, wherein the translucent portion and the image surface are correspondingly disposed, and the holder portion surrounds the translucent portion, so as to keep the translucent portion on a specific position on the paraxial path. The anti-reflecting multilayer film is disposed on at least one of an incident surface and an exit surface of the translucent portion, wherein the anti-reflecting multilayer film includes a plurality of high refractive index layers and a plurality of low refractive index layers, and the high refractive index layers and the low refractive index layers are alternately stacked. An average reflectivity of a light at a wavelength range between 420 nm and 680 nm is less than 0.98% via the anti-reflecting multilayer film. When a focal length of the imaging optical system is f, a distance between the infrared light absorbing element and the infrared light reducing film along the paraxial path is L1, and a distance between the infrared light reducing film and the anti-reflecting multilayer film along the paraxial path is L2', the following conditions are satisfied: $0.0 \leq L1/f \leq 0.21$; and $0.21 \leq L2'/f$.

According to one aspect of the present disclosure, a camera module includes the imaging optical system of the aforementioned aspect and an image sensor, wherein the image sensor is disposed on the image surface of the imaging optical system.

According to one aspect of the present disclosure, an electronic device includes at least one of the camera module of the aforementioned aspect.

According to one aspect of the present disclosure, an imaging optical system includes an infrared light absorbing element, an infrared light reducing film, a plate element and a low reflecting film in order along a paraxial path. The infrared light absorbing element is made of an infrared light absorbing plastic material, and the infrared light absorbing element is configured to refract a light. The infrared light reducing film is closer to an image surface of the imaging optical system than an incident surface of the infrared light absorbing element to the image surface of the imaging optical system. The plate element includes a translucent portion and a holder portion, wherein the translucent portion is disposed between the infrared light reducing film and the image surface, the translucent portion and the image surface are correspondingly disposed, the holder portion surrounds the paraxial path, and the holder portion and the translucent portion are integrated formed, so as to keep the translucent portion on a specific position on the paraxial path. The low reflecting film is disposed on at least one of an incident surface and an exit surface of the translucent portion and simultaneously coated on at least one portion of the holder portion. An average reflectivity of a light at a wavelength range between 420 nm and 680 nm is less than 0.98% via the low reflecting film. When a focal length of the imaging optical system is f, a distance between the infrared light absorbing element and the infrared light reducing film along the paraxial path is L1, and a distance between the infrared light reducing film and the low reflecting film along the paraxial path is L2", the following conditions are satisfied: $0.0 \le L1/f \le 0.21$; and $0.21 \le L2''/f$.

According to one aspect of the present disclosure, a camera module includes the imaging optical system of the aforementioned aspect and an image sensor, wherein the image sensor is disposed on the image surface of the imaging optical system.

According to one aspect of the present disclosure, an electronic device includes at least one of the camera module of the aforementioned aspect.

According to one aspect of the present disclosure, an imaging optical system includes an infrared light absorbing element, an infrared light reducing film, a prism element and a low reflecting film in order along a paraxial path. The infrared light absorbing element is made of an infrared light absorbing plastic material, and the infrared light absorbing element is configured to refract a light. The infrared light reducing film is closer to an image surface of the imaging optical system than an incident surface of the infrared light absorbing element to the image surface of the imaging optical system. The prism element includes a prism portion and a holder portion. The prism portion includes an incident surface, at least one reflecting surface and an exit surface in order along the paraxial path, and the exit surface of the prism portion and the image surface are correspondingly disposed. The holder portion carries the prism portion, so as to keep the prism portion on a specific position on the paraxial path. The low reflecting film is disposed on at least one of the incident surface and the exit surface of the prism portion. An average reflectivity of a light at a wavelength range between 420 nm and 680 nm is less than 0.98% via the low reflecting film. When a focal length of the imaging optical system is f, a distance between the infrared light absorbing element and the infrared light reducing film along the paraxial path is L1, and a distance between the infrared light reducing film and the low reflecting film along the paraxial path is L2", the following conditions are satisfied: $0.0 \le L1/f \le 0.21$; and $0.21 \le L2''/f$.

According to one aspect of the present disclosure, a camera module includes the imaging optical system of the aforementioned aspect and an image sensor, wherein the image sensor is disposed on the image surface of the imaging optical system.

According to one aspect of the present disclosure, an electronic device includes at least one of the camera module of the aforementioned aspect.

According to one aspect of the present disclosure, a camera module includes an imaging optical system and an image sensor. The imaging optical system includes an imaging lens assembly, a plate element and a low reflecting film. The imaging lens assembly includes a plurality of lens elements, an infrared light reducing film and a lens carrier. The lens elements are arranged in order along a paraxial path, wherein the lens elements include an infrared light absorbing lens element, and the infrared light absorbing lens element is made of an infrared light absorbing plastic material. The infrared light reducing film is disposed on an exit surface of the infrared light absorbing lens element. The lens carrier accommodates the lens elements and the infrared light reducing film. The plate element includes a translucent portion and a holder portion, wherein the holder portion surrounds the paraxial path. The low reflecting film is disposed on at least one of an incident surface and an exit surface of the translucent portion. The image sensor is disposed on an image side of the lens carrier, the plate element is disposed between the imaging lens assembly and the image sensor, the translucent portion and the image sensor are correspondingly disposed, and the paraxial path passes the imaging lens assembly and then travels to the image sensor. A specific distance between the translucent portion of the plate element and the image sensor is kept via the holder portion. An average reflectivity of a light at a wavelength range between 420 nm and 680 nm is less than 0.98% via the low reflecting film. When a focal length of the imaging optical system is f, a distance between the infrared light reducing film and the low reflecting film along the paraxial path is L2", and a thickness of the translucent portion is THI, the following conditions are satisfied: $0.21 \le L2''/f$; and $0.005 \le THI/f \le 0.35$.

DETAILED DESCRIPTION

Figure 1A:
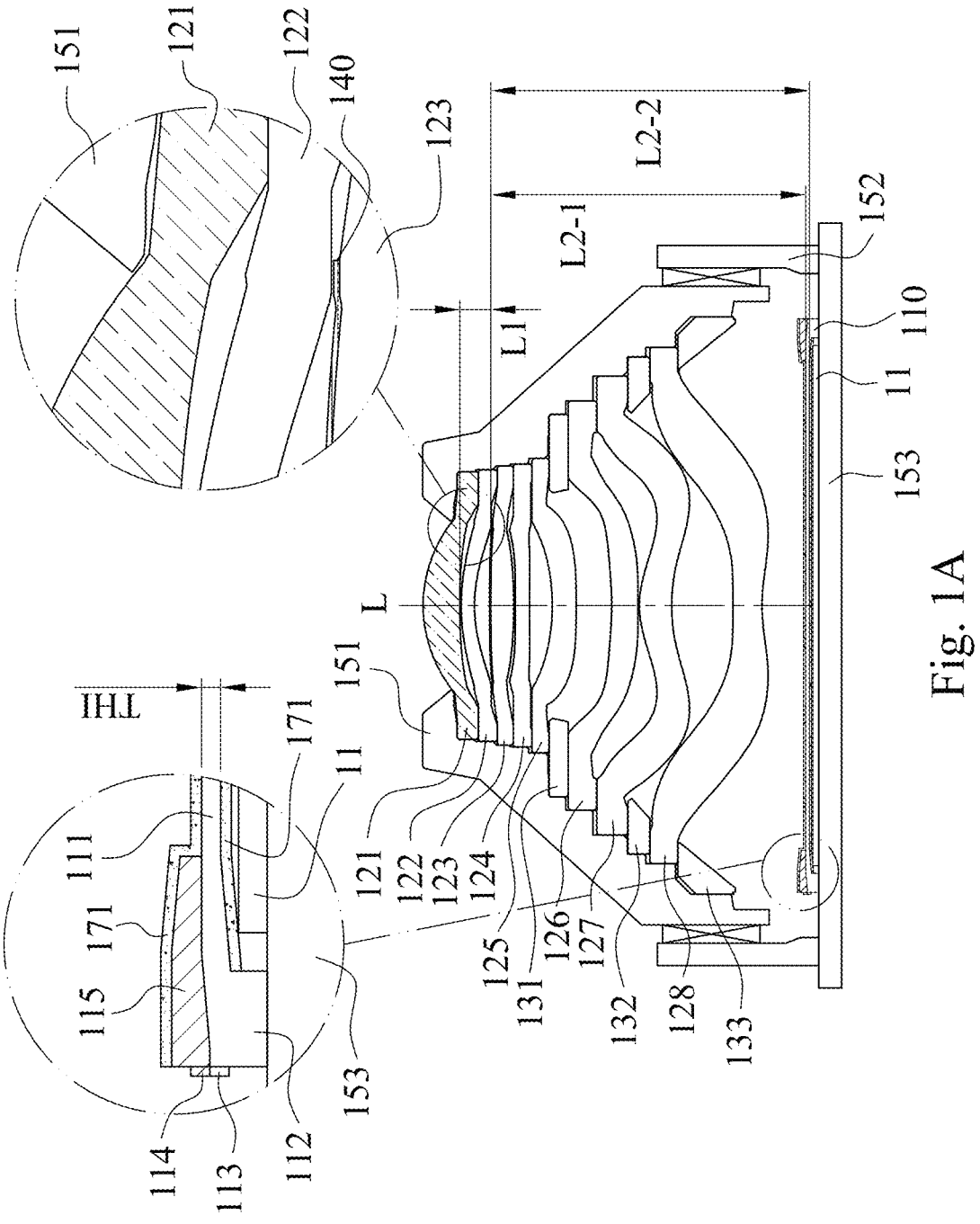
FIG. 1A is a cross-sectional view of a camera module according to the 1st embodiment of the present disclosure.

The present disclosure provides an imaging optical system, which includes an infrared light absorbing element and an infrared light reducing film in order along a paraxial path. The infrared light absorbing element is made of an infrared light absorbing plastic material, and the infrared light absorbing element is configured to refract a light. The infrared light reducing film is closer to an image surface of the imaging optical system than an incident surface of the infrared light absorbing element to the image surface of the imaging optical system. When a focal length of the imaging optical system is f, and a distance between the infrared light absorbing element and the infrared light reducing film along the paraxial path is L1, the following condition is satisfied: $0.0 \leq L1/f \leq 0.21$.

When L1/f satisfies the aforementioned condition, the cooperation between the infrared light absorbing element and the infrared light reducing film can be promoted, so as to ensure the effect of filtering the infrared light of the imaging optical system.

It should be mentioned that the infrared light absorbing plastic material can be made of the plastic material doped with the infrared light absorbing material, so that the infrared light absorbing element is configured to absorb the infrared light. Further, the ultraviolet light absorbing material can be further doped in the infrared light absorbing plastic material, so that the infrared light absorbing material is further configured to absorb the ultraviolet light.

The infrared light reducing film can be a multilayer film, wherein the infrared light reducing film includes alternating layers with a high refractive index and a low refractive index, and the destructive interference with the infrared light can be achieved.

The imaging optical system can further include a plate element, wherein the imaging optical system includes the infrared light absorbing element, the infrared light reducing film and the plate element in order along the paraxial path. The plate element is disposed between the infrared light reducing film and the image surface, the plate element is integrally formed, and the plate element includes a translucent portion and a holder portion. Furthermore, the translucent portion and the image surface are correspondingly disposed, and the holder portion surrounds the translucent portion, so as to keep the translucent portion on a specific position on the paraxial path. Or, the translucent portion is disposed between the infrared light reducing film and the image surface, the translucent portion and the image surface are correspondingly disposed, the holder portion surrounds the paraxial path, and the holder portion and the translucent portion are integrated formed, so as to keep the translucent portion on the specific position on the paraxial path. In particular, an imaging light passes a plurality of optical elements as the infrared light absorbing element and the plate element from the object side along the paraxial path and travels to the image surface. In other words, the imaging light passes the infrared light absorbing element, and then the imaging light passes the infrared light reducing film. Therefore, the large-angle incident light in the infrared light reducing film to form the color cast can be avoided.

The holder portion of the plate element can be made of an opaque plastic material. Therefore, the incident of the non-imaging light to the image sensor via the holder portion can be avoided. Moreover, the plate element can be integrally formed by the insert molding process, wherein the translucent portion can be made of the glass material or the polymer material, the holder portion can be made of the opaque polymer material or the ceramic material, and the present disclosure is not limited thereto. Or, the plate element can be integrally formed by the two-shot molding process, wherein the translucent portion can be made of the transparent polymer material, the holder portion can be made of the opaque polymer material, the opaque polymer material and the transparent polymer material can be further the same, and the colorant is added in the transparent polymer material to make the opaque polymer material opaque, so as to promote the combination. Or, the holder portion and the translucent portion of the plate element can be integrally formed by the cementing process, the hot riveting process and the fitting process, but the present disclosure is not limited thereto.

The plate element can further include a light blocking portion, and the light blocking portion and the translucent portion are adjacent disposed. Therefore, the incident of the non-imaging light to the image sensor can be avoided.

When the focal length of the imaging optical system is f, and a thickness of the translucent portion is THI, the following condition can be satisfied: $0.005 \leq THI/f \leq 0.35$. Therefore, the freedom of design of the imaging optical system can be promoted, so as to enhance the imaging quality or reduce the volume of the camera module.

The imaging optical system can further include a prism element, wherein the imaging optical system includes the infrared light absorbing element, the infrared light reducing film and the prism element in order along the paraxial path. The prism element includes a prism portion and a holder portion, wherein the prism portion includes an incident surface, at least one reflecting surface and an exit surface in order along the paraxial path, the exit surface of the prism portion and the image surface are correspondingly disposed, and the holder portion carries the prism portion, so as to keep the prism portion on the specific position on the paraxial path.

The holder portion of the prism element can be made of an opaque plastic material.

The imaging optical system can further include a low reflecting film, wherein the imaging optical system includes the infrared light absorbing element, the infrared light reducing film, the plate element and the low reflecting film in order along the paraxial path; or, the imaging optical system includes the infrared light absorbing element, the infrared light reducing film, the prism element and the low reflecting film in order along the paraxial path. The low reflecting film is disposed on at least one of an incident surface and an exit surface of the translucent portion and simultaneously coated on at least one portion of the holder portion, wherein the low reflecting film can be simultaneously disposed on at least one portion of a surface of the holder portion; or, the low reflecting film is disposed on at least one of the incident surface and the exit surface of the prism portion. An average reflectivity of a light at a wavelength range between 420 nm and 680 nm is less than 0.98% via the low reflecting film.

When the focal length of the imaging optical system is f, and a distance between the infrared light reducing film and the low reflecting film along the paraxial path is L2", the following condition is satisfied: $0.21 \leq L2''/f$. When L2"/f satisfies the aforementioned condition, the ghost image, which is between the infrared light reducing film and the low reflecting film, formed by the large-angle incident light can be further avoided, so as to keep the imaging quality. Further, the condition that the infrared light reducing film is not disposed on the translucent portion can be obtained. Therefore, the ghost image because of the reflection between the infrared light reducing film and the surface of the image sensor can be avoided.

An average reflectivity of a light at a wavelength range between 400 nm and 900 nm can be less than 0.98% via the low reflecting film. Moreover, the average reflectivity of the light at the wavelength range between 400 nm and 900 nm can be less than 0.5% via the low reflecting film.

The plate element can further include a taper structure coating. In particular, the low reflecting film can include the taper structure coating, wherein the taper structure coating is disposed on at least one of the incident surface and the exit surface of the translucent portion, the taper structure coating is gradually sparse towards an air direction, and a plurality of pores are formed on at least one of the incident surface and the exit surface of the translucent portion. Moreover, the taper structure coating can be simultaneously disposed on the incident surface and the exit surface of the translucent portion, and the taper structure coating can be simultaneously disposed on at least one portion of a surface of the holder portion, so as to reduce the risk of the glare formed by the holder portion. The taper structure coating can be mainly made of a ceramic material, and the average reflectivity of the light at the wavelength range between 420 nm and 680 nm is less than 0.98% via the taper structure coating, wherein an average crystal height of the taper structure coating is GH, and the following condition can be satisfied: $60 \ nm \leq GH \leq 400 \ nm$. Further, the following condition can be satisfied: $120 \ nm \leq GH \leq 300 \ nm$. In particular, the lowest reflectivity can be less than 0.5% by the taper structure coating.

Moreover, the taper structure coating can be the multilayer film, and the ceramic material can be the oxide, the nitride and the carbide of aluminum, silicon, titanium, zirconium, tantalum, niobium, chromium and other elements, but the present disclosure is not limited thereto. Further, the ceramic material can be aluminum oxide, silicon oxide, titanium oxide, the taper structure coating can be formed by the process of chemical corrosion, the process of generation, the process of electrochemical corrosion, the process of laser, the process of plasma, the process of semiconductor, which can include exposure, development, etching, but the present disclosure is not limited thereto.

When the focal length of the imaging optical system is f, and a distance between the infrared light reducing film and the taper structure coating along the paraxial path is L2, the following condition is satisfied: $0.21 \leq L2/f$. When L2/f satisfies the aforementioned condition, the ghost image, which is between the infrared light reducing film and the taper structure coating, formed by the large-angle incident light can be further avoided, so as to ensure the imaging quality. Further, the condition that the infrared light reducing film is not disposed on the translucent portion can be obtained. Therefore, the ghost image because of the reflection between the infrared light reducing film and the surface of the image sensor can be avoided.

The average reflectivity of the light at the wavelength range between 400 nm and 900 nm can be less than 0.98% via the taper structure coating. Further, the average reflectivity of the light at the wavelength range between 400 nm and 900 nm can be less than 0.5% via the taper structure coating.

The imaging optical system can further include an intermediary layer. In particular, the low reflecting film can include the intermediary layer, wherein the intermediary layer is connected to the taper structure coating and the plate element, the intermediary layer is directly contacted with the plate element, and the intermediary layer is contacted with an air via at least one of the pores. The adhesion of the taper structure coating can be promoted via the intermediary layer, so as to enhance the lifetime of the taper structure coating, wherein the intermediary layer can be the multilayer film to further increase the adhesion of the taper structure coating. Moreover, a substrate can be disposed on a surface of the plate element.

The imaging optical system can further include an anti-reflecting multilayer film. In particular, the low reflecting film can include the anti-reflecting multilayer film, wherein the imaging optical system includes the infrared light absorbing element, the infrared light reducing film, the plate element and the anti-reflecting multilayer film in order along the paraxial path. The anti-reflecting multilayer film is disposed on at least one of the incident surface and the exit surface of the translucent portion, wherein the anti-reflecting multilayer film includes a plurality of high refractive index layers and a plurality of low refractive index layers, and the high refractive index layers and the low refractive index layers are alternately stacked. Therefore, the reflecting light can be eliminated by the principle of interference. Moreover, the anti-reflecting multilayer film can be simultaneously coated on at least one portion of the holder portion, and the average reflectivity of the light at the wavelength range between 420 nm and 680 nm is less than 0.98% via the anti-reflecting multilayer film.

The anti-reflecting multilayer film can be simultaneously disposed on the incident surface and the exit surface of the translucent portion, and the anti-reflecting multilayer film can be simultaneously disposed on at least one portion of a surface of the holder portion.

When the focal length of the imaging optical system is f, and a distance between the infrared light reducing film and the anti-reflecting multilayer film along the paraxial path is L2', the following condition is satisfied: $0.21 \leq L2'/f$. When L2'/f satisfies the aforementioned condition, the ghost image, which is between the infrared light reducing film and the anti-reflecting multilayer film, formed by the large-angle incident light can be further avoided, so as to keep the imaging quality. Further, the condition that the infrared light reducing film is not disposed on the translucent portion can be obtained. Therefore, the ghost image because of the reflection between the infrared light reducing film and the surface of the image sensor can be avoided.

The average reflectivity of the light at the wavelength range between 400 nm and 900 nm can be less than 0.98% via the anti-reflecting multilayer film.

The low reflecting film can be simultaneously disposed on the incident surface and the exit surface of the translucent portion, wherein the low reflecting film disposed on the incident surface of the translucent portion can include one of the anti-reflecting multilayer film and the taper structure coating, and the low reflecting film disposed on the exit surface of the translucent portion can include one of the anti-reflecting multilayer film and the taper structure coating.

The low reflecting film can be simultaneously disposed on the incident surface and the exit surface of the prism portion, wherein the low reflecting film disposed on the incident surface of the prism portion includes one of the anti-reflecting multilayer film and the taper structure coating, and the low reflecting film disposed on the exit surface of the prism portion includes one of the anti-reflecting multilayer film and the taper structure coating. Further, the taper structure coating can be disposed on at least one of the incident surface and the exit surface of the prism portion, and the pores are formed on at least one of the incident surface and the exit surface of the prism portion.

The infrared light reducing film can be disposed on an exit surface of the infrared light absorbing element. In particular, when L1/f=0, the number of the optical elements can be further reduced, so as to reduce the volume.

The imaging optical system can further include a film disposing element, wherein the film disposing element is disposed on an image side of the infrared light absorbing element, the infrared light reducing film is disposed on one of an incident surface and an exit surface of the film disposing element, and the film disposing element is immediately adjacent to the infrared light absorbing element. Therefore, the absorbing efficiency of the film disposing element to the infrared light can be enhanced via the infrared light absorbing element.

The imaging optical system can further include a glue, wherein the infrared light absorbing element and the film disposing element are cemented via the glue. Therefore, the absorbing efficiency of the film disposing element to the infrared light can be enhanced via the infrared light absorbing element, so as to further enhance the optical quality of the imaging optical system.

Each of the aforementioned features of the imaging optical system can be utilized in various combinations for achieving the corresponding effects.

The present disclosure provides a camera module, which includes an imaging optical system and an image sensor. The imaging optical system includes an imaging lens assembly, a plate element and a low reflecting film. The imaging lens assembly includes a plurality of lens elements, an infrared light reducing film and a lens carrier. The lens elements are arranged in order along a paraxial path, wherein the lens elements include an infrared light absorbing lens element, and the infrared light absorbing lens element is made of an infrared light absorbing plastic material. The infrared light reducing film is disposed on an exit surface of the infrared light absorbing lens element. The lens carrier accommodates the lens elements and the infrared light reducing film. The plate element is disposed between the imaging lens assembly and the image sensor, and the plate element includes a translucent portion and a holder portion, wherein the translucent portion and the image sensor are correspondingly disposed, the holder portion surrounds the paraxial path, so that a specific distance between the translucent portion of the plate element and the image sensor is kept via the holder portion. The low reflecting film is disposed on at least one of an incident surface and an exit surface of the translucent portion. The image sensor is disposed on an image side of the lens carrier, and the paraxial path passes the imaging lens assembly and then travels to the image sensor. The average reflectivity of the light at the wavelength range between 420 nm and 680 nm is less than 0.98% via the low reflecting film. When a focal length of the imaging optical system is f, a distance between the infrared light reducing film and the low reflecting film along the paraxial path is L2", and a thickness of the translucent portion is THI, the following conditions are satisfied: $0.21 \leq L2''/f$, and $0.005 \leq THI/f \leq 0.35$.

When L2"/f satisfies the aforementioned condition, the ghost image, which is between the infrared light reducing film and the low reflecting film, formed by the large-angle incident light can be further avoided, so as to ensure the imaging quality. Further, the condition that the infrared light reducing film is not disposed on the translucent portion can be obtained. Therefore, the ghost image because of the reflection between the infrared light reducing film and the surface of the image sensor can be avoided.

When THI/f satisfies the aforementioned condition, the freedom of design of the imaging lens assembly can be promoted, so as to enhance the imaging quality or reduce the volume of the camera module.

The present disclosure provides an electronic device, which includes the aforementioned camera module.

According to the aforementioned embodiment, specific embodiments and examples are provided, and illustrated via figures.

1st Embodiment

Figure 1B:
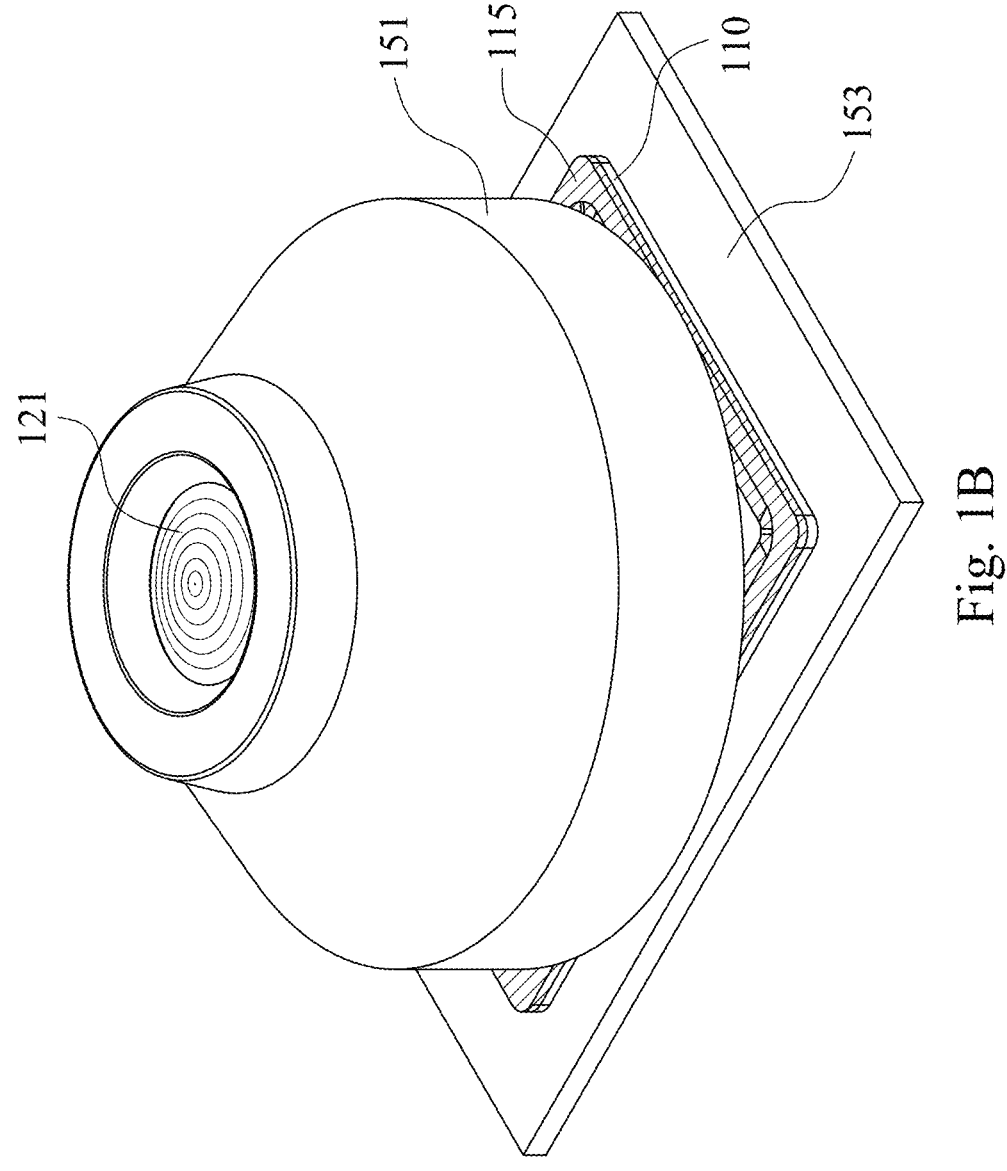
FIG. 1B is a partial three dimensional view of the camera module according to the 1st embodiment in FIG. 1A.

FIG. 1A is a cross-sectional view of a camera module 10 according to the 1st embodiment of the present disclosure. FIG. 1B is a partial three dimensional view of the camera module 10 according to the 1st embodiment in FIG. 1A. FIG. 10 is a partial exploded view of the camera module 10 according to the 1st embodiment in FIG. 1A. In FIGS. 1A to 10, the camera module 10 includes an imaging optical system (its reference numeral is omitted) and an image sensor 11, wherein the imaging optical system includes an imaging lens assembly (its reference numeral is omitted) and a plate element 110.

Moreover, the imaging optical system includes an infrared light absorbing element, an infrared light reducing film 140 and the plate element 110 in order along a paraxial path L, wherein the infrared light reducing film 140 is disposed on an exit surface of the infrared light absorbing element. The infrared light absorbing element is made of an infrared light absorbing plastic material, the infrared light absorbing element is configured to refract a light, and the infrared light absorbing element can be an infrared light absorbing lens element according to the 1st embodiment. The infrared light reducing film 140 is closer to an image surface (its reference numeral is omitted) of the imaging optical system than an incident surface of the infrared light absorbing element to the image surface of the imaging optical system. It should be mentioned that the infrared light absorbing plastic material can be made of the plastic material doped with the infrared light absorbing material, so that the infrared light absorbing element is configured to absorb the infrared light. Further, the ultraviolet light absorbing material can be further doped in the infrared light absorbing plastic material, so that the infrared light absorbing material is further configured to absorb the ultraviolet light.

Furthermore, an imaging light (not shown) passes a plurality of optical elements as the infrared light absorbing element and the plate element 110 from the object side along the paraxial path L and then travels to the image surface. In other words, the imaging light passes the infrared light absorbing element, and then the imaging light passes the infrared light reducing film 140. Therefore, the large-angle incident light in the infrared light reducing film 140 to form the color cast can be avoided. Further, the paraxial path L passes the imaging lens assembly and then travels to the image sensor 11.

The infrared light reducing film 140 can be a multilayer film, wherein the infrared light reducing film 140 includes alternating layers with a high refractive index and a low refractive index, and the destructive interference with the infrared light can be achieved.

The imaging lens assembly includes a plurality of lens elements, the infrared light reducing film 140 and a lens carrier 151. In detail, the imaging lens assembly includes a first lens element 121, a second lens element 122, the infrared light reducing film 140, a third lens element 123, a fourth lens element 124, a fifth lens element 125, a spacer 131, a sixth lens element 126, a seventh lens element 127, a spacer 132, an eighth lens element 128 and a retainer 133 in order along the paraxial path L, wherein the lens carrier 151 accommodates the first lens element 121, the second lens element 122, the third lens element 123, the fourth lens element 124, the fifth lens element 125, the sixth lens element 126, the seventh lens element 127, the eighth lens element 128, the spacers 131, 132, the retainer 133 and the infrared light reducing film 140, and the image sensor 11 is disposed on an image side of the lens carrier 151. It should be mentioned that the optical features such as numbers, structures, surface shapes and so on of the lens elements and the optical elements can be disposed according to different imaging demand, and the optical features are not limited thereto.

According to the 1st embodiment, the first lens element 121 is the infrared light absorbing element. It should be mentioned that the thickness of the infrared light reducing film 140 is not the actual thickness to clearly indicate the coating range of the infrared light reducing film 140.

The imaging optical system further includes a film disposing element, wherein the film disposing element is disposed on an image side of the infrared light absorbing element, and the infrared light reducing film 140 is disposed on one of an incident surface and an exit surface of the film disposing element. According to the 1st embodiment, the infrared light reducing film 140 is disposed on the incident surface of the third lens element 123, and the third lens element 123 is the film disposing element.

The plate element 110 is disposed between the infrared light reducing film 140 and the image surface, the plate element 110 is integrally formed, and the plate element 110 is disposed between the eighth lens element 128 and the image sensor 11, wherein the plate element 110 includes a translucent portion 111, a holder portion 112, a transparent plastic trace gate 113, an opaque plastic trace gate 114 and a light blocking portion 115. The translucent portion 111 and the image surface are correspondingly disposed, and the holder portion 112 surrounds the translucent portion 111, so as to keep the translucent portion 111 on a specific position on the paraxial path L. The holder portion 112 surrounds the paraxial path L, so that a specific distance between the translucent portion 111 of the plate element 110 and the image sensor 11 is kept via the holder portion 112. The light blocking portion 115 and the translucent portion 111 are adjacent disposed. Therefore, the incident of the non-imaging light to the image sensor 11 can be avoided. The holder portion 112 and the translucent portion 111 can be made of the transparent plastic material, the light blocking portion 115 can be made of the black plastic material, the plate element 110 can be integrally formed by the two-shot molding process, but the present disclosure is not limited thereto. In particular, the transparent plastic trace gate 113 and the holder portion 112 are correspondingly disposed, and the opaque plastic trace gate 114 and the light blocking portion 115 are correspondingly disposed.

Figure 1C:
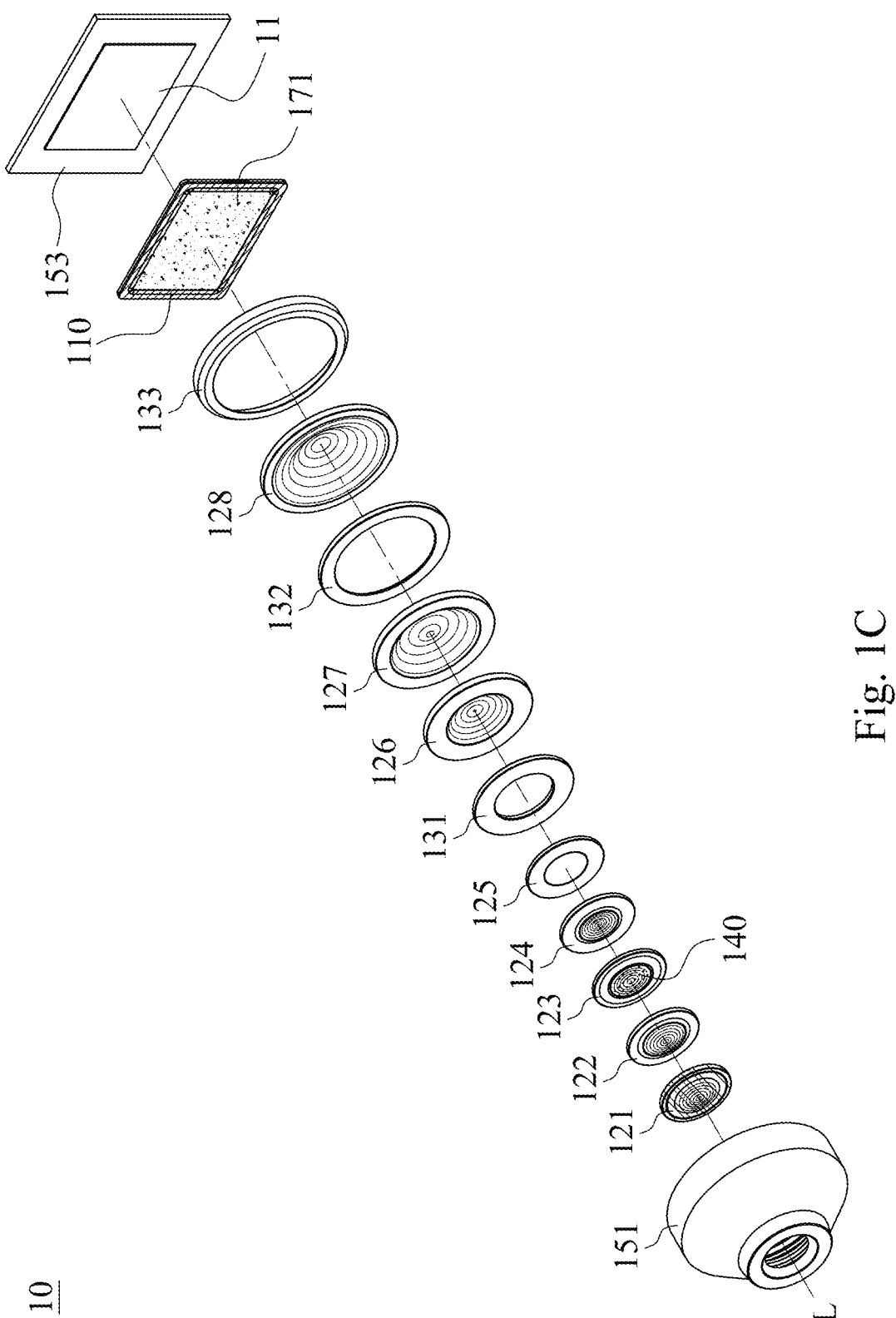
FIG. 1C is a partial exploded view of the camera module according to the 1st embodiment in FIG. 1A.

In FIGS. 1A and 1C, the plate element 110 further includes a taper structure coating 171, wherein the taper structure coating 171 is simultaneously disposed on an incident surface and an exit surface of the translucent portion 111, and the taper structure coating 171 disposed on the incident surface of the translucent portion 111 is simultaneously disposed on the portion of a surface of the light blocking portion 115. Therefore, the glare reflected by the surface of the light blocking portion 115 can be avoided to block the non-imaging light.

The imaging lens assembly further includes a driving unit 152 and a carrier 153. The lens carrier 151 can be driven to move along at least one of the direction horizontal to the paraxial path L and the direction vertical to the paraxial path L and relative to the image sensor 11 via the driving unit 152, so as to obtain the camera module 10 with the focusing function and the anti-shaking function. The carrier 153 can be further a printed circuit board, but the present disclosure is not limited thereto. The holder portion 112 is disposed on the carrier 153, so as to further keep the translucent portion 111 on the specific position on the paraxial path L.

Figure 1D:
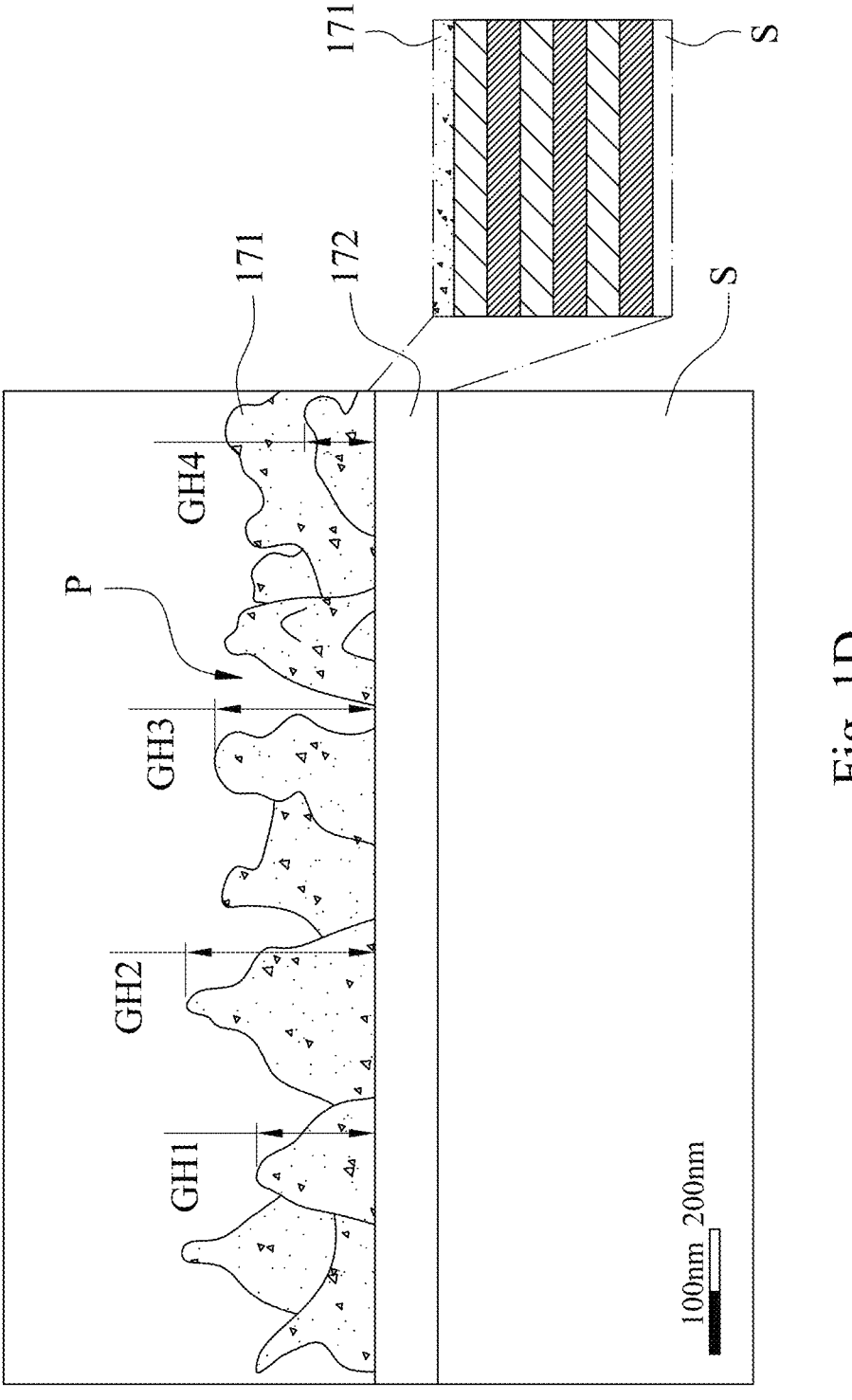
FIG. 1D is a schematic view of the low reflecting film according to the 1st example of the 1st embodiment in FIG. 1A.
Figure 1E:
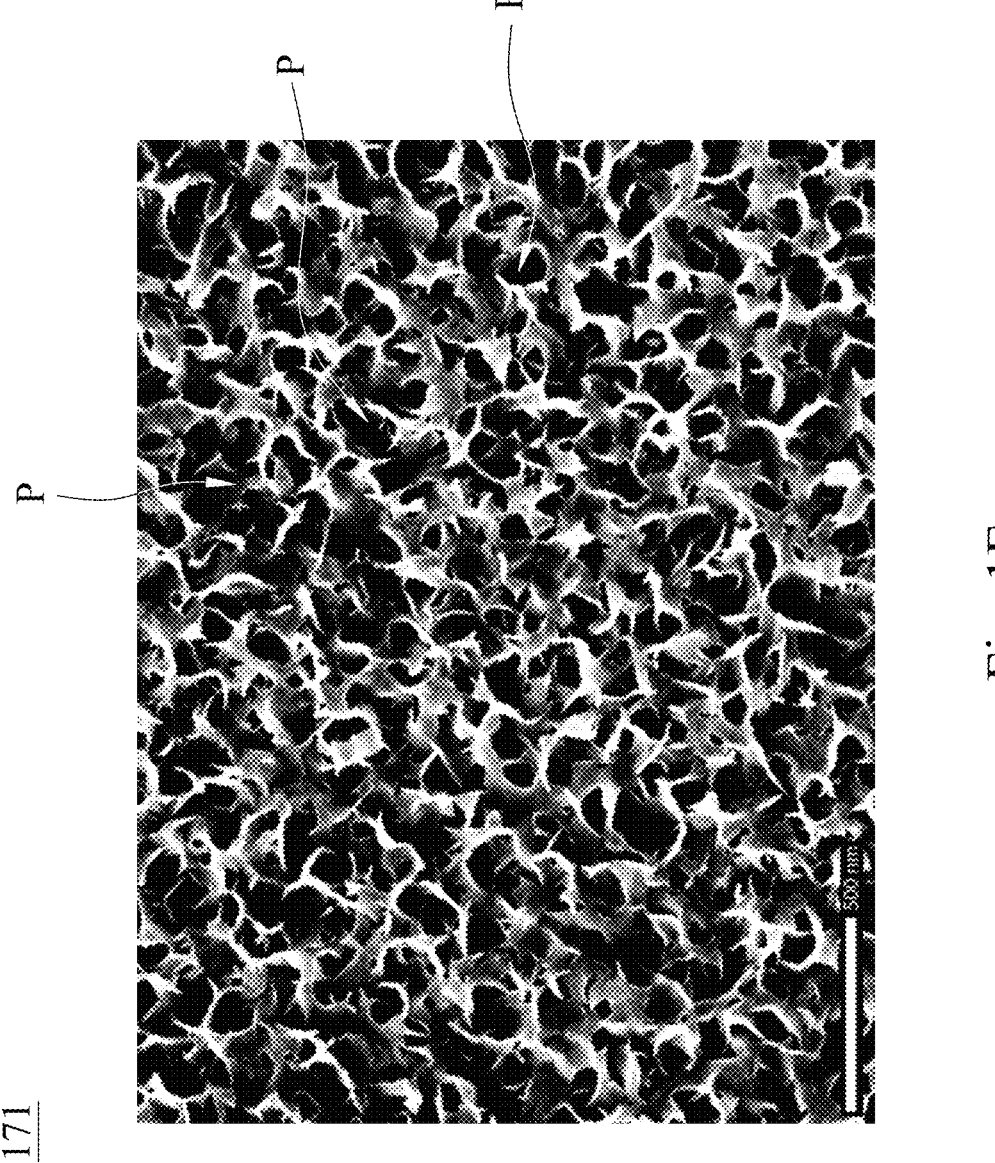
FIG. 1E is a scanning electron microscope image of the taper structure coating according to the 1st example of the 1st embodiment in FIG. 1D.

FIG. 1D is a schematic view of the low reflecting film according to the 1st example of the 1st embodiment in FIG. 1A. FIG. 1E is a scanning electron microscope image of the taper structure coating 171 according to the 1st example of the 1st embodiment in FIG. 1D. In FIGS. 1D and 1E, the imaging optical system further includes a low reflecting film (its reference numeral is omitted), wherein the low reflecting film includes the taper structure coating 171 and an intermediary layer 172, the low reflecting film has the anti-reflecting function via the taper structure coating 171, the intermediary layer 172 is connected to the taper structure coating 171 and a substrate S on a surface of the plate element 110, and the intermediary layer 172 is directly contacted with the substrate S. Moreover, the intermediary layer 172 is a multilayer film, so as to enhance the adhesion of the taper structure coating 171.

The taper structure coating 171 is gradually sparse from the substrate S towards an air direction, a plurality of pores P are formed on the incident surface and the exit surface of the translucent portion 111, and the intermediary layer 172 is contacted with an air via at least one of the pores P. Therefore, the low-reflecting function of the taper structure coating 171 can be ensured.

It should be mentioned that the substrate S can be one of the translucent portion 111, the holder portion 112 and the light blocking portion 115 of the plate element 110, the thickness and the number of layers of the intermediary layer 172 in the partial cross sectional view of FIG. 1D are only configured to be the schematic view, the thickness and the number thereof can be adjusted according to the actual requirement, the thickness of the taper structure coating 171 is not the actual thickness to only and clearly indicate the coating range of the taper structure coating 171, and the present disclosure is not limited thereto.

In FIG. 1D, crystal heights of the taper structure coating 171 are GH1, GH2, GH3 and GH4, respectively, and an average crystal height of the taper structure coating 171 is GH, wherein GH1 is 189.56 nm, GH2 is 303.28 nm, GH3 is 271.88 nm, GH4 is 112.67 nm, and GH is 219.35 nm.

Figure 1F:
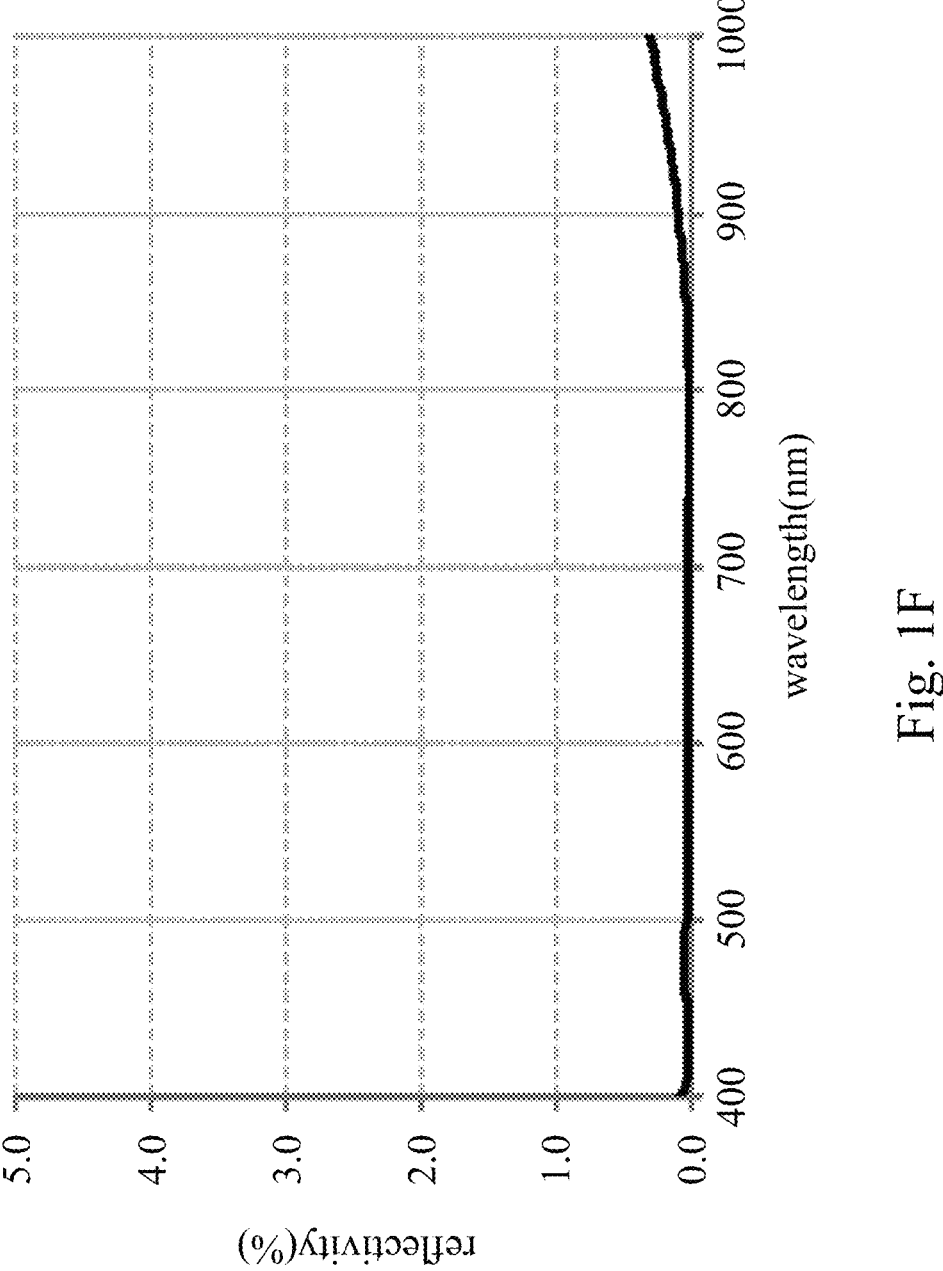
FIG. 1F is an experimental data chart of wavelength-reflectivity according to the 1st example of the 1st embodiment in FIG. 1D.

FIG. 1F is an experimental data chart of wavelength-reflectivity according to the 1st example of the 1st embodiment in FIG. 1D. In FIG. 1F, an average reflectivity of a light at a wavelength range between 420 nm and 680 nm is 0.022% via the taper structure coating 171, an average reflectivity of a light at a wavelength range between 400 nm and 900 nm is 0.023% via the taper structure coating 171, and a lowest reflectivity of the light at the wavelength range between 420 nm and 680 nm is 0.012% via the taper structure coating 171.

Figure 1G:
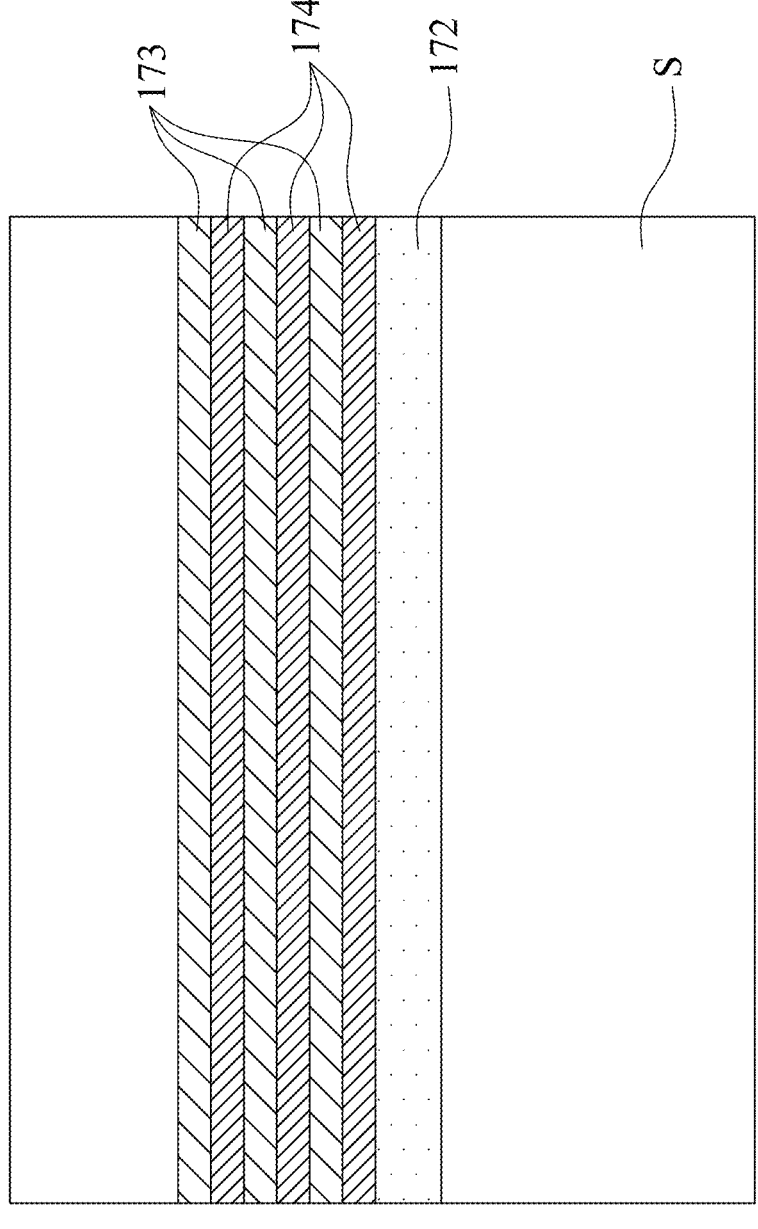
FIG. 1G is a schematic view of the low reflecting film according to the 2nd example of the 1st embodiment in FIG. 1A.

FIG. 1G is a schematic view of the low reflecting film according to the 2nd example of the 1st embodiment in FIG.

1A. In FIG. 1G, the low reflecting film further includes the anti-reflecting multilayer film (its reference numeral is omitted), wherein the anti-reflecting multilayer film includes a plurality of high refractive index layers 173 and a plurality of low refractive index layers 174, and the high refractive index layers 173 and the low refractive index layers 174 are alternately stacked. Therefore, the anti-reflecting function of the low reflecting film can be obtained, and the reflecting light can be eliminated by the principle of interference.

It should be mentioned that the thickness and the number of layers of the intermediary layer 172, the high refractive index layers 173 and the low refractive index layers 174 in the partial cross sectional view of FIG. 1G are only configured to be the schematic view, the thickness, the number and the order thereof can be adjusted according to the actual requirement, and the present disclosure is not limited thereto.

Figure 1H:
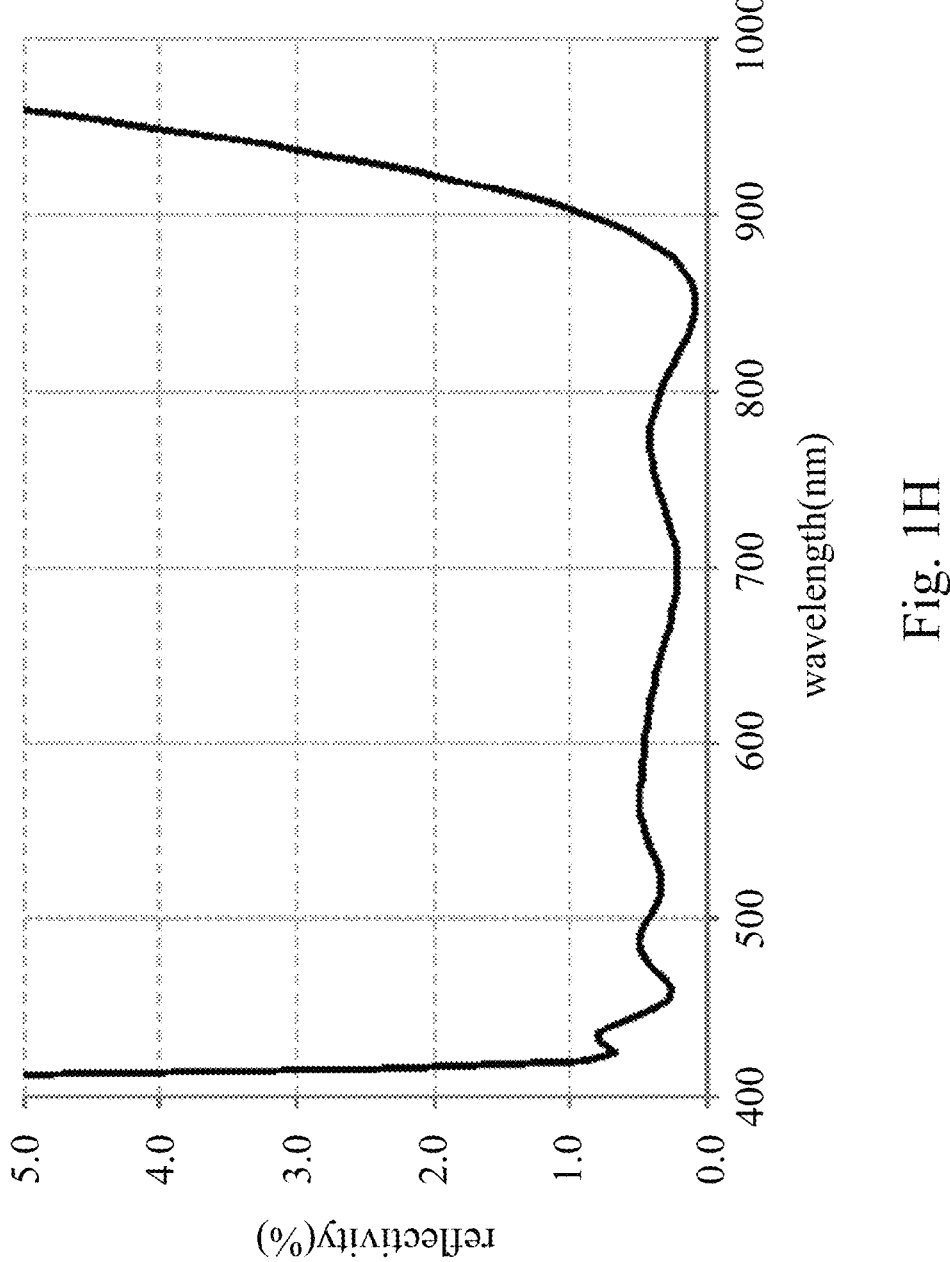
FIG. 1H is an experimental data chart of wavelength-reflectivity according to the 2nd example of the 1st embodiment in FIG. 1G.

FIG. 1H is an experimental data chart of wavelength-reflectivity according to the 2nd example of the 1st embodiment in FIG. 1G. In FIG. 1H, an average reflectivity of a light at a wavelength range between 420 nm and 680 nm is 0.43% via the anti-reflecting multilayer film, an average reflectivity of a light at a wavelength range between 400 nm and 900 nm is 0.93% via the anti-reflecting multilayer film, and a lowest reflectivity of the light at the wavelength range between 420 nm and 680 nm is 0.23% via the anti-reflecting multilayer film.

In FIG. 1A, a focal length of the imaging optical system is f, a distance between the infrared light absorbing element (according to the 1st embodiment, the first lens element 121) and the infrared light reducing film 140 along the paraxial path L is L1, a distance between the infrared light reducing film 140 and the taper structure coating 171 disposed on the incident surface of the translucent portion 111 along the paraxial path L is L2-1, a distance between the infrared light reducing film 140 and the taper structure coating 171 disposed on the exit surface of the translucent portion 111 along the paraxial path L is L2-2, and a thickness of the translucent portion 111 is THI, the following conditions of Table 1A are satisfied.

TABLE 1A

| | 1st embodiment | | |
|---|---|---|---|
| f (mm) | 8.70 | L1/f | 0.093 |
| L1 (mm) | 0.807 | L2-1/f | 0.946 |
| L2-1 (mm) | 8.2268 | L2-2/f | 0.957 |
| L2-2 (mm) | 8.3268 | THI/f | 0.012 |
| THI (mm) | 0.1 | | |

2nd Embodiment

Figure 2A:
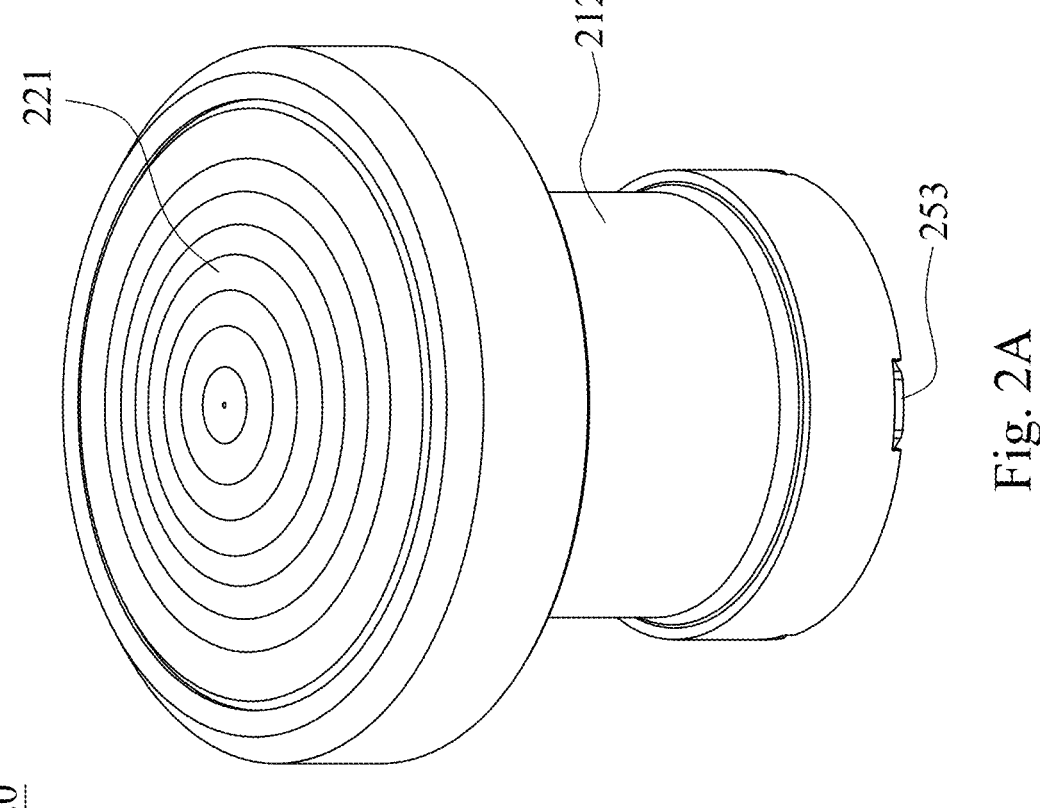
FIG. 2A is a three dimensional view of a camera module according to the 2nd embodiment of the present disclosure.
Figure 2B:
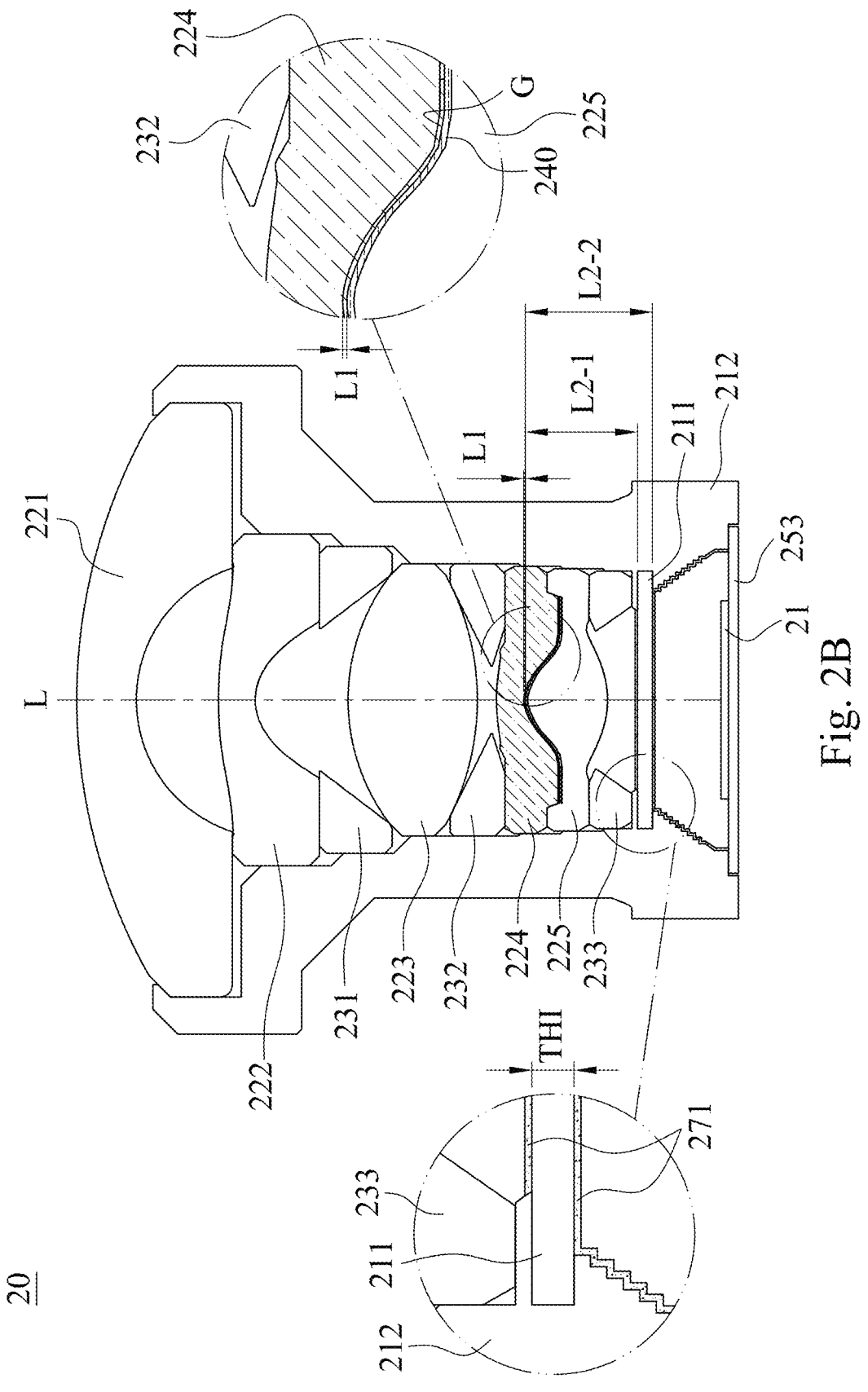
FIG. 2B is a cross-sectional view of the camera module according to the 2nd embodiment in FIG. 2A.
Figure 2C:
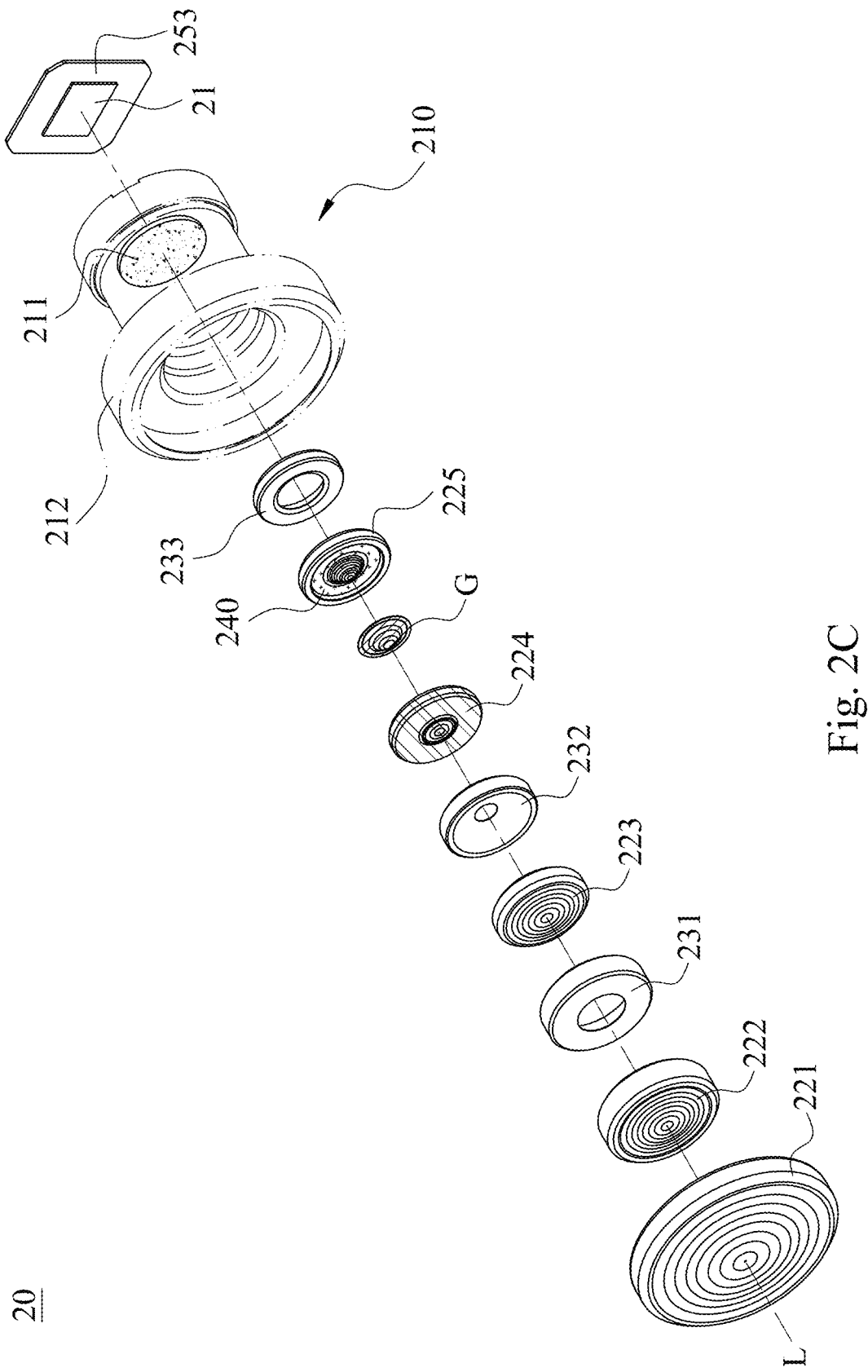
FIG. 2C is an exploded view of the camera module according to the 2nd embodiment in FIG. 2A.

FIG. 2A is a three dimensional view of a camera module 20 according to the 2nd embodiment of the present disclosure. FIG. 2B is a cross-sectional view of the camera module 20 according to the 2nd embodiment in FIG. 2A. FIG. 2C is an exploded view of the camera module 20 according to the 2nd embodiment in FIG. 2A. In FIGS. 2A to 2C, the camera module 20 includes an imaging optical system (its reference numeral is omitted) and an image sensor 21, wherein the imaging optical system includes an imaging lens assembly (its reference numeral is omitted) and a plate element 210. Moreover, the imaging optical system includes an infrared light absorbing element, an infrared light reducing film 240 and the plate element 210 in order along a paraxial path L, wherein the infrared light reducing film 240 is disposed on an exit surface of the infrared light absorbing element. The infrared light absorbing element is made of an infrared light absorbing plastic material, the infrared light absorbing element is configured to refract a light, and the infrared light absorbing element can be an infrared light absorbing lens element according to the 2nd embodiment. The infrared light reducing film 240 is closer to an image surface (its reference numeral is omitted) of the imaging optical system than an incident surface of the infrared light absorbing element to the image surface of the imaging optical system.

The imaging lens assembly includes a plurality of lens elements and the infrared light reducing film 240. In detail, the imaging lens assembly includes a first lens element 221, a second lens element 222, a spacer 231, a third lens element 223, a spacer 232, a fourth lens element 224, the infrared light reducing film 240, a fifth lens element 225 and a spacer 233 in order along the paraxial path L. It should be mentioned that the optical features such as numbers, structures, surface shapes and so on of the lens elements and the optical elements can be disposed according to different imaging demand, and the optical features are not limited thereto.

The imaging optical system further includes a film disposing element, wherein the film disposing element is disposed on an image side of the infrared light absorbing element, and the infrared light reducing film 240 is disposed on one of an incident surface and an exit surface of the film disposing element. According to the 2nd embodiment, the infrared light reducing film 240 is disposed on the incident surface of the fifth lens element 225, the fourth lens element 224 is the infrared light absorbing element, and the fifth lens element 225 is the film disposing element. Further, the infrared light reducing film 240 is also disposed on the exit surface of fifth lens element 225.

Moreover, the film disposing element is immediately adjacent to the infrared light absorbing element, and the imaging optical system further includes a glue G, wherein the infrared light absorbing element and the film disposing element are cemented via the glue G. Therefore, the absorbing efficiency of the film disposing element to the infrared light can be enhanced via the infrared light absorbing element, so as to further enhance the optical quality of the camera module 20. Further, the air gap is replaced by disposing the glue G between the infrared light absorbing element and the film disposing element, so as to reduce the ghost image formed via the surface reflection.

Figure 2D:
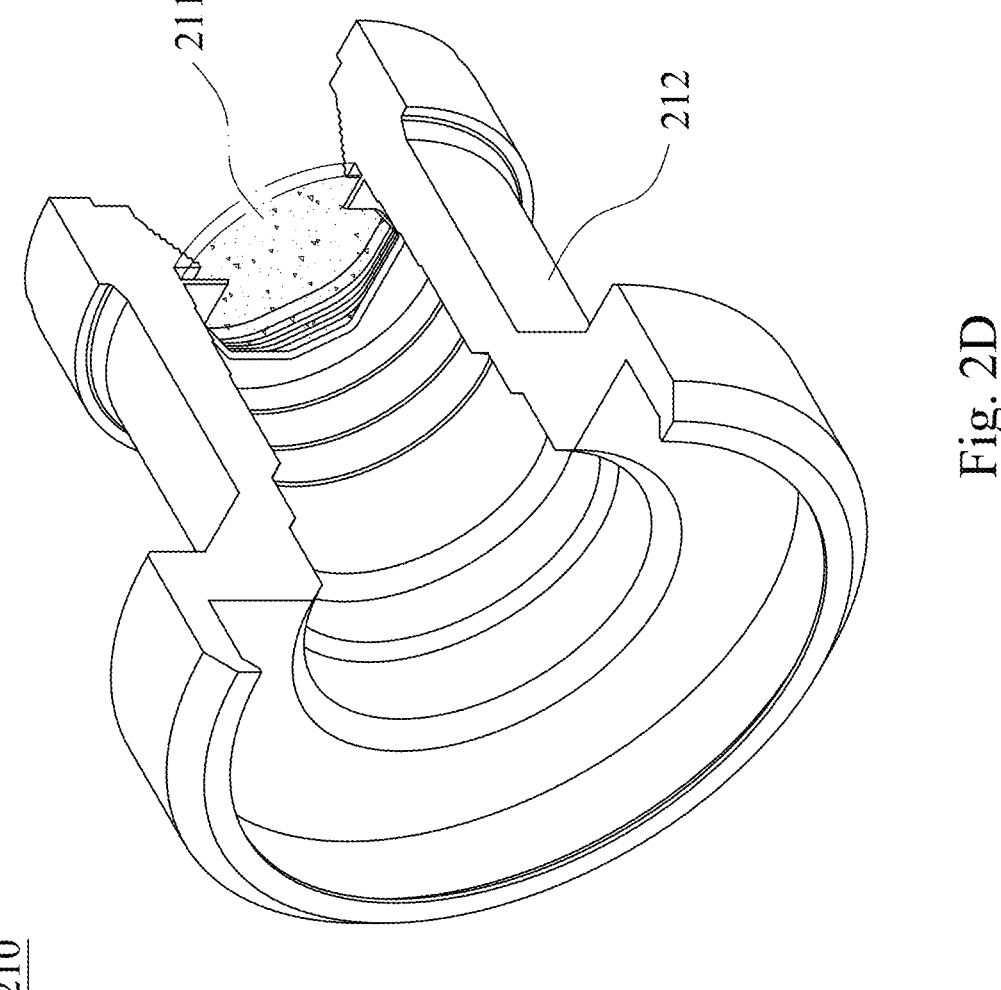
FIG. 2D is a cross-sectional view of the plate element according to the 2nd embodiment in FIG. 2A.

FIG. 2D is a cross-sectional view of the plate element 210 according to the 2nd embodiment in FIG. 2A. In FIG. 2D, the plate element 210 includes a translucent portion 211 and a holder portion 212, wherein the translucent portion 211 and the holder portion 212 are integrally formed by the insert molding process to form the plate element 210. In detail, the translucent portion 211 and the image surface are correspondingly disposed, the holder portion 212 surrounds the translucent portion 211, so as to keep the translucent portion 211 on a specific position on the paraxial path L. The holder portion 212 surrounds the paraxial path L, so that a specific distance between the translucent portion 211 of the plate element 210 and the image sensor 21 is kept via the holder portion 212. The holder portion 212 of the plate element 210 is further configured to accommodate the first lens element 221, the second lens element 222, the third lens element 223, the fourth lens element 224, the fifth lens element 225 and the spacers 231, 232, 233.

The translucent portion 211 can be made of the glass material or the plastic material, the holder portion 212 is the injection molding member, and the holder portion 212 can be made of the opaque plastic material, but the present disclosure is not limited thereto. The non-imaging light can be avoided entering the image sensor 21 through the holder portion 212 via the holder portion 212 made of the opaque plastic material.

In FIGS. 2B and 2C, the plate element 210 further includes a taper structure coating 271, wherein the taper structure coating 271 is simultaneously disposed on an incident surface and an exit surface of the translucent portion 211, and the taper structure coating 271 disposed on the exit surface of the translucent portion 211 is simultaneously disposed on at least one portion of a surface of the holder portion 212. Therefore, the risk of the glare formed by the holder portion 212 can be further reduced.

In FIG. 2B, a focal length of the imaging optical system is f, a distance between the infrared light absorbing element (according to the 2nd embodiment, the fourth lens element 224) and the infrared light reducing film 240 along the paraxial path L is L1, a distance between the infrared light reducing film 240 and the taper structure coating 271 disposed on the incident surface of the translucent portion 211 along the paraxial path L is L2-1, a distance between the infrared light reducing film 240 and the taper structure coating 271 disposed on the exit surface of the translucent portion 211 along the paraxial path L is L2-2, and a thickness of the translucent portion 211 is THI, the following conditions of Table 2A are satisfied.

TABLE 2A

| 2nd embodiment | | | |
| --- | --- | --- | --- |
| f (mm) | 0.93 | L1/f | 0.033 |
| L1 (mm) | 0.03 | L2-1/f | 2.44 |
| L2-1 (mm) | 2.2674 | L2-2/f | 2.76 |
| L2-2 (mm) | 2.5674 | THI/f | 0.323 |
| THI (mm) | 0.3 | | |

3rd Embodiment

Figure 3A:
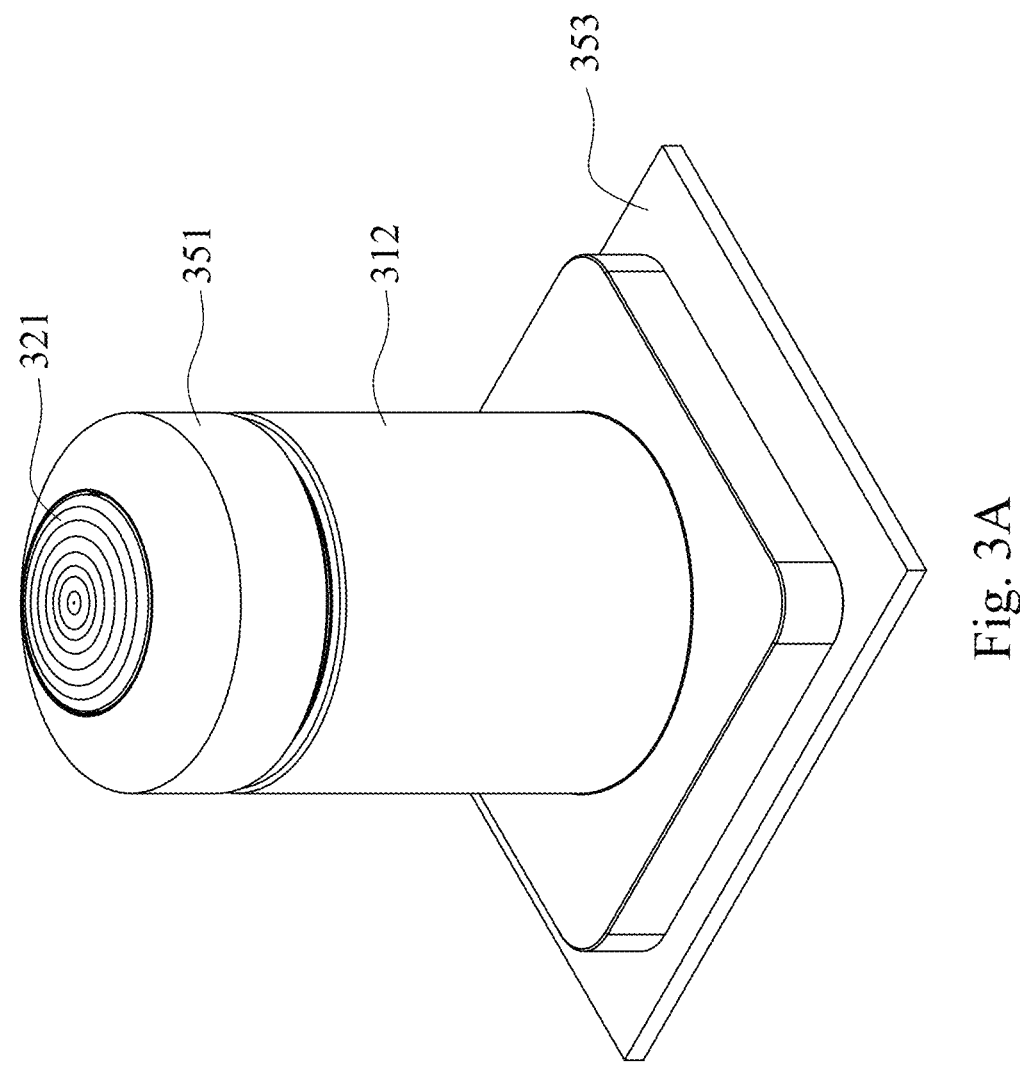
FIG. 3A is a three dimensional view of a camera module according to the 3rd embodiment of the present disclosure.
Figure 3B:
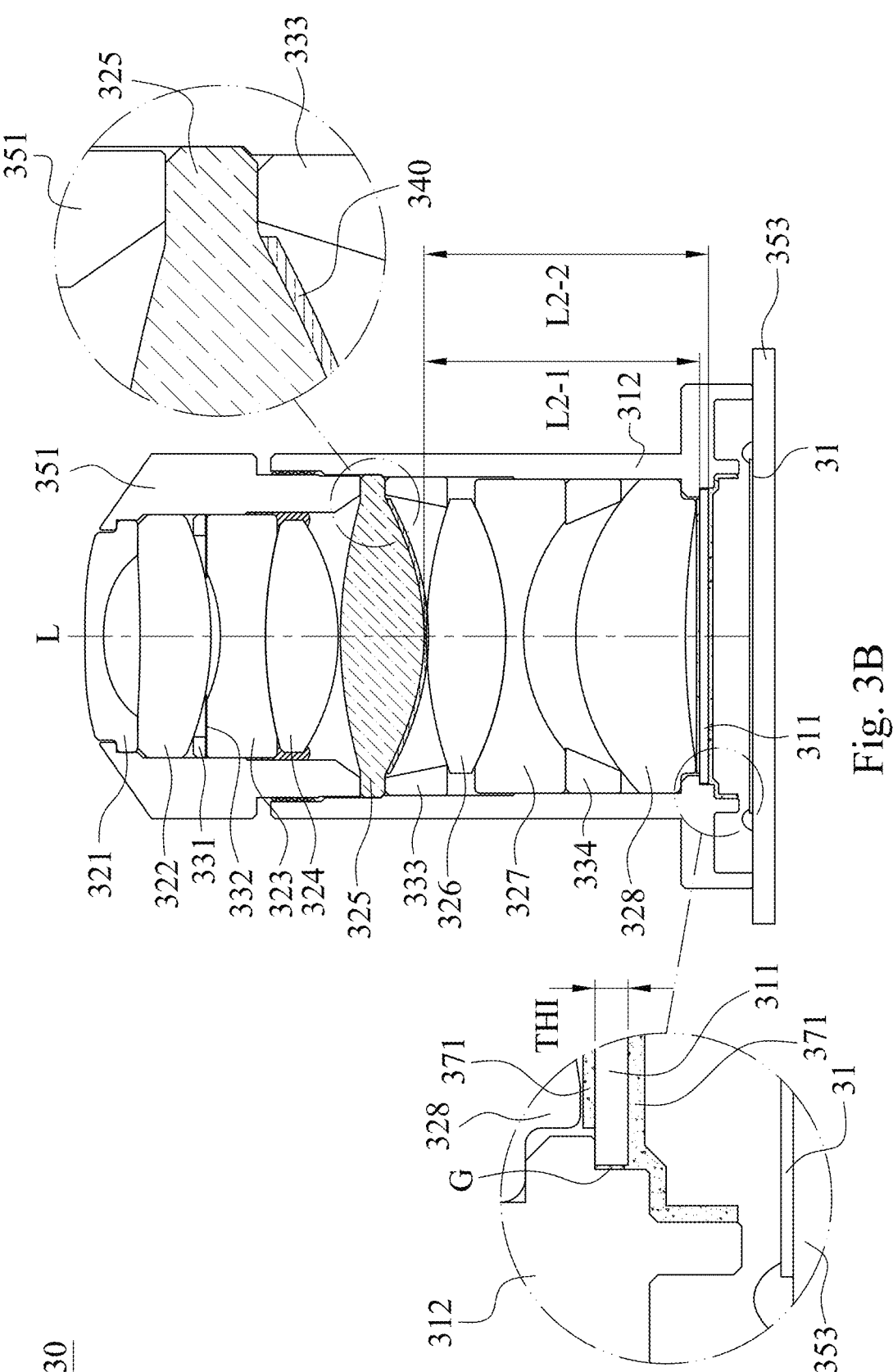
FIG. 3B is a cross-sectional view of the camera module according to the 3rd embodiment in FIG. 3A.
Figure 3C:
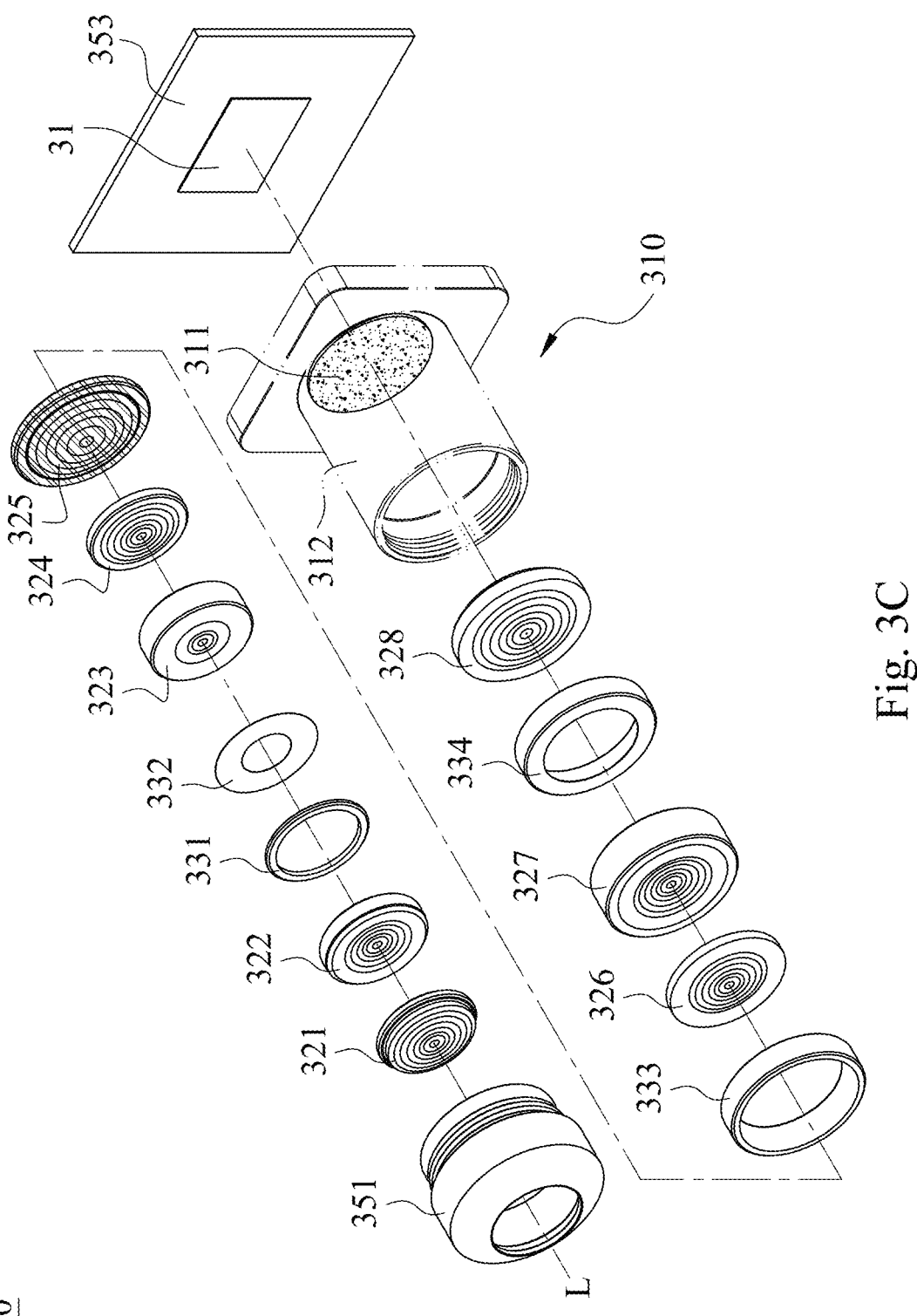
FIG. 3C is an exploded view of the camera module according to the 3rd embodiment in FIG. 3A.
Figure 3D:
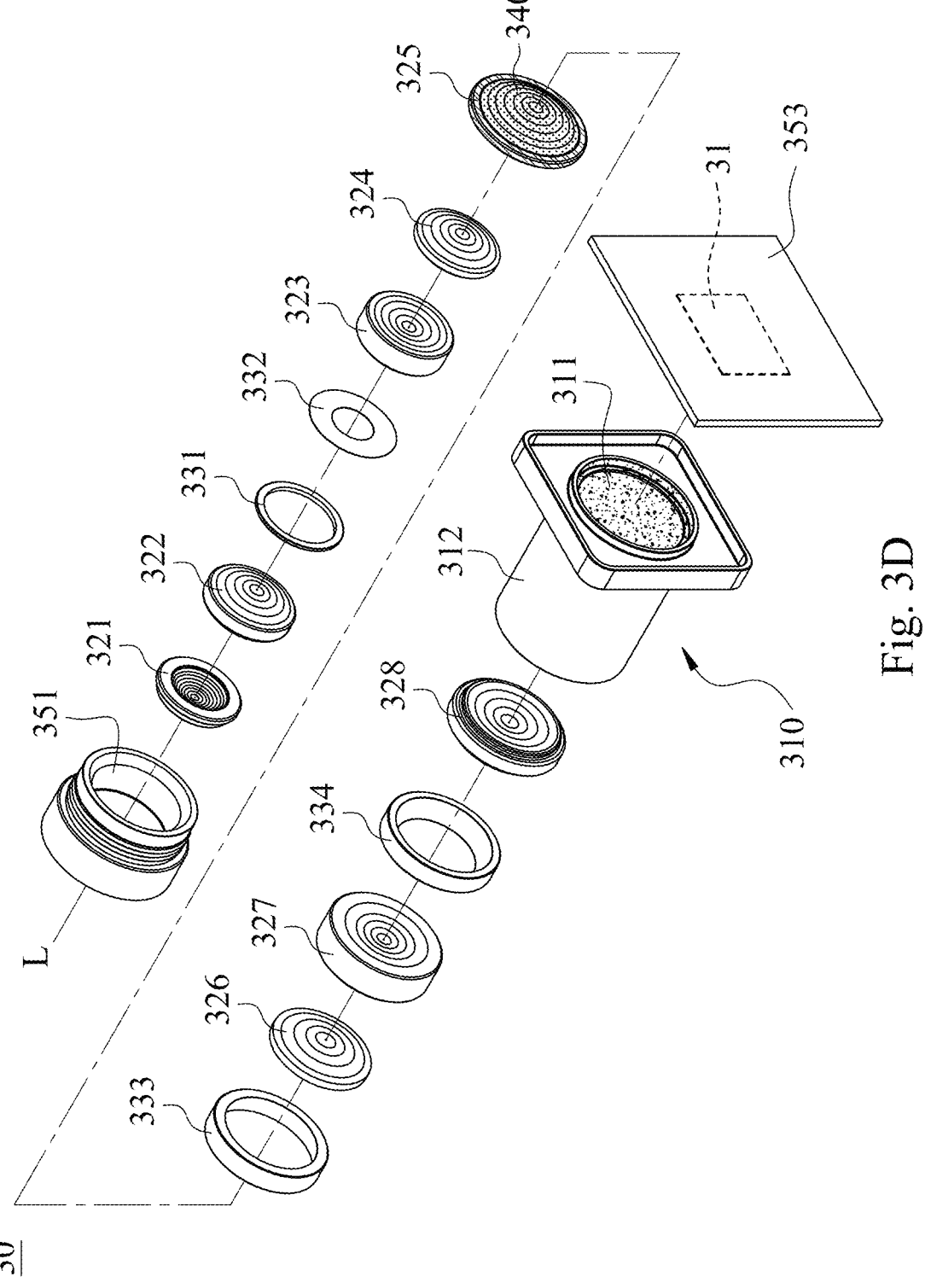
FIG. 3D is another exploded view of the camera module according to the 3rd embodiment in FIG. 3A.

FIG. 3A is a three dimensional view of a camera module 30 according to the 3rd embodiment of the present disclosure. FIG. 3B is a cross-sectional view of the camera module 30 according to the 3rd embodiment in FIG. 3A. FIG. 3C is an exploded view of the camera module 30 according to the 3rd embodiment in FIG. 3A. FIG. 3D is another exploded view of the camera module 30 according to the 3rd embodiment in FIG. 3A. In FIGS. 3A to 3D, the camera module 30 includes an imaging optical system (its reference numeral is omitted) and an image sensor 31, wherein the imaging optical system includes an imaging lens assembly (its reference numeral is omitted) and a plate element 310.

Moreover, the imaging optical system includes an infrared light absorbing element, an infrared light reducing film 340 and the plate element 310 in order along a paraxial path L, wherein the infrared light reducing film 340 is disposed on an exit surface of the infrared light absorbing element. The infrared light absorbing element is made of an infrared light absorbing plastic material, the infrared light absorbing element is configured to refract a light, and the infrared light absorbing element can be an infrared light absorbing lens element according to the 3rd embodiment. The infrared light reducing film 340 is closer to an image surface (its reference numeral is omitted) of the imaging optical system than an incident surface of the infrared light absorbing element to the image surface of the imaging optical system.

The imaging lens assembly includes a plurality of lens elements, the infrared light reducing film 340 and a lens carrier 351. In detail, the imaging lens assembly includes a first lens element 321, a second lens element 322, a spacer 331, a spacer 332, a third lens element 323, a fourth lens element 324, a fifth lens element 325, the infrared light reducing film 340, a spacer 333, a sixth lens element 326, a seventh lens element 327, a spacer 334 and an eighth lens element 328 in order along the paraxial path L. It should be mentioned that the optical features such as numbers, structures, surface shapes and so on of the lens elements and the optical elements can be disposed according to different imaging demand, and the optical features are not limited thereto.

According to the 3rd embodiment, the fifth lens element 325 is the infrared light absorbing element, and the infrared light reducing film 340 is disposed on an exit surface of the fifth lens element 325.

Figure 3E:
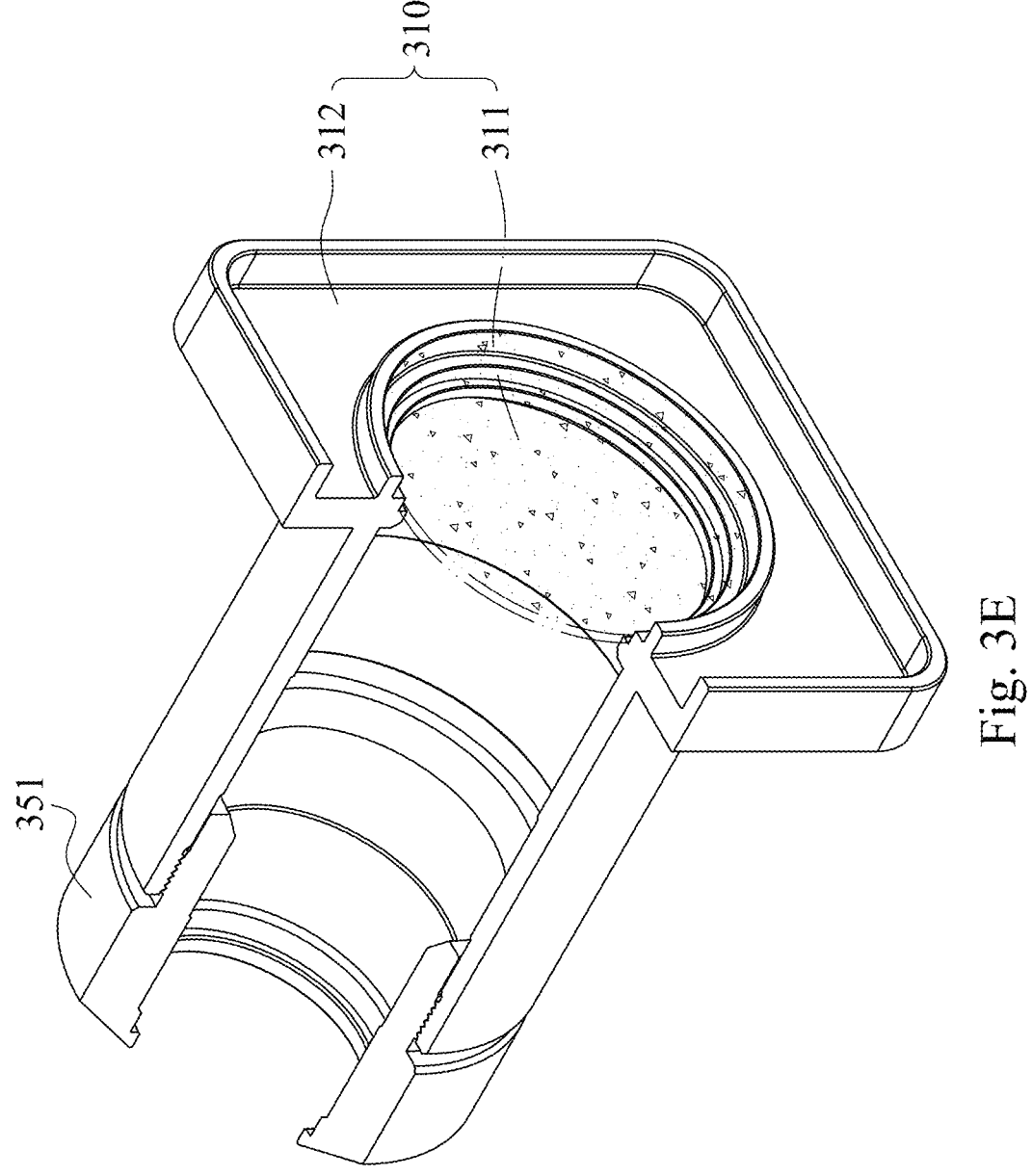
FIG. 3E is a cross-sectional view of the lens carrier and the plate element according to the 3rd embodiment in FIG. 3A.

FIG. 3E is a cross-sectional view of the lens carrier 351 and the plate element 310 according to the 3rd embodiment in FIG. 3A. In FIGS. 3B and 3E, the plate element 310 includes a translucent portion 311 and a holder portion 312. In detail, the translucent portion 311 and the image surface are correspondingly disposed, the holder portion 312 surrounds the translucent portion 311, so as to keep the translucent portion 311 on a specific position on the paraxial path L. The holder portion 312 surrounds the paraxial path L, so that a specific distance between the translucent portion 311 of the plate element 310 and the image sensor 31 is kept via the holder portion 312.

In detail, the lens carrier 351 accommodates the first lens element 321, the second lens element 322, the third lens element 323, the fourth lens element 324 and the spacers 331, 332, and the holder portion 312 of the plate element 310 is further configured to accommodate the lens carrier 351, the fifth lens element 325, the sixth lens element 326, the seventh lens element 327, the eighth lens element 328 and the spacers 333, 334.

In FIG. 3B, the translucent portion 311 can be made of the transparent glass material or the transparent plastic material, and the holder portion 312 can be formed via the black plastic material, wherein the translucent portion 311 and the holder portion 312 are integrally formed via a glue G.

In FIG. 3B, the plate element 310 further includes a taper structure coating 371, wherein the taper structure coating 371 is simultaneously disposed on an incident surface and an exit surface of the translucent portion 311. Further, the taper structure coating 371 is simultaneously coated on at least one portion of a surface of the holder portion 312. Therefore, the risk of the glare formed by the holder portion 312 can be further reduced.

In FIG. 3B, a focal length of the imaging optical system is f, a distance between the infrared light reducing film 340 and the taper structure coating 371 disposed on the incident surface of the translucent portion 311 along the paraxial path L is L2-1, a distance between the infrared light reducing film 340 and the taper structure coating 371 disposed on the exit surface of the translucent portion 311 along the paraxial path L is L2-2, and a thickness of the translucent portion 311 is THI, the following conditions of Table 3A are satisfied.

TABLE 3A

| | 3rd embodiment | | |
| --- | --- | --- | --- |
| f (mm) | 6.31 | L2-1/f | 1.97 |
| L2-1 (mm) | 12.445 | L2-2/f | 2.04 |

TABLE 3A-continued

| | 3rd embodiment | | |
| --- | --- | --- | --- |
| L2-2 (mm) | 12.845 | THI/f | 0.063 |
| THI (mm) | 0.40 | | |

4th Embodiment

Figure 4A:
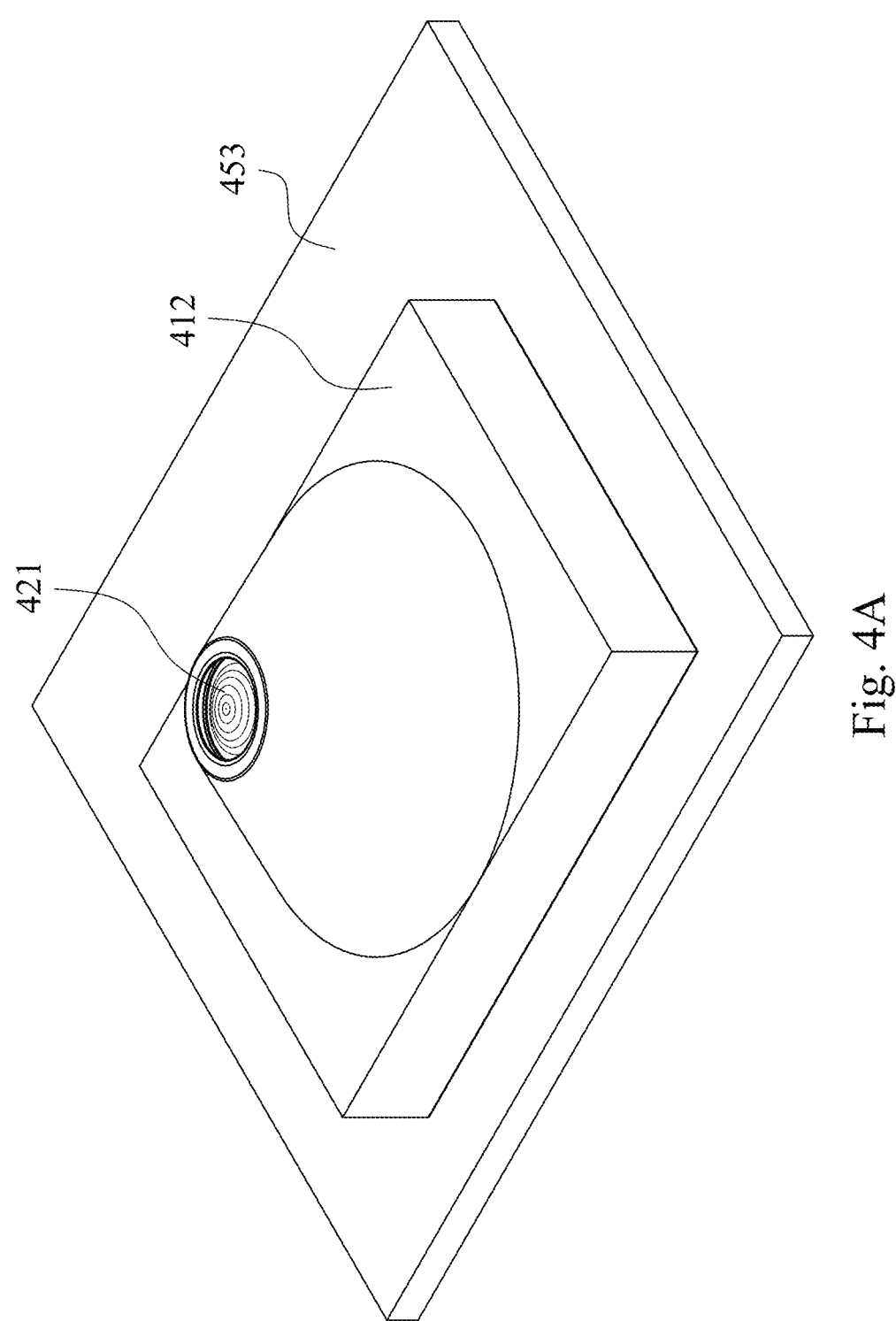
FIG. 4A is a three dimensional view of a camera module according to the 4th embodiment of the present disclosure.
Figure 4B:
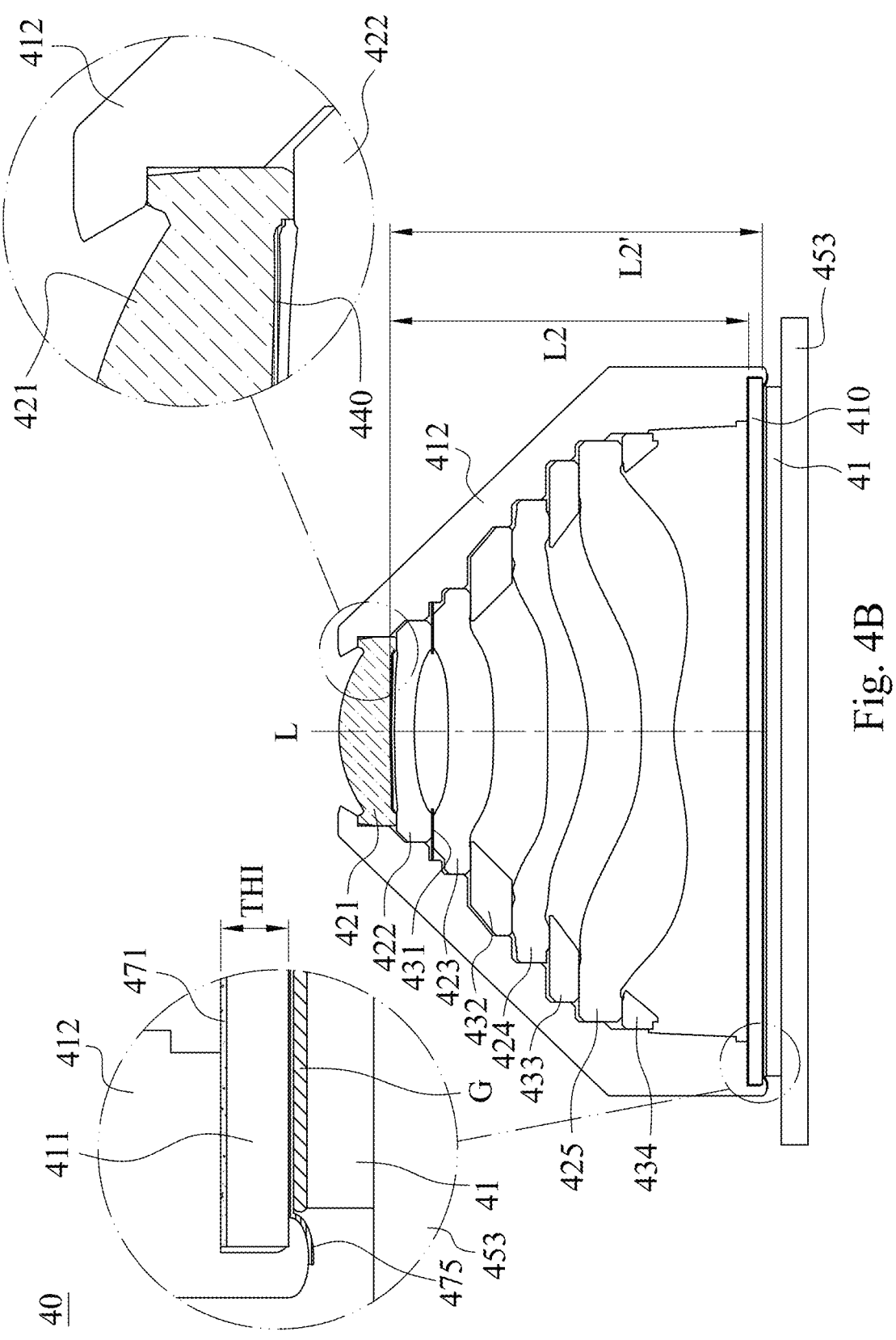
FIG. 4B is a cross-sectional view of the camera module according to the 4th embodiment in FIG. 4A.
Figure 4C:
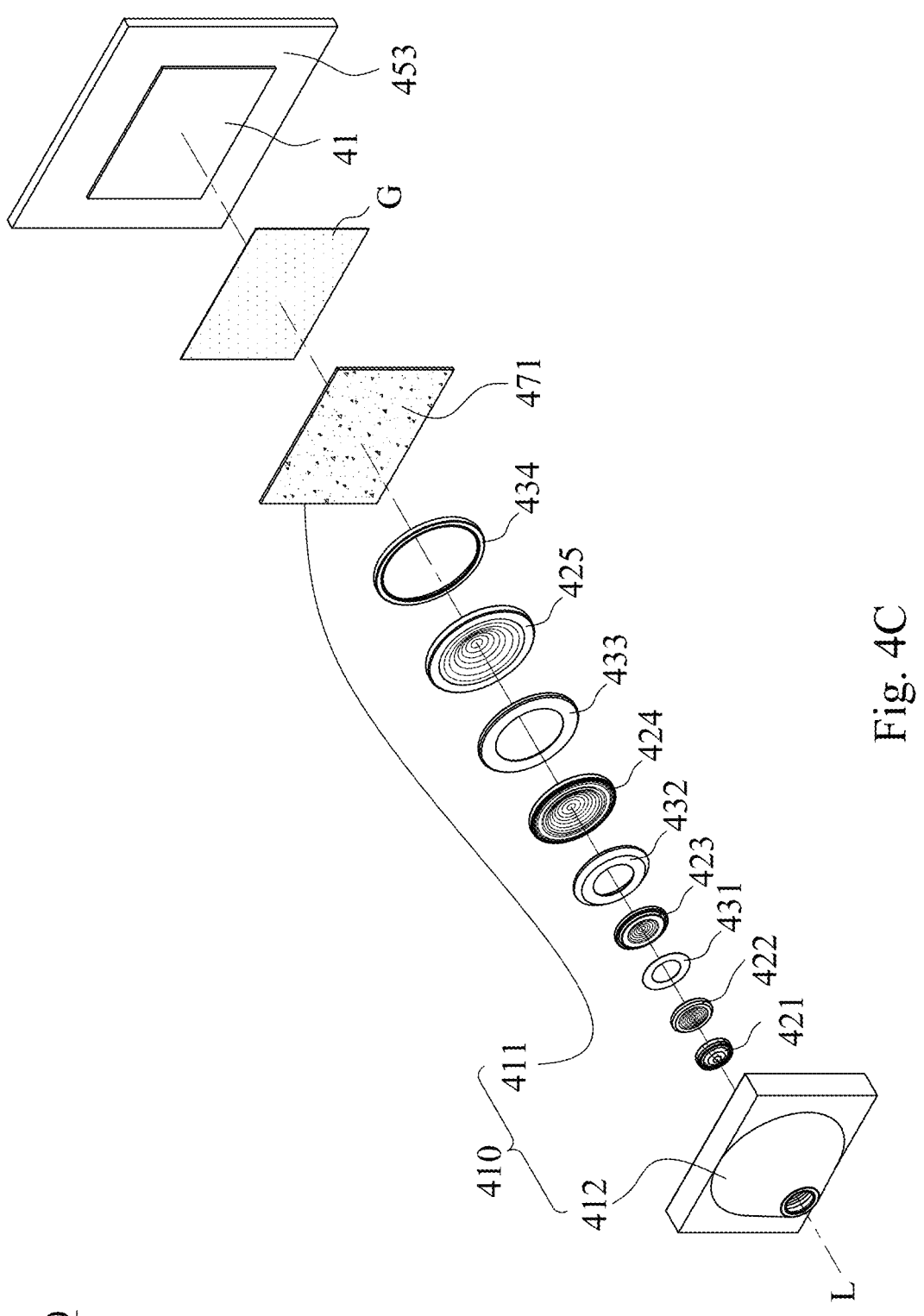
FIG. 4C is an exploded view of the camera module according to the 4th embodiment in FIG. 4A.
Figure 4D:
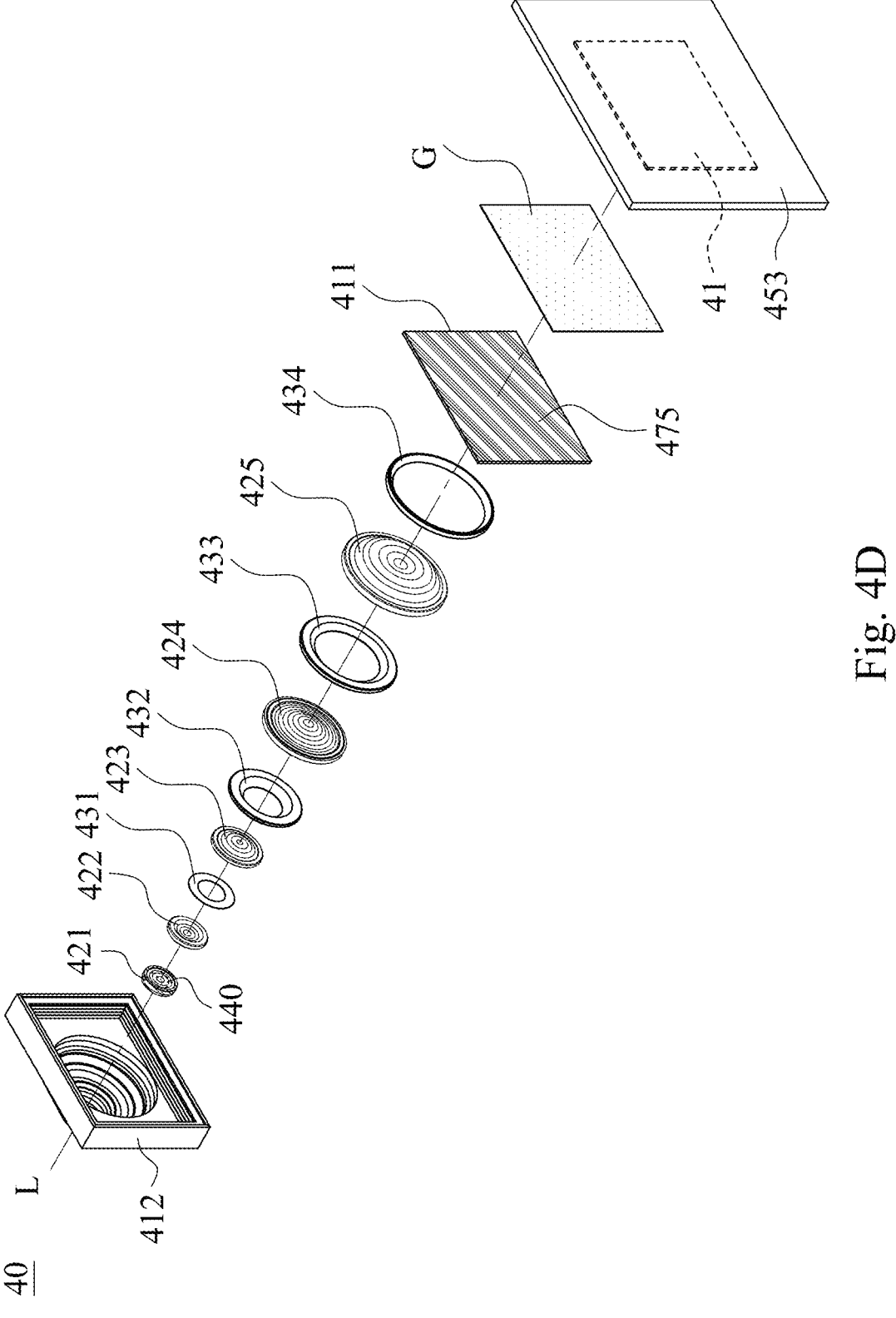
FIG. 4D is another exploded view of the camera module according to the 4th embodiment in FIG. 4A.

FIG. 4A is a three dimensional view of a camera module 40 according to the 4th embodiment of the present disclosure. FIG. 4B is a cross-sectional view of the camera module 40 according to the 4th embodiment in FIG. 4A. FIG. 4C is an exploded view of the camera module 40 according to the 4th embodiment in FIG. 4A. FIG. 4D is another exploded view of the camera module 40 according to the 4th embodiment in FIG. 4A. In FIGS. 4A to 4D, the camera module 40 includes an imaging optical system (its reference numeral is omitted) and an image sensor 41, wherein the imaging optical system includes an imaging lens assembly (its reference numeral is omitted) and a plate element 410.

Moreover, the imaging optical system includes an infrared light absorbing element, an infrared light reducing film 440 and the plate element 410 in order along a paraxial path L, wherein the infrared light reducing film 440 is disposed on an exit surface of the infrared light absorbing element. The infrared light absorbing element is made of an infrared light absorbing plastic material, the infrared light absorbing element is configured to refract a light, and the infrared light absorbing element can be an infrared light absorbing lens element according to the 4th embodiment. The infrared light reducing film 440 is closer to an image surface (its reference numeral is omitted) of the imaging optical system than an incident surface of the infrared light absorbing element to the image surface of the imaging optical system.

The imaging lens assembly includes a plurality of lens elements and the infrared light reducing film 440. In detail, the imaging lens assembly includes a first lens element 421, the infrared light reducing film 440, a second lens element 422, a spacer 431, a third lens element 423, a spacer 432, a fourth lens element 424, a spacer 433, a fifth lens element 425 and a retainer 434 in order along the paraxial path L. It should be mentioned that the optical features such as numbers, structures, surface shapes and so on of the lens elements and the optical elements can be disposed according to different imaging demand, and the optical features are not limited thereto.

According to the 4th embodiment, the first lens element 421 is the infrared light absorbing element, and the infrared light reducing film 440 is disposed on an exit surface of the first lens element 421.

Figure 4E:
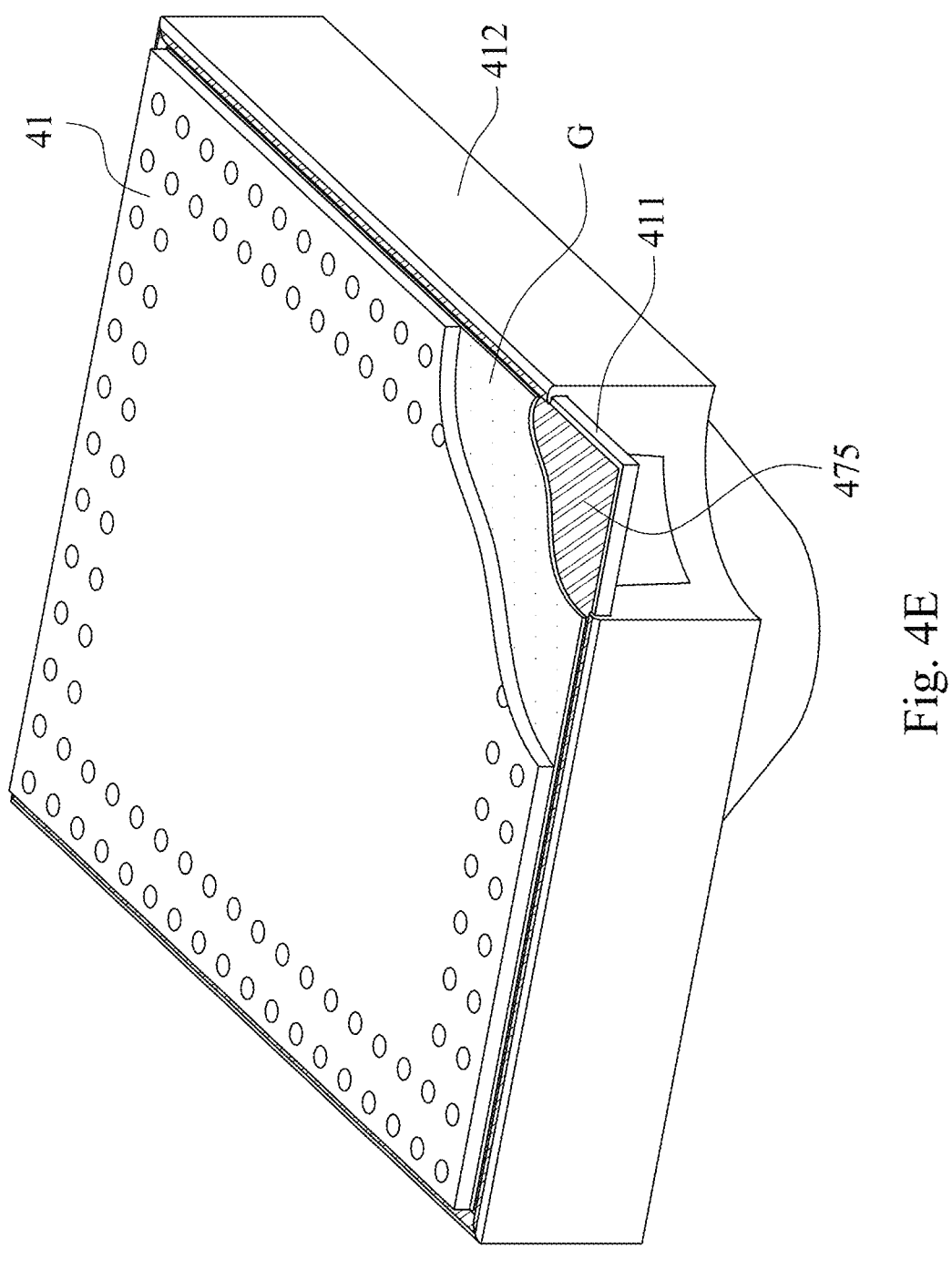
FIG. 4E is a partial perspective view of the camera module according to the 4th embodiment in FIG. 4A.

FIG. 4E is a partial perspective view of the camera module 40 according to the 4th embodiment in FIG. 4A. In FIGS. 4B to 4E, the imaging optical system further includes a glue G, wherein the glue G is disposed between the translucent portion 411 and the image sensor 41.

The plate element 410 includes a translucent portion 411 and a holder portion 412, wherein the translucent portion 411 and the holder portion 412 are integrally formed by the hot riveting process to form the plate element 410. In detail, the translucent portion 411 and the image surface are correspondingly disposed, the holder portion 412 surrounds the translucent portion 411, so as to keep the translucent portion 411 on a specific position on the paraxial path L. The holder portion 412 surrounds the paraxial path L, so that a specific distance between the translucent portion 411 of the plate element 410 and the image sensor 41 is kept via the holder portion 412. The holder portion 412 of the plate element 410 is further configured to accommodate the first lens element 421, the second lens element 422, the third lens element 423, the fourth lens element 424, the fifth lens element 425, the spacers 431, 432, 433 and the retainer 434.

The translucent portion 411 can be made of the transparent glass material or the transparent plastic material, the holder portion 412 can be formed via the black plastic material, but the present disclosure is not limited thereto. The non-imaging light can be avoided entering the image sensor 41 through the holder portion 412 via the holder portion 412 made of the opaque plastic material.

The imaging optical system further includes a low reflecting film (its reference numeral is omitted), wherein the low reflecting film is simultaneously disposed on an incident surface and an exit surface of the translucent portion 411, the low reflecting film disposed on the incident surface of the translucent portion 411 includes a taper structure coating 471, and the low reflecting film disposed on the exit surface of the translucent portion 411 includes an anti-reflecting multilayer film 475. Furthermore, the anti-reflecting multilayer film 475 includes a plurality of high refractive index layers and a plurality of low refractive index layers, and the high refractive index layers and the low refractive index layers are alternately stacked. Therefore, the anti-reflecting function of the low reflecting film can be obtained. Moreover, the anti-reflecting multilayer film 475 is simultaneously disposed on a portion of a surface of the holder portion 412, so as to avoid the glare reflected by the surface of the holder portion 412 to block the non-imaging light.

In FIG. 4B, a focal length of the imaging optical system is f, a distance between the infrared light reducing film 440 and the taper structure coating 471 along the paraxial path L is L2, a distance between the infrared light reducing film 440 and the anti-reflecting multilayer film 475 along the paraxial path L is L2', and a thickness of the translucent portion 411 is THI, the following conditions of Table 4A are satisfied.

TABLE 4A

| 4th embodiment | | | |
|---|---|---|---|
| f (mm) | 3.74 | L2/f | 0.973 |
| L2 (mm) | 3.64 | L2'/f | 1.01 |
| L2' (mm) | 3.79 | THI/f | 0.04 |
| THI (mm) | 0.15 | | |

5th Embodiment

Figure 5A:
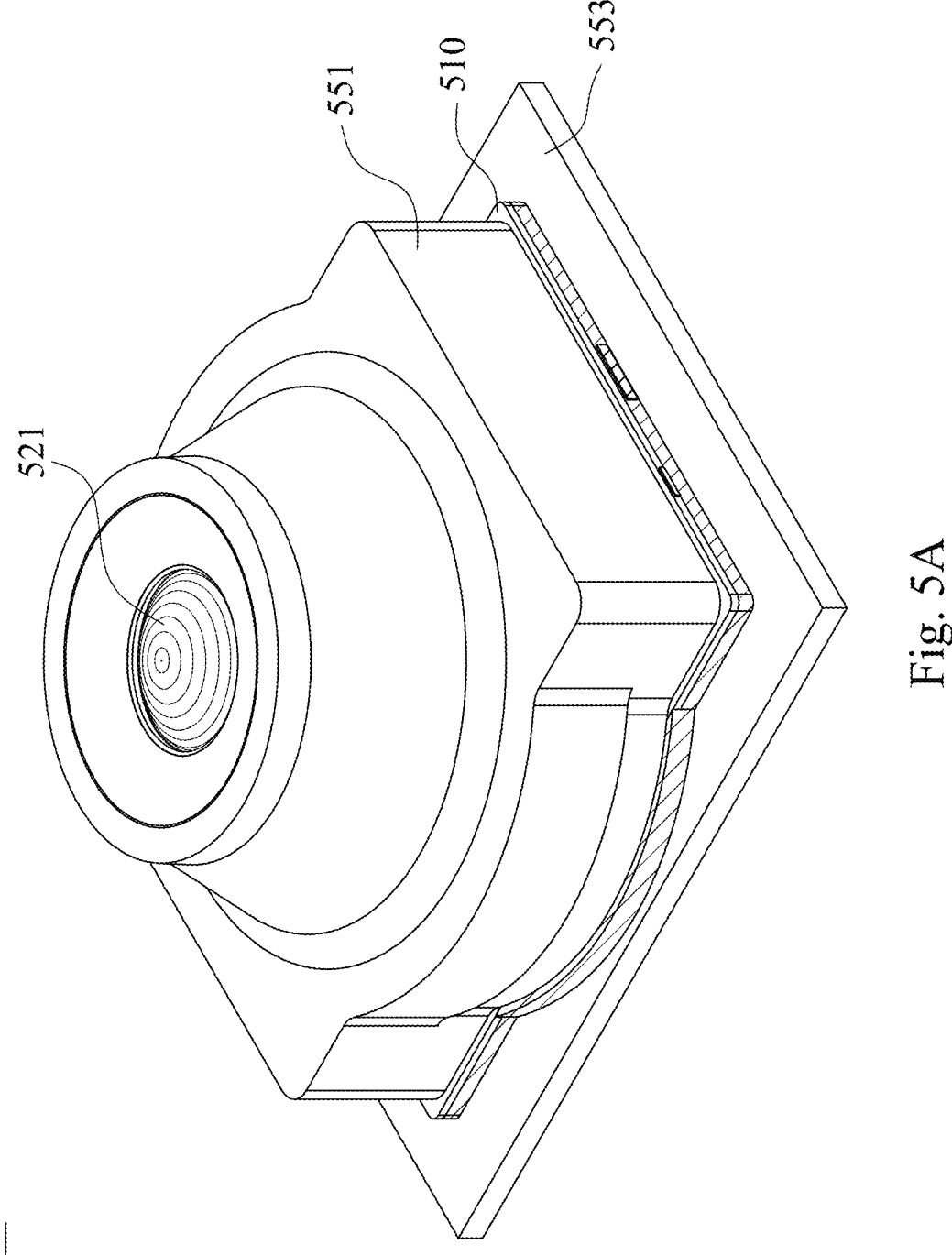
FIG. 5A is a three dimensional view of a camera module according to the 5th embodiment of the present disclosure.
Figure 5B:
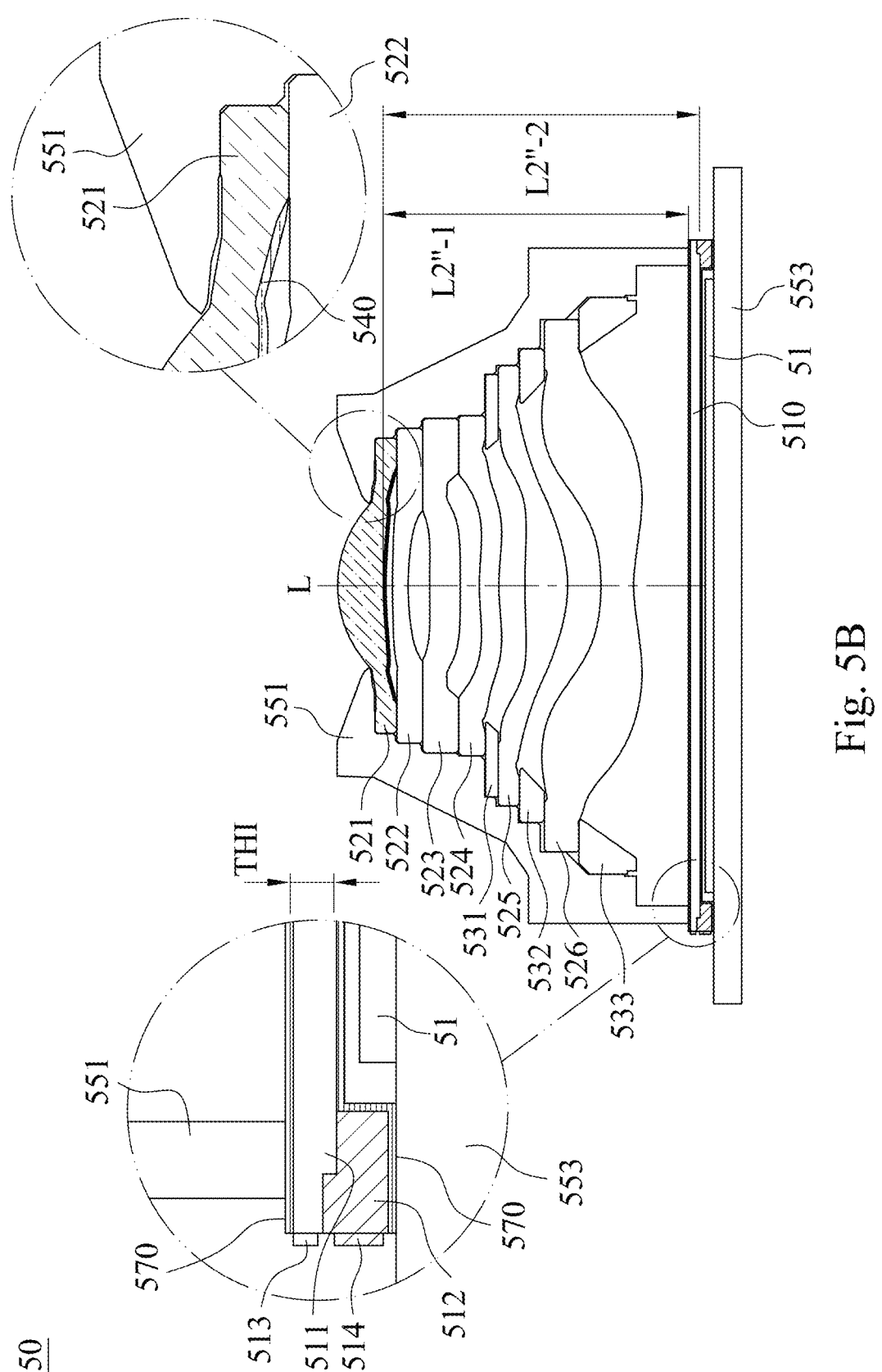
FIG. 5B is a schematic view of the camera module according to the 5th embodiment in FIG. 5A.
Figure 5C:
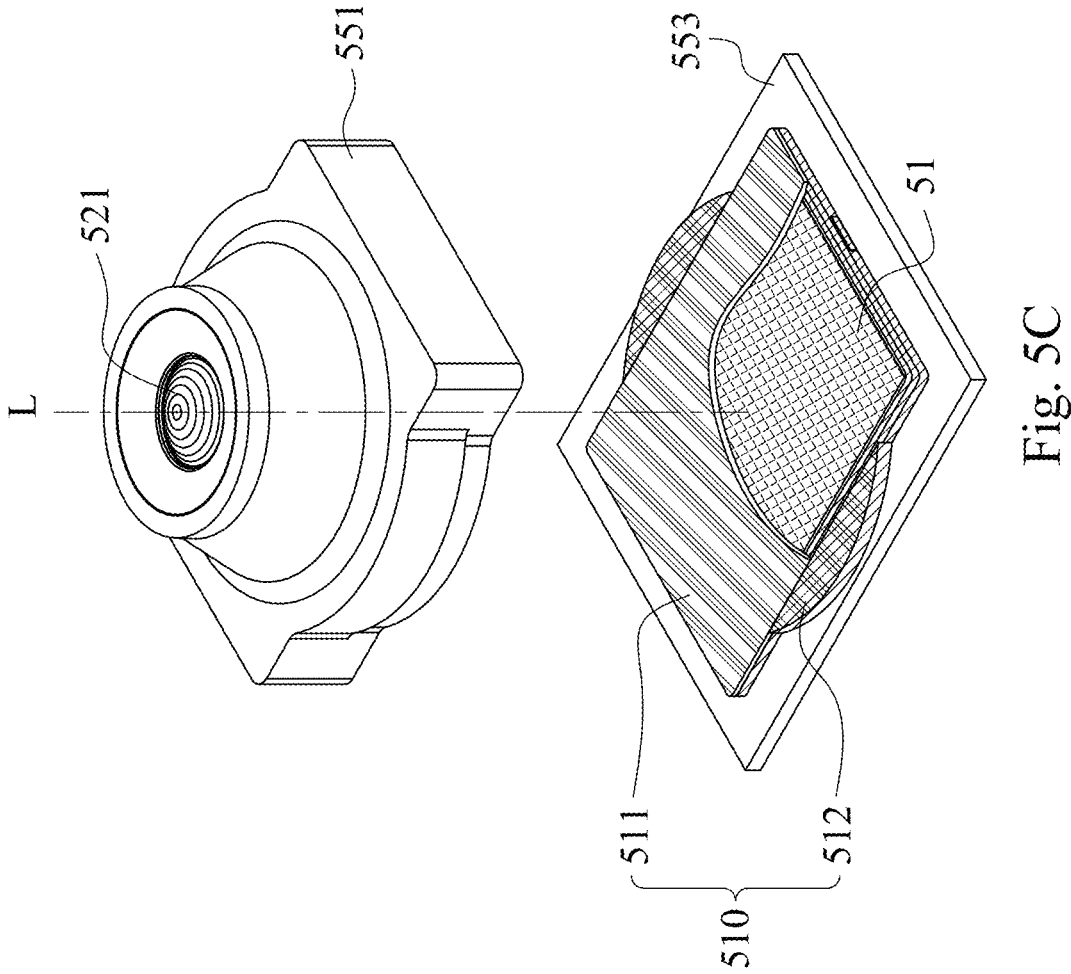
FIG. 5C is a partial exploded view of the camera module according to the 5th embodiment in FIG. 5A.
Figure 5D:
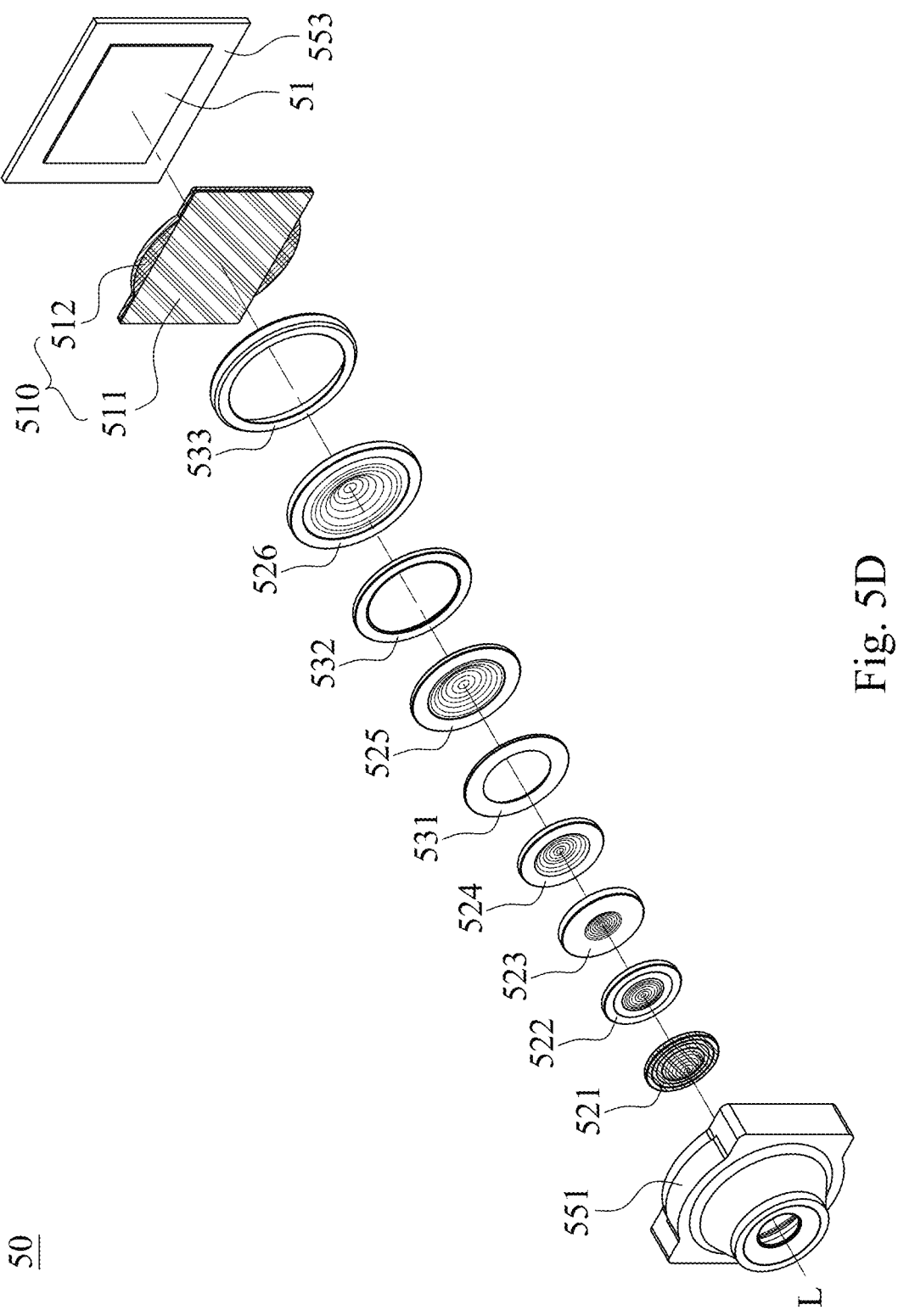
FIG. 5D is an exploded view of the camera module according to the 5th embodiment in FIG. 5A.
Figure 5E:
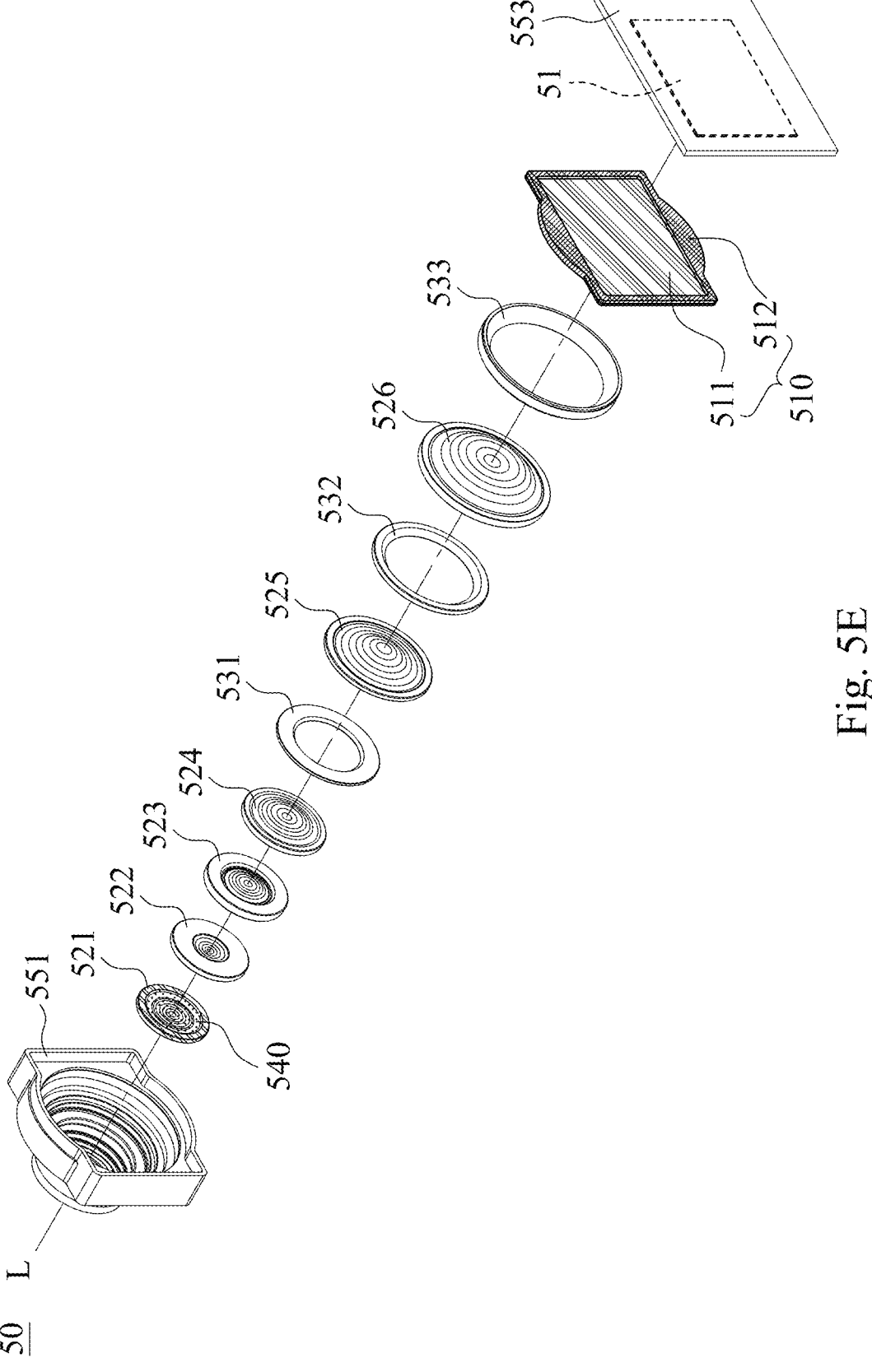
FIG. 5E is another exploded view of the camera module according to the 5th embodiment in FIG. 5A.

FIG. 5A is a three dimensional view of a camera module 50 according to the 5th embodiment of the present disclosure. FIG. 5B is a schematic view of the camera module 50 according to the 5th embodiment in FIG. 5A. FIG. 5C is a partial exploded view of the camera module 50 according to the 5th embodiment in FIG. 5A. FIG. 5D is an exploded view of the camera module 50 according to the 5th embodiment in FIG. 5A. FIG. 5E is another exploded view of the camera module 50 according to the 5th embodiment in FIG. 5A. In FIGS. 5A to 5E, the camera module 50 includes an imaging optical system (its reference numeral is omitted) and an image sensor 51, wherein the imaging optical system includes an imaging lens assembly (its reference numeral is omitted) and a plate element 510, and the imaging lens assembly is disposed on the plate element 510, so as to relatively fix the imaging lens assembly and the image sensor 51.

The imaging optical system includes an infrared light absorbing element, an infrared light reducing film 540 and the plate element 510 in order along a paraxial path L, wherein the infrared light reducing film 540 is disposed on an exit surface of the infrared light absorbing element. The infrared light absorbing element is made of an infrared light absorbing plastic material, the infrared light absorbing element is configured to refract a light, and the infrared light absorbing element can be an infrared light absorbing lens element according to the 5th embodiment. The infrared light reducing film 540 is closer to an image surface (its reference numeral is omitted) of the imaging optical system than an incident surface of the infrared light absorbing element to the image surface of the imaging optical system.

The imaging lens assembly includes a plurality of lens elements, the infrared light reducing film 540 and a lens carrier 551. In detail, the imaging lens assembly includes a first lens element 521, the infrared light reducing film 540, a second lens element 522, a third lens element 523, a fourth lens element 524, a spacer 531, a fifth lens element 525, a spacer 532, a sixth lens element 526 and a retainer 533 in order along the paraxial path L, wherein the lens carrier 551 is configured to accommodate the first lens element 521, the second lens element 522, the third lens element 523, the fourth lens element 524, the fifth lens element 525, the sixth lens element 526, the spacers 531, 532 and the retainer 533. It should be mentioned that the optical features such as numbers, structures, surface shapes and so on of the lens elements and the optical elements can be disposed according to different imaging demand, and the optical features are not limited thereto.

According to the 5th embodiment, the first lens element 521 is the infrared light absorbing element, and the infrared light reducing film 540 is disposed on an exit surface of the first lens element 521.

The plate element 510 includes a translucent portion 511, a holder portion 512, a transparent plastic trace gate 513 and an opaque plastic trace gate 514, wherein the translucent portion 511 and the holder portion 512 are integrally formed by the two-shot molding process to form the plate element 510. In detail, the translucent portion 511 and the image surface are correspondingly disposed, the holder portion 512 surrounds the translucent portion 511, so as to keep the translucent portion 511 on a specific position on the paraxial path L. The holder portion 512 surrounds the paraxial path L, so that a specific distance between the translucent portion 511 of the plate element 510 and the image sensor 51 is kept via the holder portion 512.

The translucent portion 511 can be made of the plastic material, and the holder portion 512 can be made of the opaque plastic material, but the present disclosure is not limited thereto. Further, the opaque plastic material of the holder portion 512 and the transparent plastic material of the translucent portion 511 can be further the same, wherein the colorant is added in the transparent plastic material to make the opaque plastic material of the holder portion 512 opaque. The non-imaging light can be avoided entering the image sensor 51 through the holder portion 512 via the holder portion 512 made of the opaque plastic material. In particular, the transparent plastic trace gate 513 and the translucent portion 511 are correspondingly disposed, and the opaque plastic trace gate 514 and the holder portion 512 are correspondingly disposed.

The imaging optical system further includes a low reflecting film 570, wherein the low reflecting film 570 is simultaneously disposed on an incident surface and an exit surface of the translucent portion 511, and the low reflecting film 570 is the multilayer film. Further, the low reflecting film 570 includes a taper structure coating (its reference numeral is omitted) and an anti-reflecting multilayer film (its reference numeral is omitted), the anti-reflecting multilayer film includes a plurality of high refractive index layers and a plurality of low refractive index layers, and the high refractive index layers and the low refractive index layers are alternately stacked. Therefore, the anti-reflecting function of the low reflecting film 570 can be obtained. Moreover, the low reflecting film 570 located on the exit surface is further disposed on a portion of a surface of the holder portion 512, so as to avoid the glare reflected by the surface of the holder portion 512.

In FIG. 5B, a focal length of the imaging optical system is f, a distance between the infrared light reducing film 540 and the low reflecting film 570 disposed on the incident surface of the translucent portion 511 along the paraxial path L is L2"-1, a distance between the infrared light reducing film 540 and the low reflecting film 570 disposed on the exit surface of the translucent portion 511 along the paraxial path L is L2"-2, and a thickness of the translucent portion 511 is THI, the following conditions of Table 5A are satisfied.

TABLE 5A

| 5th embodiment | | | |
|---|---|---|---|
| f (mm) | 5.59 | L2"-1/f | 0.978 |
| L2"-1 (mm) | 5.47 | L2"-2/f | 1.014 |
| L2"-2 (mm) | 5.67 | THI/f | 0.03 |
| THI (mm) | 0.2 | | |

6th Embodiment

Figure 6A:
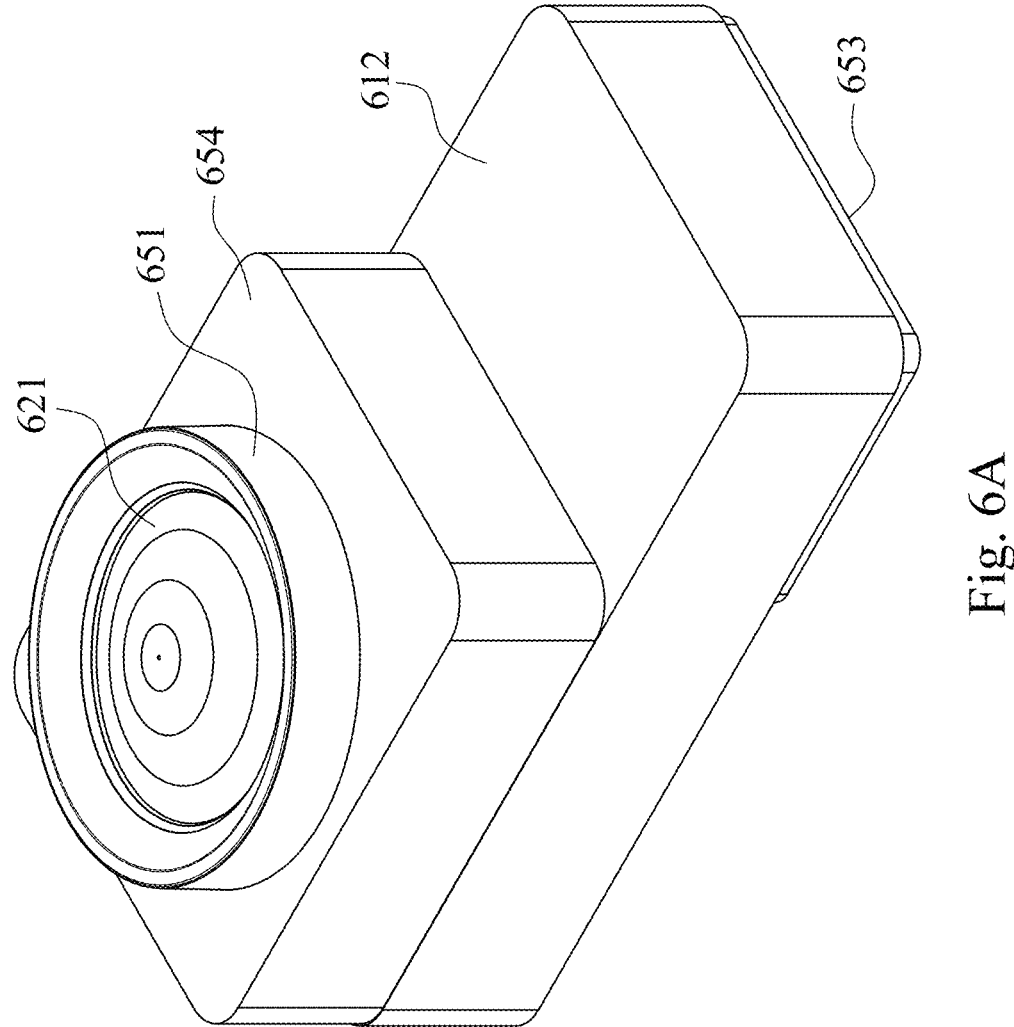
FIG. 6A is a three dimensional view of a camera module according to the 6th embodiment of the present disclosure.
Figure 6B:
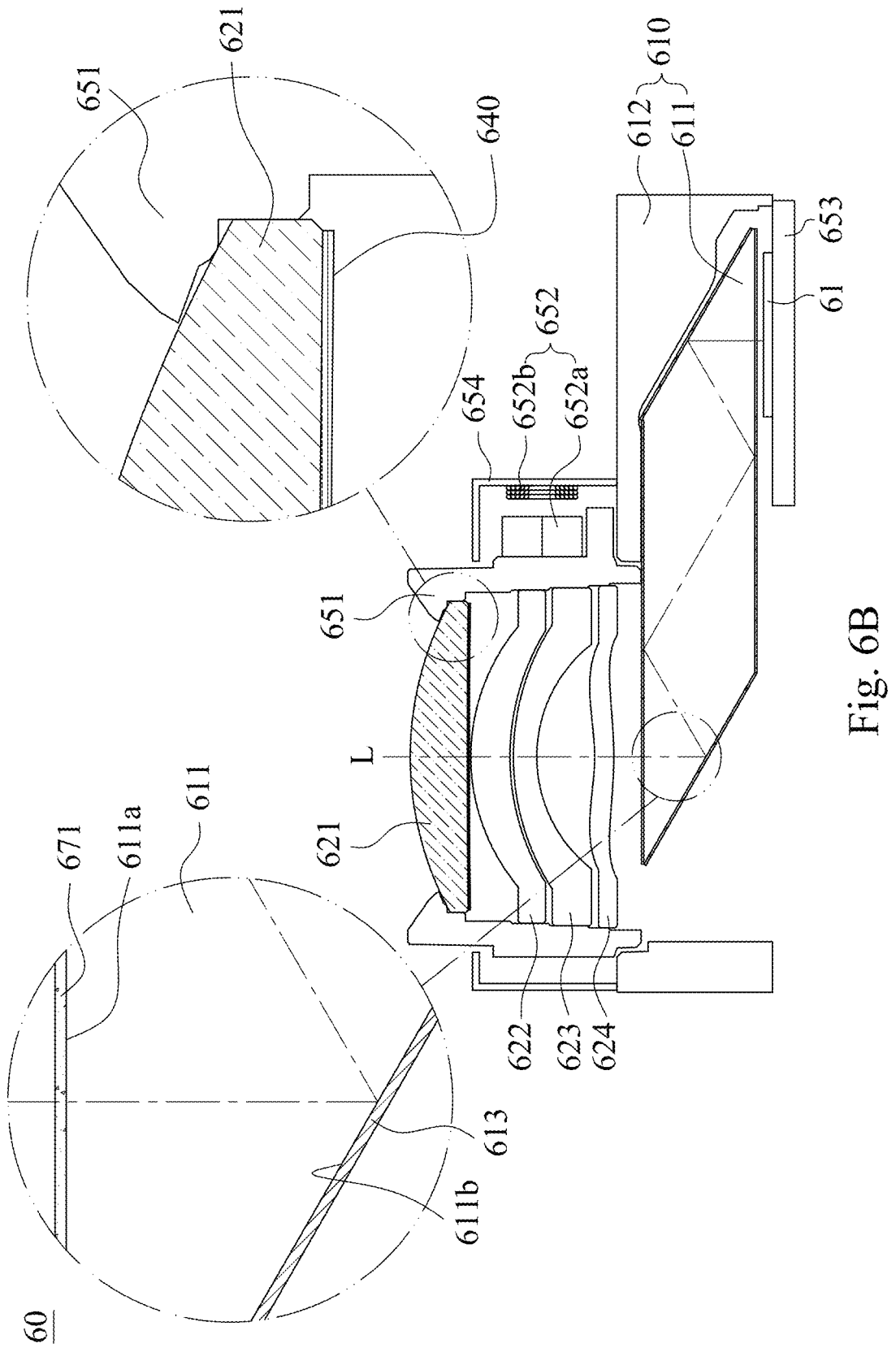
FIG. 6B is a schematic view of the camera module according to the 6th embodiment in FIG. 6A.
Figure 6C:
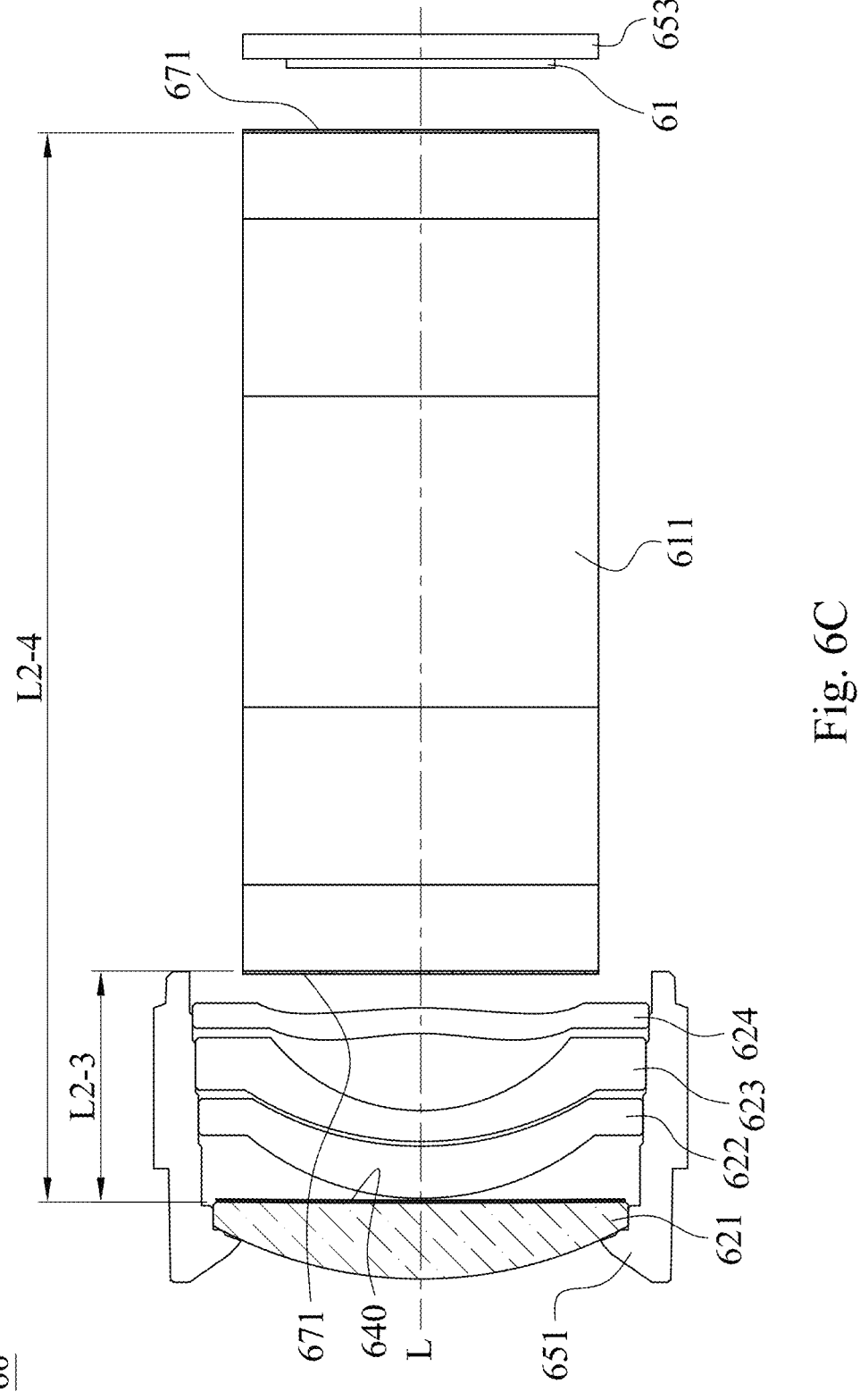
FIG. 6C is a parameter schematic view of the camera module according to the 6th embodiment in FIG. 6A.
Figure 6D:
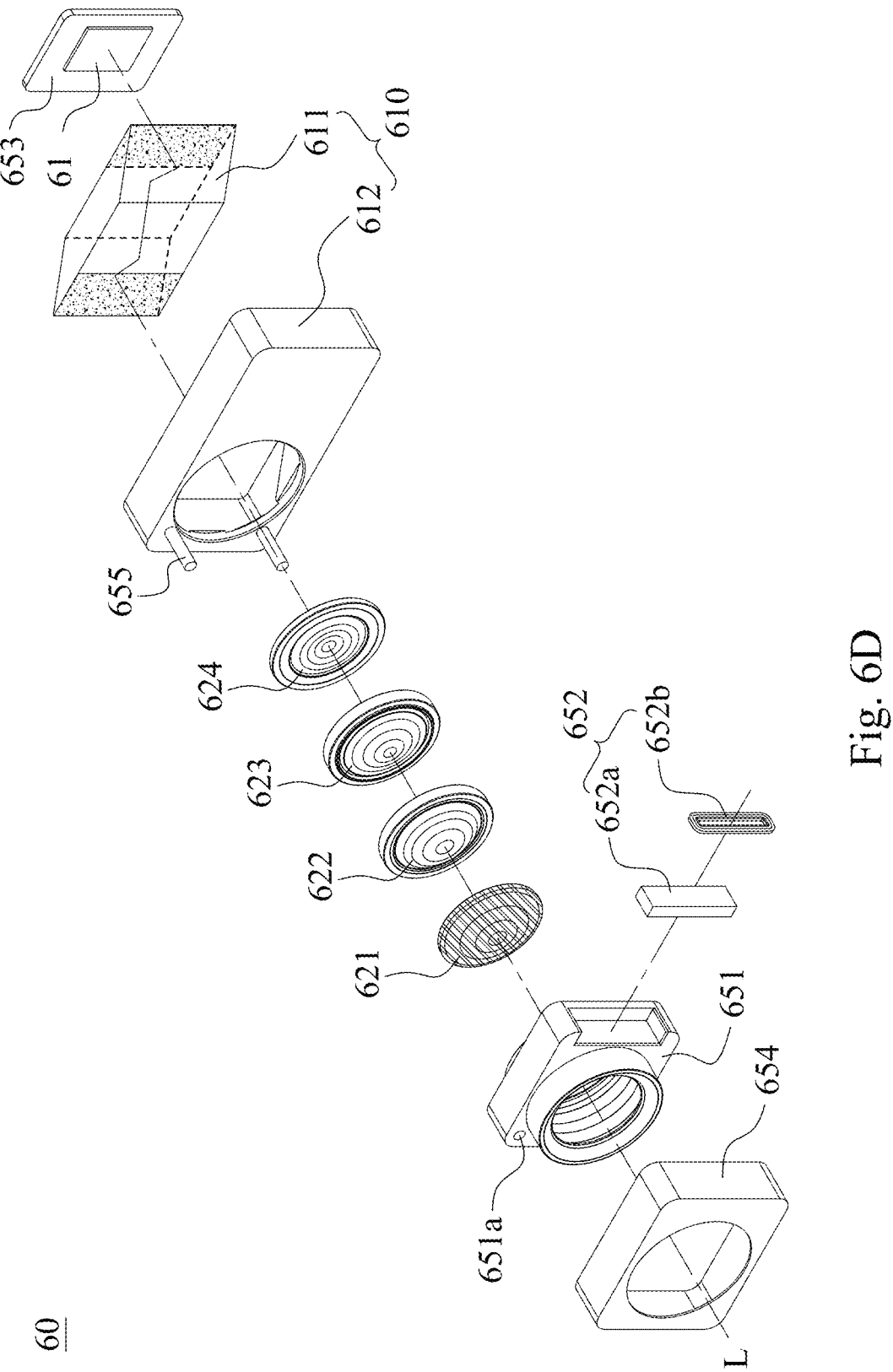
FIG. 6D is an exploded view of the camera module according to the 6th embodiment in FIG. 6A.
Figure 6E:
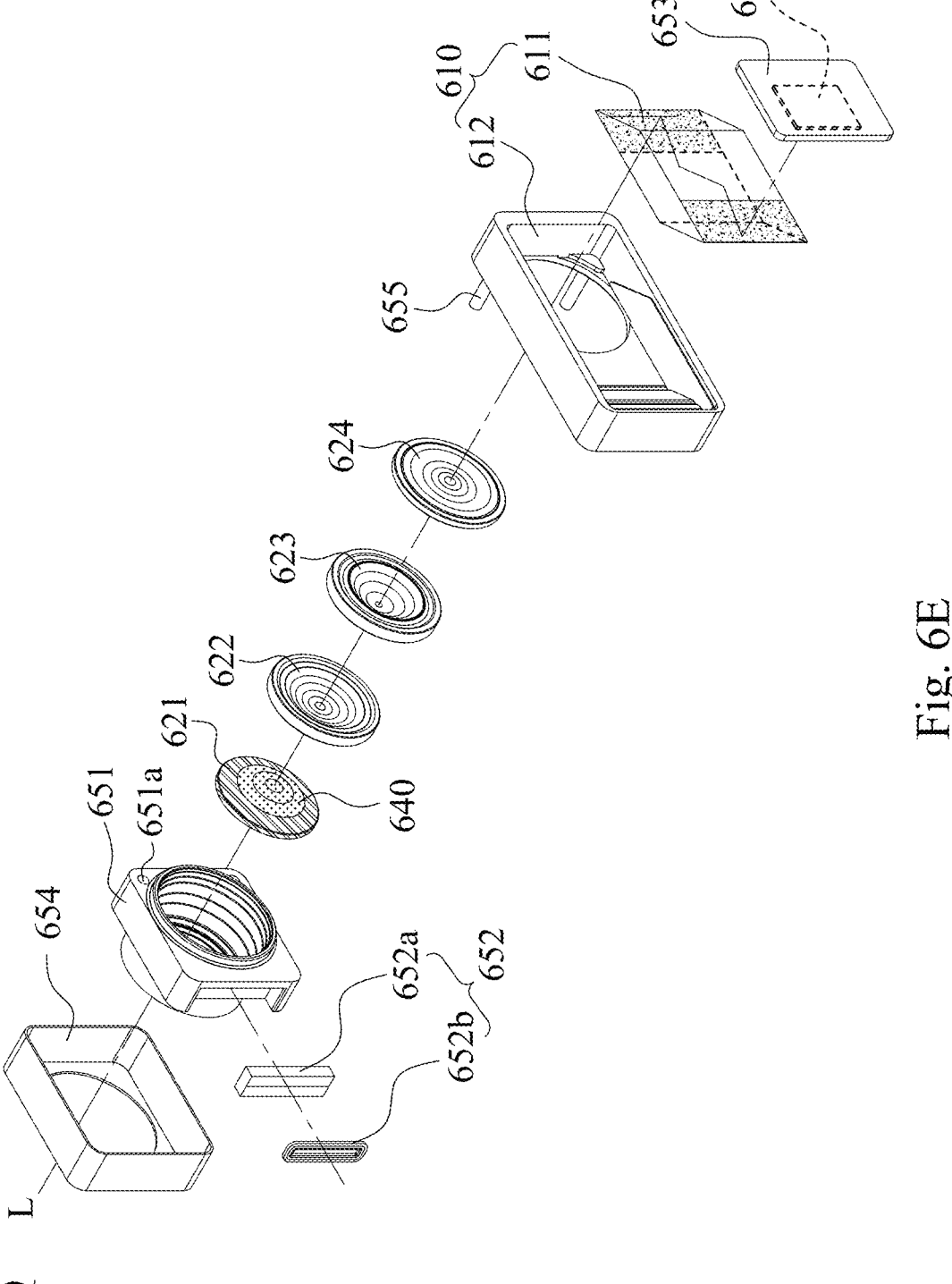
FIG. 6E is another exploded view of the camera module according to the 6th embodiment in FIG. 6A.

FIG. 6A is a three dimensional view of a camera module 60 according to the 6th embodiment of the present disclosure. FIG. 6B is a schematic view of the camera module 60 according to the 6th embodiment in FIG. 6A. FIG. 6C is a parameter schematic view of the camera module 60 according to the 6th embodiment in FIG. 6A. FIG. 6D is an exploded view of the camera module 60 according to the 6th embodiment in FIG. 6A. FIG. 6E is another exploded view of the camera module 60 according to the 6th embodiment in FIG. 6A. In FIGS. 6A to 6E, the camera module 60 includes an imaging optical system (its reference numeral is omitted) and an image sensor 61, wherein the imaging optical system includes an imaging lens assembly (its reference numeral is omitted) and a prism element 610.

Moreover, the imaging optical system includes an infrared light absorbing element, an infrared light reducing film 640 and the prism element 610 in order along a paraxial path L, wherein the infrared light reducing film 640 is disposed on an exit surface of the infrared light absorbing element. The infrared light absorbing element is made of an infrared light absorbing plastic material, the infrared light absorbing element is configured to refract a light, and the infrared light absorbing element can be an infrared light absorbing lens element according to the 6th embodiment. The infrared light reducing film 640 is closer to an image surface (its reference numeral is omitted) of the imaging optical system than an incident surface of the infrared light absorbing element to the image surface of the imaging optical system.

The imaging lens assembly includes a plurality of lens elements, the infrared light reducing film 640 and a lens carrier 651. In detail, the imaging lens assembly includes a first lens element 621, the infrared light reducing film 640, a second lens element 622, a third lens element 623 and a fourth lens element 624 in order along the paraxial path L, wherein the lens carrier 651 is configured to accommodate the first lens element 621, the second lens element 622, the third lens element 623 and the fourth lens element 624. It should be mentioned that the optical features such as numbers, structures, surface shapes and so on of the lens elements can be disposed according to different imaging demand, and the optical features are not limited thereto.

According to the 6th embodiment, the first lens element 621 is the infrared light absorbing element, and the infrared light reducing film 640 is disposed on an exit surface of the first lens element 621.

Figure 6F:
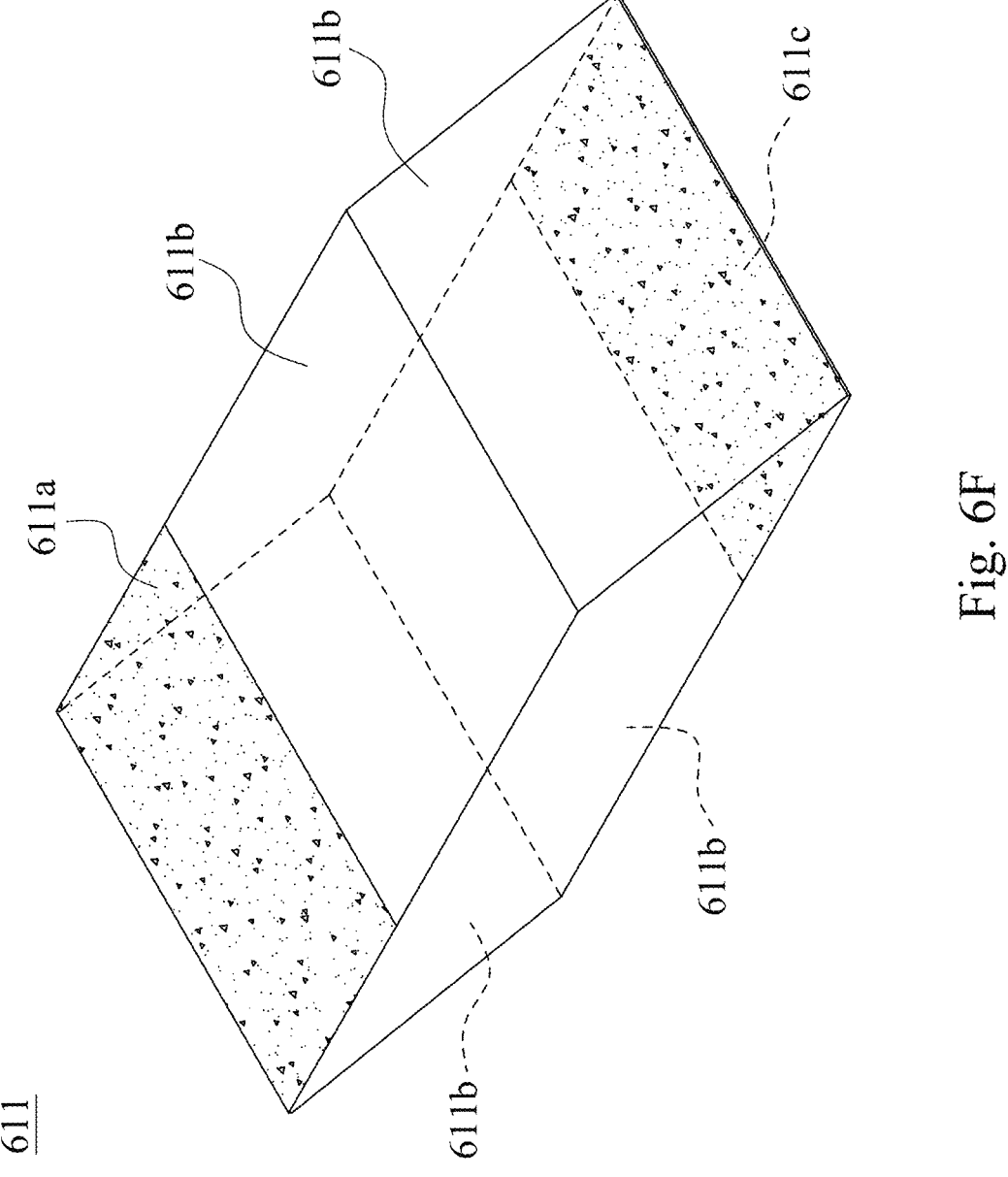
FIG. 6F is a schematic view of the prism portion according to the 6th embodiment in FIG. 6A.

FIG. 6F is a schematic view of the prism portion 611 according to the 6th embodiment in FIG. 6A. In FIGS. 6B and 6F, the prism element 610 includes a prism portion 611, a holder portion 612 and a reflection enhancing layer 613, wherein the holder portion 612 carries the prism portion 611, so as to keep the prism portion 611 on the specific position on the paraxial path L. The prism portion 611 includes an incident surface 611a, at least one reflecting surface 611b and an exit surface 611c in order along the paraxial path L, and the exit surface 611c of the prism portion 611 and the image surface are correspondingly disposed. Further, the reflection enhancing layer 613 is disposed on the reflecting surface 611b, and a number of the reflection enhancing layer 613 is corresponding to a number of the reflecting surface 611b, wherein the number of the reflecting surface 611b is four.

The prism portion 611 can be made of the glass material or the plastic material, and the holder portion 612 can be made of the opaque plastic material, but the present disclosure is not limited thereto. Further, the opaque plastic material of the holder portion 612 and the transparent plastic material of the prism portion 611 can be further the same, wherein the colorant is added in the transparent plastic material to make the opaque plastic material of the holder portion 612 opaque. The non-imaging light can be avoided entering the image sensor 61 through the holder portion 612 via the holder portion 612 made of the opaque plastic material.

The imaging optical system further includes a low reflecting film (its reference numeral is omitted), wherein the low reflecting film is simultaneously disposed on the incident surface 611a and the exit surface 611c of the prism portion 611, the low reflecting film disposed on the incident surface 611a and the exit surface 611c of the prism portion 611 both includes a taper structure coating 671.

In FIGS. 6D and 6E, the imaging lens assembly further includes a driving unit 652, a carrier 653, a cover 654 and two guide shafts 655, and the lens carrier 651 has pilot holes 651a, wherein the driving unit 652 is disposed on the lens carrier 651 to drive the lens carrier 651 move along an extending direction of the guide shafts 655, the guide shafts 655 are formed on the holder portion 612, the holder portion 612 and the image sensor 61 are disposed on the carrier 653, the cover 654 is disposed on the lens carrier 651, and the guide shafts 655 and the pilot holes 651a are correspondingly disposed.

Moreover, the driving unit 652 includes a driving magnet 652a and a driving coil 652b, wherein the driving magnet 652a and the driving coil 652b are correspondingly disposed, and a driving magnetic force is formed by the interaction between the driving magnet 652a and the driving coil 652b.

In FIG. 6C, a focal length of the imaging optical system is f, a distance between the infrared light reducing film 640 and the taper structure coating 671 disposed on the incident surface 611*a* of the prism portion 611 along the paraxial path L is L2-3, and a distance between the infrared light reducing film 640 and the taper structure coating 671 disposed on the exit surface 611*c* of the prism portion 611 along the paraxial path L is L2-4, the following conditions of Table 6A are satisfied.

TABLE 6A

| 6th embodiment | | | |
| --- | --- | --- | --- |
| f (mm) | 16.99 | L2-3/f | 0.231 |
| L2-3 (mm) | 3.919 | L2-4/f | 1.064 |
| L2-4 (mm) | 18.069 | | |

7th Embodiment

Figure 7A:
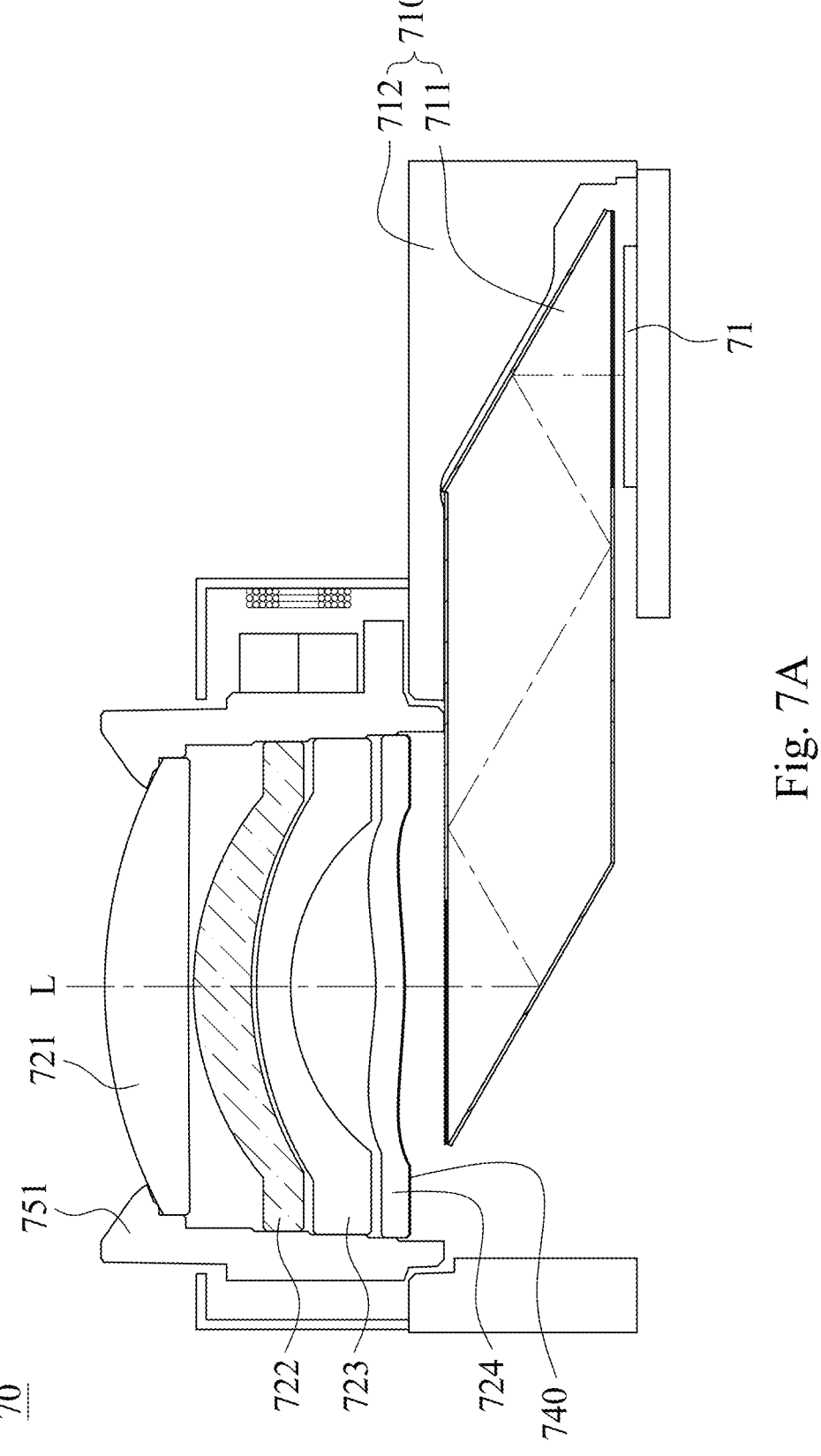
FIG. 7A is a schematic view of a camera module according to the 7th embodiment of the present disclosure.
Figure 7B:
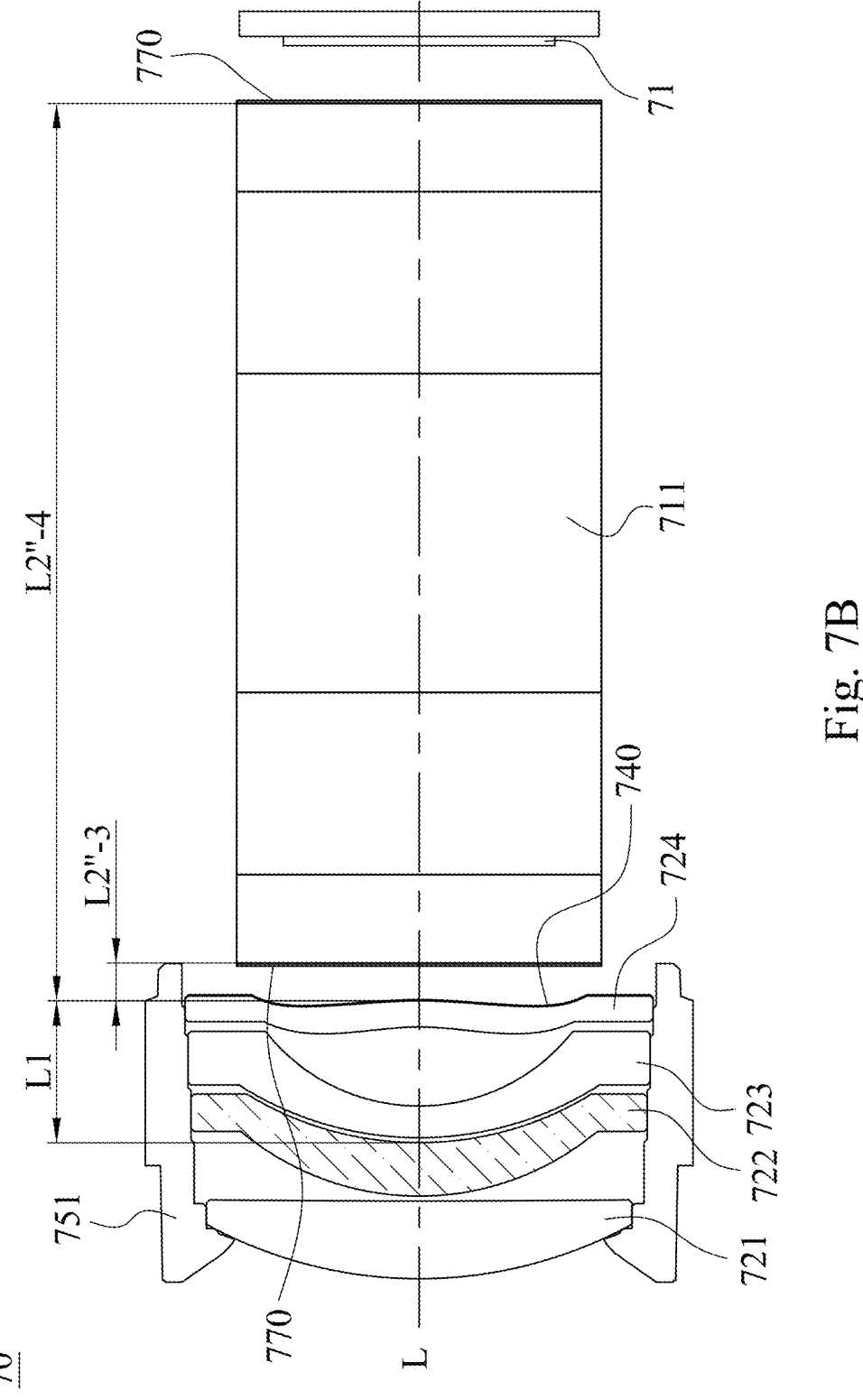
FIG. 7B is a parameter schematic view of the camera module according to the 7th embodiment in FIG. 7A.

FIG. 7A is a schematic view of a camera module 70 according to the 7th embodiment of the present disclosure. FIG. 7B is a parameter schematic view of the camera module 70 according to the 7th embodiment in FIG. 7A. In FIGS. 7A and 7B, the camera module 70 includes an imaging optical system (its reference numeral is omitted) and an image sensor 71, wherein the imaging optical system includes an imaging lens assembly (its reference numeral is omitted) and a prism element 710.

The imaging optical system includes an infrared light absorbing element, an infrared light reducing film 740 and the prism element 710 in order along a paraxial path L, wherein the infrared light reducing film 740 is disposed on an exit surface of the infrared light absorbing element. The infrared light absorbing element is made of an infrared light absorbing plastic material, the infrared light absorbing element is configured to refract a light, and the infrared light absorbing element can be an infrared light absorbing lens element according to the 7th embodiment. The infrared light reducing film 740 is closer to an image surface (its reference numeral is omitted) of the imaging optical system than an incident surface of the infrared light absorbing element to the image surface of the imaging optical system.

The imaging lens assembly includes a plurality of lens elements, the infrared light reducing film 740 and a lens carrier 751. In detail, the imaging lens assembly includes a first lens element 721, a second lens element 722, a third lens element 723, a fourth lens element 724 and the infrared light reducing film 740 in order along the paraxial path L, wherein the lens carrier 751 is configured to accommodate the first lens element 721, the second lens element 722, the third lens element 723 and the fourth lens element 724. It should be mentioned that the optical features such as numbers, structures, surface shapes and so on of the lens elements can be disposed according to different imaging demand, and the optical features are not limited thereto.

According to the 7th embodiment, the second lens element 722 is the infrared light absorbing element, and the infrared light reducing film 740 is disposed on an exit surface of the fourth lens element 724.

Figure 7C:
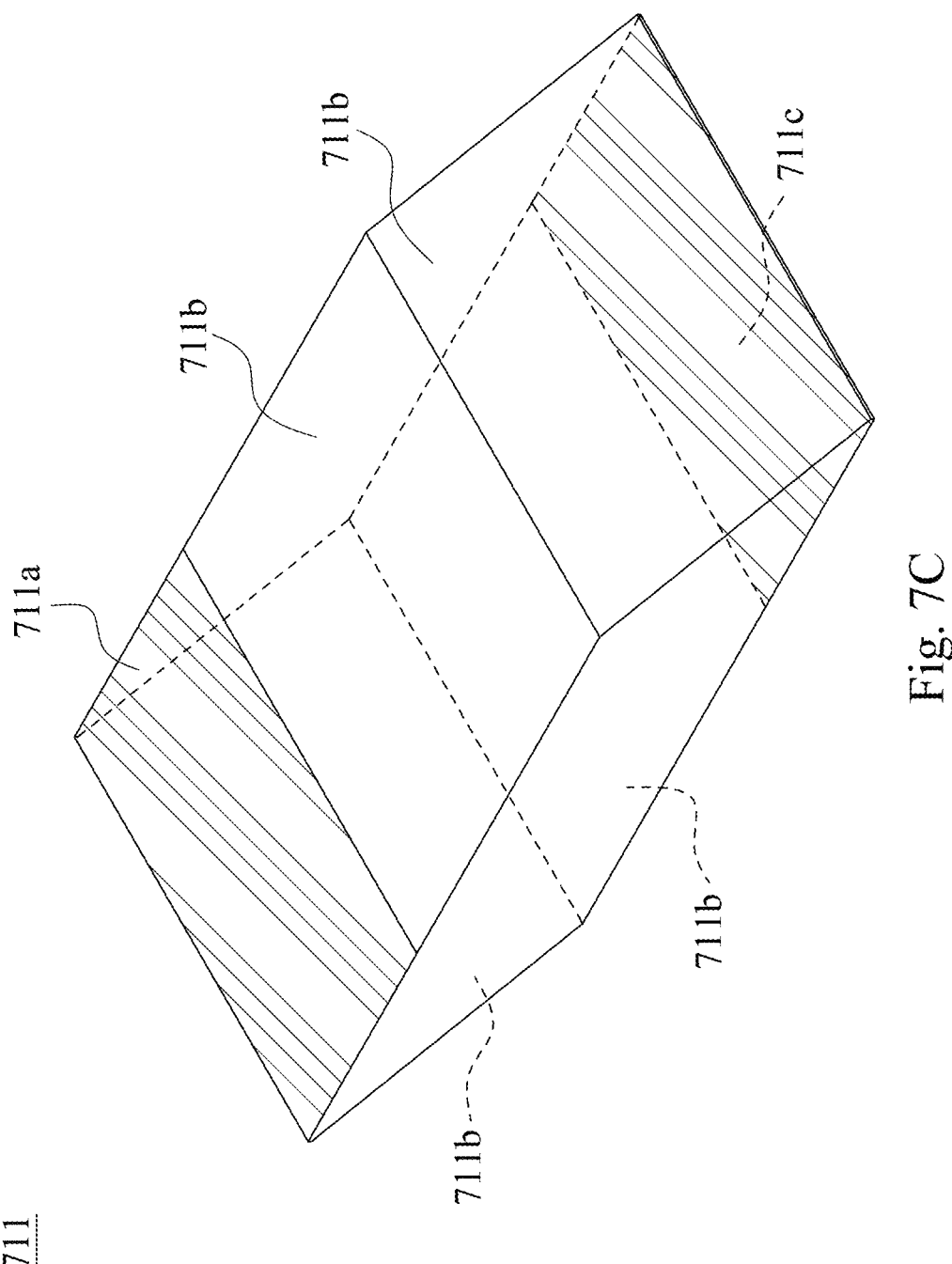
FIG. 7C is a schematic view of the prism portion according to the 7th embodiment in FIG. 7A.

FIG. 7C is a schematic view of the prism portion 711 according to the 7th embodiment in FIG. 7A. In FIGS. 7A and 7C, the prism element 710 includes a prism portion 711, a holder portion 712 and a reflection enhancing layer (its reference numeral is omitted), wherein the holder portion 712 carries the prism portion 711, so as to keep the prism portion 711 on the specific position on the paraxial path L. The prism portion 711 includes an incident surface 711*a*, at least one reflecting surface 711*b* and an exit surface 711*c* in order along the paraxial path L, and the exit surface 711*c* of the prism portion 711 and the image surface are correspondingly disposed. Further, the reflection enhancing layer is disposed on the reflecting surface 711*b*, and a number of the reflection enhancing layer is corresponding to a number of the reflecting surface 711*b*, wherein the number of the reflecting surface 711*b* is four.

The imaging optical system further includes a low reflecting film 770, wherein the low reflecting film 770 is simultaneously disposed on the incident surface 711*a* and the exit surface 711*c* of the prism portion 711, wherein the low reflecting film 770 includes a taper structure coating (its reference numeral is omitted) and an anti-reflecting multilayer film (its reference numeral is omitted). Further, the anti-reflecting multilayer film includes a plurality of high refractive index layers and a plurality of low refractive index layers, and the high refractive index layers and the low refractive index layers are alternately stacked. Therefore, the anti-reflecting function of the low reflecting film 770 can be obtained.

In FIG. 7B, a focal length of the imaging optical system is f, a distance between the infrared light absorbing element (according to the 7th embodiment, the second lens element 722) and the infrared light reducing film 740 along the paraxial path L is L1, a distance between the infrared light reducing film 740 and the low reflecting film 770 disposed on the incident surface 711*a* of the prism portion 711 along the paraxial path L is L2"-3, and a distance between the infrared light reducing film 740 and the low reflecting film 770 disposed on the exit surface 711*c* of the prism portion 711 along the paraxial path L is L2"-4, the following conditions of Table 7A are satisfied.

TABLE 7A

| 7th embodiment | | | |
| --- | --- | --- | --- |
| f (mm) | 16.99 | L1/f | 0.137 |
| L1 (mm) | 2.336 | L2"-3/f | 0.037 |
| L2"-3 (mm) | 0.623 | L2"-4/f | 0.870 |
| L2"-4 (mm) | 14.773 | | |

It should be mentioned that the optical system and the disposition according to the 7th embodiment are the same as the optical system and the disposition according to the 6th embodiment, and hence the structures and the disposition of other structures will not be described again herein.

8th Embodiment

Figure 8A:
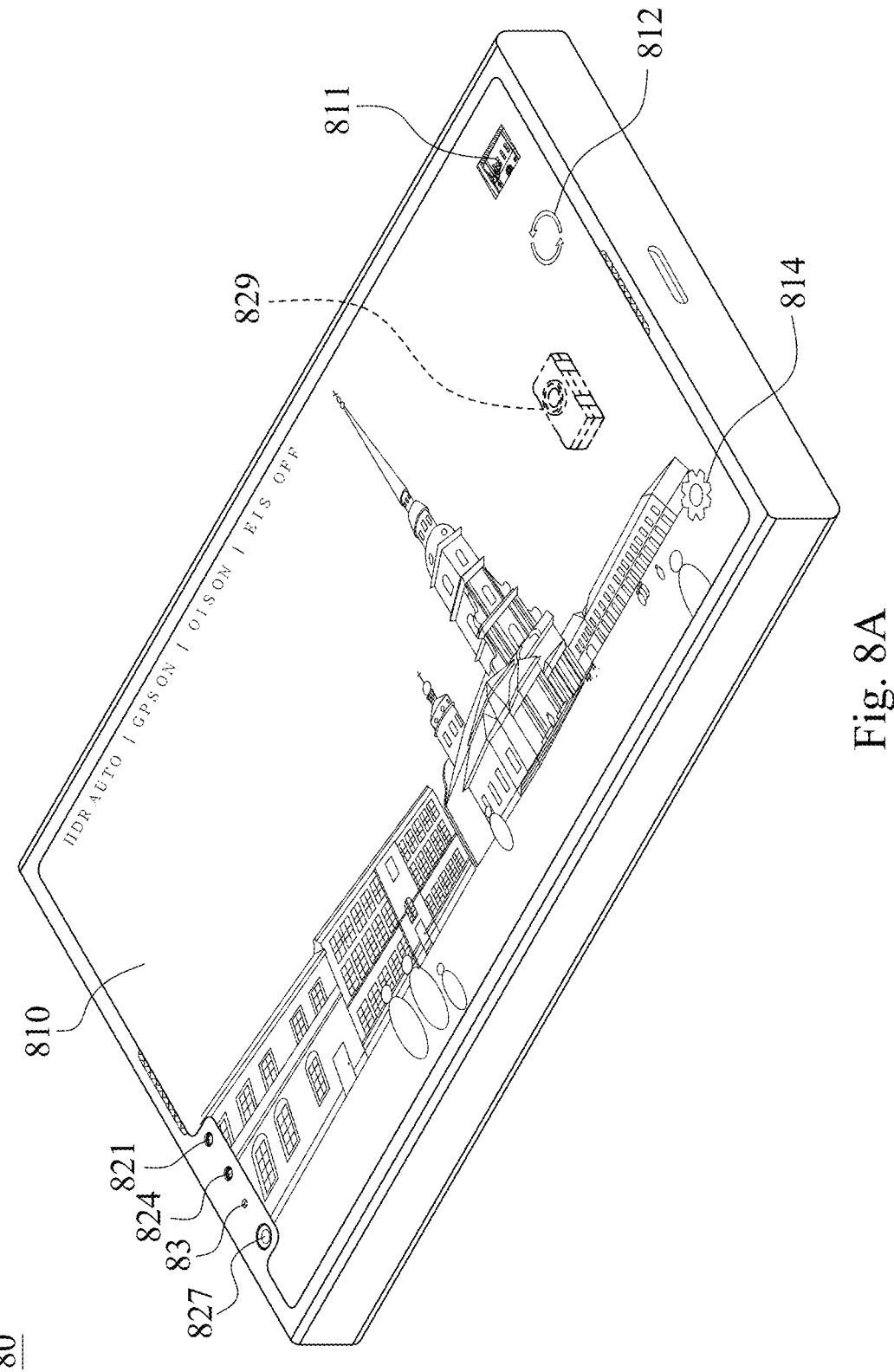
FIG. 8A is a schematic view of an electronic device according to the 8th embodiment of the present disclosure.
Figure 8B:
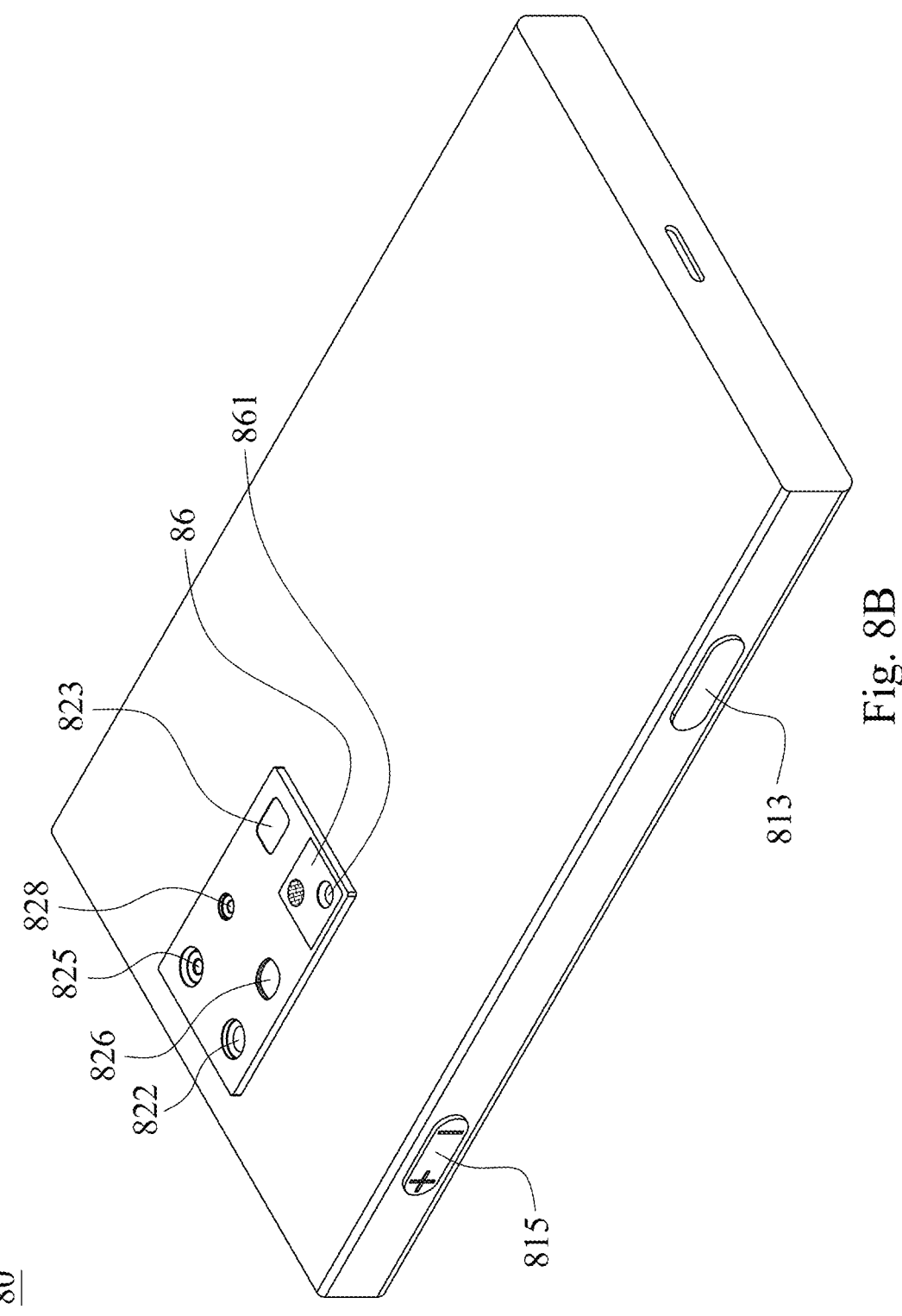
FIG. 8B is another schematic view of the electronic device according to the 8th embodiment in FIG. 8A.
Figure 8C:
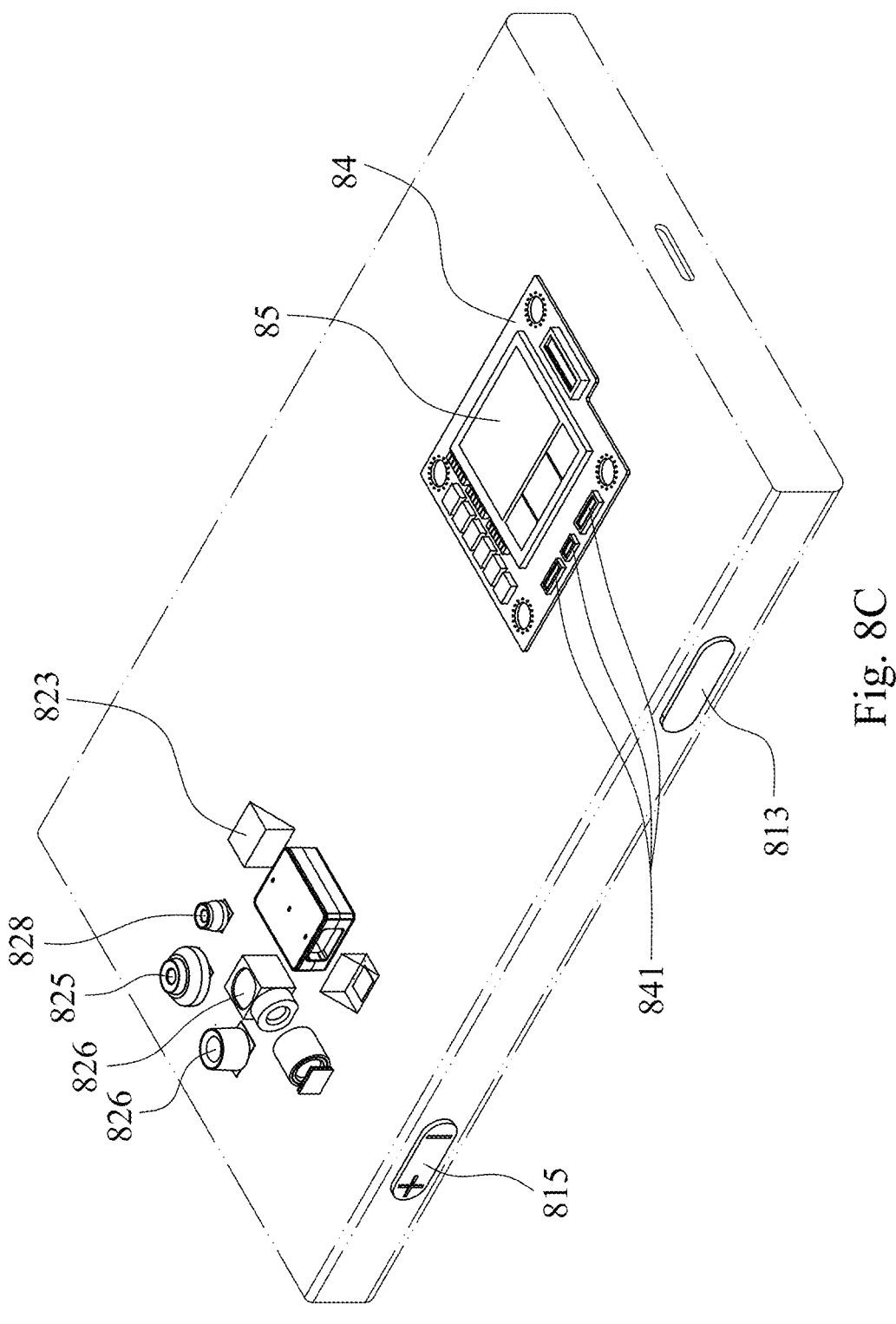
FIG. 8C is still another schematic view of the electronic device according to the 8th embodiment in FIG. 8A.

FIG. 8A is a schematic view of an electronic device 80 according to the 8th embodiment of the present disclosure. FIG. 8B is another schematic view of the electronic device 80 according to the 8th embodiment in FIG. 8A. FIG. 8C is still another schematic view of the electronic device 80 according to the 8th embodiment in FIG. 8A. In FIGS. 8A to 8C, the electronic device 80 is a smart phone, wherein the electronic device 80 can also be a laptop computer, a tablet computer or a dashcam, but the present disclosure is not limited thereto. The electronic device 80 includes at least one camera module, wherein the camera module includes an imaging optical system (not shown) and an image sensor (not shown), and the image sensor is disposed on an image surface of the imaging optical system.

According to the 8th embodiment, the camera module includes ultra-wide angle camera modules 821, 822, an ultra-telephoto camera module 823, wide-angle camera modules 824, 825, a telephoto camera module 826, a timeof-flight (TOF) module 827, a macro camera module 828 and a biometric sensing camera module 829, wherein the TOF module 827 and the biometric sensing camera module 829 can be another image capturing apparatuses with other functions, but the disposition is not limited thereto. In particular, the camera module can be one of the camera modules according to the aforementioned 1st embodiment to the 7th embodiment, but the present disclosure is not limited thereto.

In detail, according to the 8th embodiment, the ultra-wide angle camera module 821, the wide-angle camera module 824, the TOF module 827 and the biometric sensing camera module 829 are disposed on a front of the electronic device 80, the ultra-wide angle camera module 822, the ultra-telephoto camera module 823, the wide-angle camera module 825, the telephoto camera module 826 and the macro camera module 828 are disposed on a back of the electronic device 80.

The imaging control interface 810 can be a touch screen for displaying the scene and having the touch function, and the shooting angle can be manually adjusted. In detail, the imaging control interface 810 includes an image replay button 811, an image capturing switching button 812, a focus capturing button 813, an integrated menu button 814 and a zoom control button 815. Furthermore, users enter a shooting mode via the imaging control interface 810 of the electronic device 80, the image capturing switching button 812 can be flexibly configured to switch one of the ultra-wide angle camera modules 821, 822, the ultra-telephoto camera module 823, the wide-angle camera modules 824, 825, the telephoto camera module 826 and the macro camera module 828 to capture the image, the zoom control button 815 is configured to adjust the zoom, the users use the focus capturing button 813 to undergo image capturing after capturing the images and confirming one of the ultra-wide angle camera modules 821, 822, the ultra-telephoto camera module 823, the wide-angle camera modules 824, 825, the telephoto camera module 826 and the macro camera module 828, the users can view the images by the image replay button 811 after undergoing image capturing, and the integrated menu button 814 is configured to adjust the details of the image capturing (such as timed photo, photo ratio, and etc.).

The electronic device 80 can further include a reminding light 83, and the reminding light 83 is disposed on the front of the electronic device 80 and can be configured to remind the users of unread messages, missed calls and the condition of the phone.

Moreover, after entering the shooting mode via the imaging control interface 810 of the electronic device 80, the imaging light is gathered on the image sensor via the imaging optical system, and an electronic signal about an image is output to an image signal processor (ISP) (its reference numeral is omitted) of a single chip system 85. The single chip system 85 can further include a random access memory (RAM) (its reference numeral is omitted), a central processing unit (its reference numeral is omitted) and a storage unit (its reference numeral is omitted). Also, the single chip system 85 can further include, but not be limited to, a display, a control unit, a read-only memory (ROM), or the combination thereof.

To meet a specification of the electronic device 80, the electronic device 80 can further include an optical anti-shake mechanism (not shown). Furthermore, the electronic device 80 can further include at least one focusing assisting module 86 and at least one sensing element (not shown). The focusing assisting module 86 can include a flash module 861 for compensating a color temperature, an infrared distance measurement component (not shown), a laser focus module (not shown), etc. The sensing element can have functions for sensing physical momentum and kinetic energy, such as an accelerator, a gyroscope, a Hall Effect Element, a position locator, a signal transmitter module, to sense shaking or jitters applied by hands of the user or external environments. Accordingly, the electronic device 80 equipped with an auto-focusing mechanism and the optical anti-shake mechanism can be enhanced to achieve the superior image quality. Furthermore, the electronic device 80 according to the present disclosure can have a capturing function with multiple modes, such as taking optimized selfies, high dynamic range (HDR) under a low light condition, 4K resolution recording, etc. Furthermore, the users can visually see a captured image of the camera through the imaging control interface 810 and manually operate the view finding range on the imaging control interface 810 to achieve the autofocus function of what you see is what you get.

Moreover, the camera module, the optical anti-shake mechanism, the sensing element and the focusing assisting module 86 can be disposed on a circuit board 84 and electrically connected to the associated components via a connector 841 to perform a capturing process, wherein the circuit board 84 can be a flexible printed circuit board (FPC). Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. According to the 8th embodiment, the sensing elements and the focusing assisting modules 86 are disposed on the circuit board 84 and at least one other flexible printed circuit board (not shown) and electrically connected to the associated components, such as the image signal processor, via corresponding connectors to perform the capturing process. In other embodiments (not shown), the sensing elements and the focusing assisting modules can also be disposed on the main board of the electronic device or carrier boards of other types according to requirements of the mechanical design and the circuit layout.

Figure 8D:
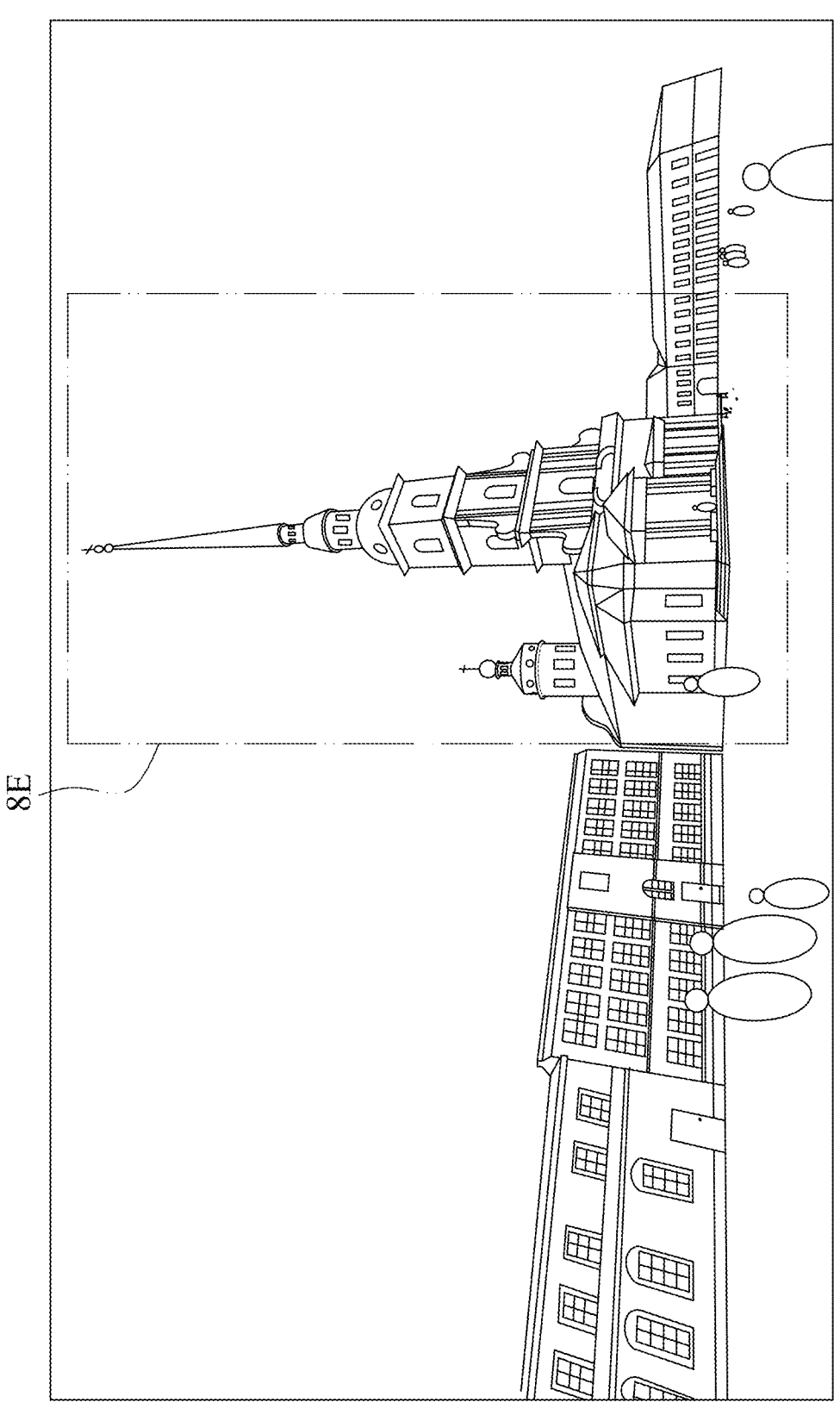
FIG. 8D is a schematic view of an image captured via the electronic device according to the 8th embodiment in FIG. 8A.

FIG. 8D is a schematic view of an image captured via the electronic device 80 according to the 8th embodiment in FIG. 8A. In FIG. 8D, comparing with the image captured via the wide-angle camera modules 824, 825, the image captured via the ultra-wide angle camera modules 821, 822 has wider visual angle and wider depth of field, but the image captured via the ultra-wide angle camera modules 821, 822 also has greater distortion. According to FIG. 8D, the visual angle is 105 degrees to 125 degrees, and the equivalent focal length is 11 mm to 14 mm.

Figure 8E:
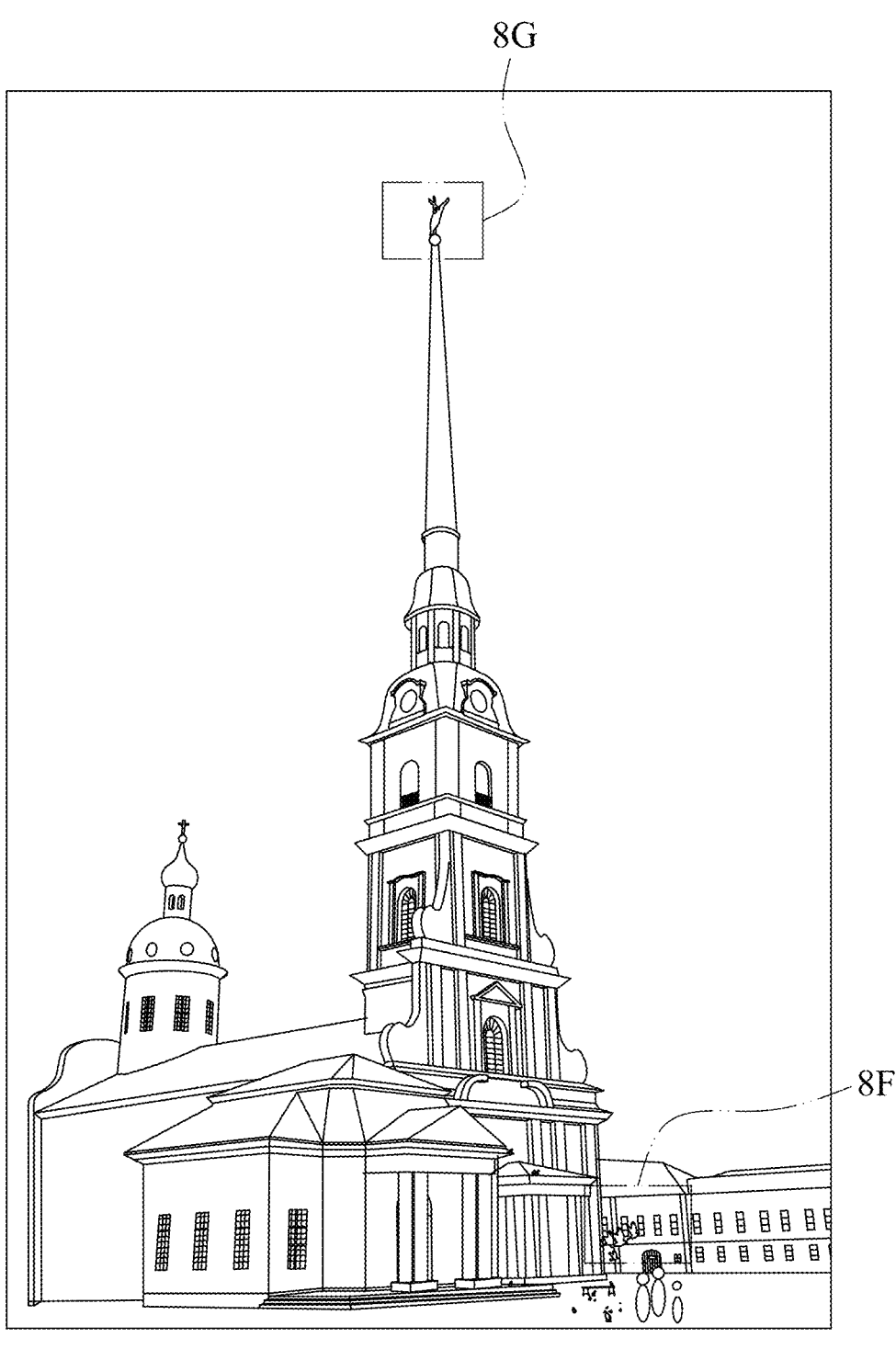
FIG. 8E is another schematic view of an image captured via the electronic device according to the 8th embodiment in FIG. 8A.

FIG. 8E is another schematic view of an image captured via the electronic device 80 according to the 8th embodiment in FIG. 8A. In FIG. 8E, the image of the certain range with the high resolution can be captured via the wide-angle camera modules 824, 825, and the wide-angle camera modules 824, 825 have the function of the high resolution and the low deformation. In particular, FIG. 8E is the partial enlarged view of FIG. 8D. According to FIG. 8E, the visual angle is 70 degrees to 90 degrees, and the equivalent focal length is 22 mm to 30 mm.

Figure 8F:
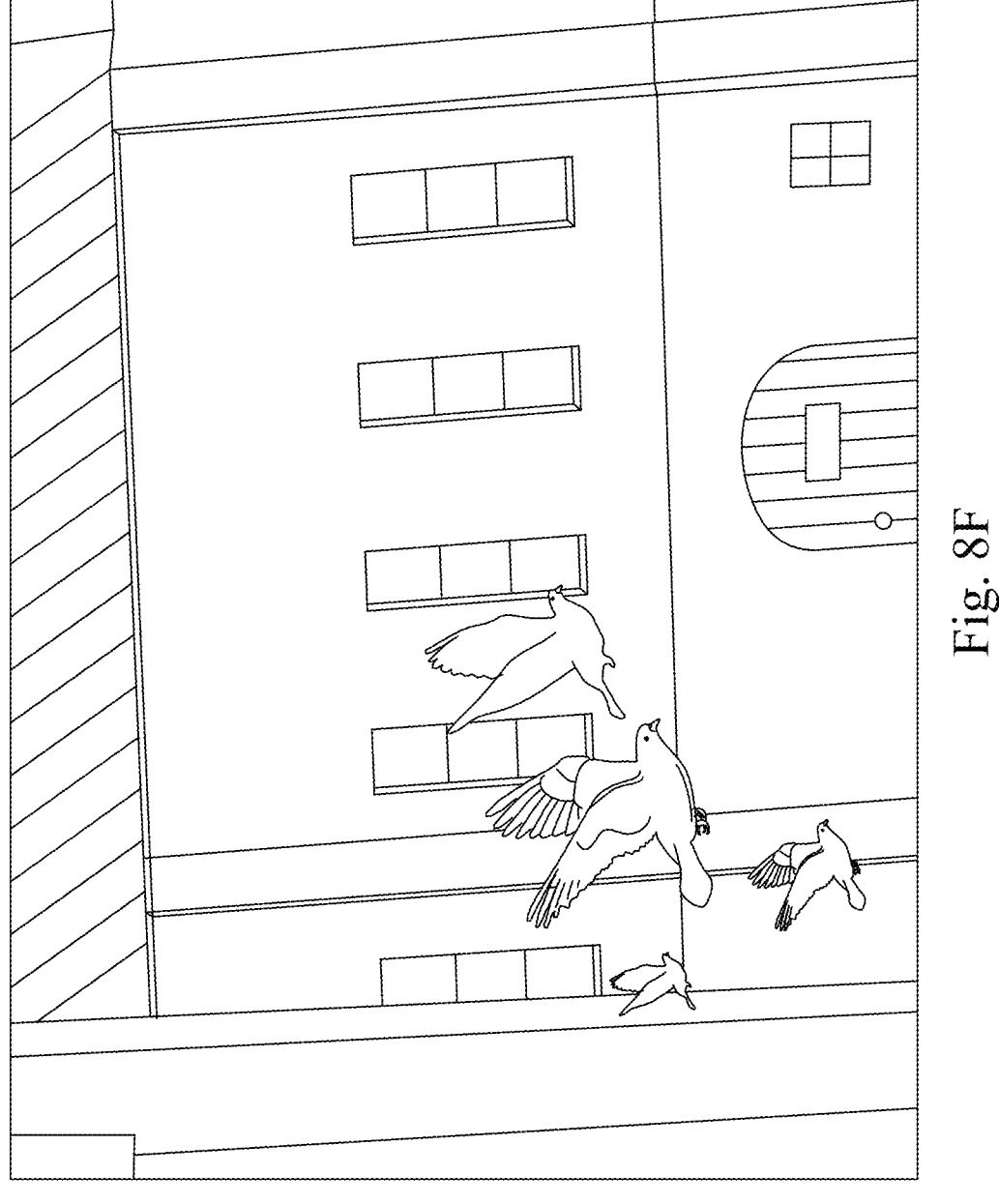
FIG. 8F is still another schematic view of an image captured via the electronic device according to the 8th embodiment in FIG. 8A.

FIG. 8F is still another schematic view of an image captured via the electronic device 80 according to the 8th embodiment in FIG. 8A. In FIG. 8F, comparing with the image captured via the wide-angle camera modules 824, 825, the image captured via the telephoto camera module 826 has narrower visual angle and narrower depth of field. Hence, the telephoto camera module 826 can be configured to capture the moving targets, that is, the telephoto camera module 826 can be driven via an actuator (not shown) of the electronic device 80 to quick and continuous auto focus the moving targets, so as to make the image of the moving targets is not fuzzy owing to defocus. In particular, FIG. 8F is the partial enlarged view of FIG. 8E. According to FIG. 8F, the visual angle is 10 degrees to 40 degrees, and the equivalent focal length is 60 mm to 300 mm.

Figure 8G:
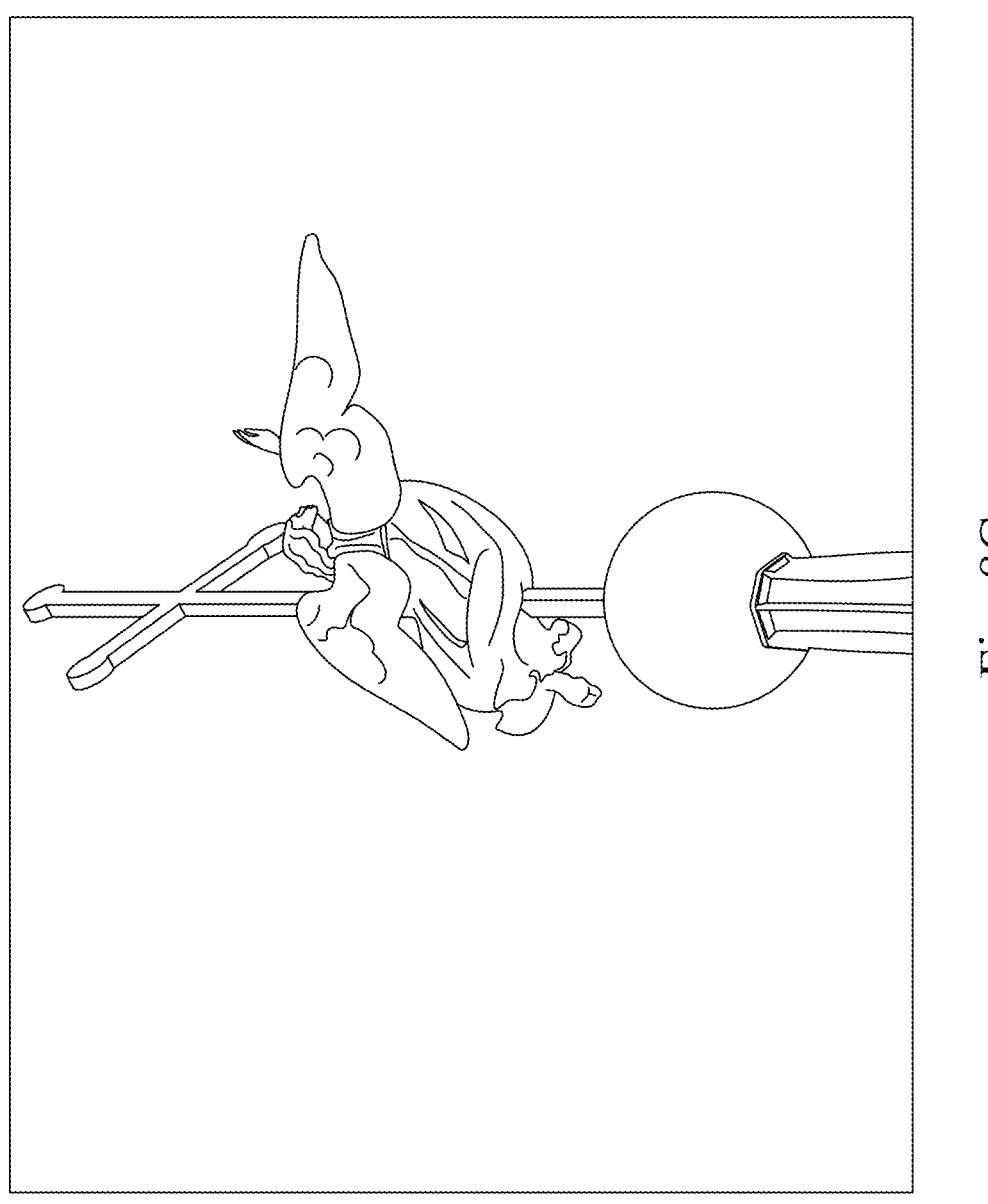
FIG. 8G is another schematic view of an image captured via the electronic device according to the 8th embodiment in FIG. 8A.

FIG. 8G is another schematic view of an image captured via the electronic device 80 according to the 8th embodiment in FIG. 8A. In FIG. 8G, comparing with the image captured via the telephoto camera module 826, the image captured via the ultra-telephoto camera module 823 has narrower visual angle and narrower depth of field, and the image captured by the ultra-telephoto camera module 823 is easily fuzzy due to the shaking. Hence, the actuator is configure to provide the driving force to make the ultra-telephoto camera module 823 focus on the targets, and the actuator is also configure to provide the feedback of modifying the shaking to obtain the effect of the optical image stabilization. In particular, FIG. 8G is the partial enlarged view of FIG. 8E. According to FIG. 8G, the visual angle is 4 degrees to 8 degrees, and the equivalent focal length is 400 mm to 600 mm.

In FIGS. 8D to 8G, the zooming function can be obtained via the electronic device 80, when the scene is captured via the camera modules with different focal lengths cooperated with the function of image processing. It should be mentioned that the equivalent focal length is the estimated value by conversion, and the equivalent focal length may be different from the actual focal length because of the design of the camera module and the cooperation of the dimension of the image sensor.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical system comprising, in order along a paraxial path:

an infrared light absorbing element made of an infrared light absorbing plastic material, and the infrared light absorbing element configured to refract a light;

an infrared light reducing film closer to an image surface of the imaging optical system than an incident surface of the infrared light absorbing element to the image surface of the imaging optical system;

a plate element comprising a translucent portion and a holder portion, wherein the translucent portion is disposed between the infrared light reducing film and the image surface, the translucent portion and the image surface are correspondingly disposed, the holder portion surrounds the paraxial path, and the holder portion and the translucent portion are integrated formed, so as to keep the translucent portion on a specific position on the paraxial path; and a low reflecting film disposed on at least one of an incident surface and an exit surface of the translucent portion and simultaneously coated on at least one portion of the holder portion;

wherein an average reflectivity of a light at a wavelength range between 420 nm and 680 nm is less than 0.98% via the low reflecting film;

wherein a focal length of the imaging optical system is f, a distance between the infrared light absorbing element and the infrared light reducing film along the paraxial path is L1, a distance between the infrared light reducing film and the low reflecting film along the paraxial path is L2", and the following conditions are satisfied:

$$0.0 \leq L1/f \leq 0.21; \text{ and}$$

$$0.21 \leq L2''/f.$$

2. The imaging optical system of claim 1, wherein the low reflecting film comprises an anti-reflecting multilayer film comprising a plurality of high refractive index layers and a plurality of low refractive index layers, and the high refractive index layers and the low refractive index layers are alternately stacked.

3. The imaging optical system of claim 1, wherein the low reflecting film comprises a taper structure coating disposed on the at least one of the incident surface and the exit surface of the translucent portion, the taper structure coating is gradually sparse towards an air direction, a plurality of pores are formed on the at least one of the incident surface and the exit surface of the translucent portion, and the taper structure coating is mainly made of a ceramic material;

wherein an average crystal height of the taper structure coating is GH, and the following condition is satisfied:

$$60 \text{ nm} \leq GH \leq 400 \text{ nm}.$$

4. The imaging optical system of claim 3, wherein the average crystal height of the taper structure coating is GH, and the following condition is satisfied:

$$120 \text{ nm} \leq GH \leq 300 \text{ nm}.$$

5. The imaging optical system of claim 3, wherein the low reflecting film further comprises an intermediary layer directly contacted with the plate element, and at least one portion of the intermediary layer is contacted with an air via at least one of the pores.

6. The imaging optical system of claim 1, wherein an average reflectivity of a light at a wavelength range between 400 nm and 900 nm is less than 0.98% via the low reflecting film.

7. The imaging optical system of claim 6, wherein the average reflectivity of the light at the wavelength range between 400 nm and 900 nm is less than 0.5% via the low reflecting film.

8. The imaging optical system of claim 1, wherein the infrared light reducing film is disposed on an exit surface of the infrared light absorbing element.

9. The imaging optical system of claim 1, further comprising:

a film disposing element disposed on an image side of the infrared light absorbing element;

wherein the infrared light reducing film is disposed on one of an incident surface and an exit surface of the film disposing element.

10. The imaging optical system of claim 9, wherein the film disposing element is immediately adjacent to the infrared light absorbing element.

11. The imaging optical system of claim 10, further comprising:

a glue, the infrared light absorbing element and the film disposing element cemented via the glue.

12. The imaging optical system of claim 1, wherein the holder portion of the plate element is made of an opaque plastic material.

13. The imaging optical system of claim 1, wherein the low reflecting film is simultaneously disposed on the incident surface and the exit surface of the translucent portion;

wherein the low reflecting film disposed on the incident surface of the translucent portion comprises one of an anti-reflecting multilayer film and a taper structure coating;

wherein the low reflecting film disposed on the exit surface of the translucent portion comprises one of the anti-reflecting multilayer film and the taper structure coating.

14. The imaging optical system of claim 1, wherein the low reflecting film is simultaneously disposed on at least one portion of a surface of the holder portion.

15. The imaging optical system of claim 1, wherein the focal length of the imaging optical system is f, a thickness of the translucent portion is THI, and the following condition is satisfied:

$$0.005 \leq THI/f \leq 0.35.$$

16. A camera module, comprising:

the imaging optical system of claim 1; and an image sensor disposed on the image surface of the imaging optical system.

17. An electronic device, comprising:

at least one of the camera module of claim 16.

18. A camera module, comprising:

an imaging optical system, comprising:

an imaging lens assembly, comprising:

a plurality of lens elements arranged in order along a paraxial path, wherein the lens elements comprise an infrared light absorbing lens element, and the infrared light absorbing lens element is made of an infrared light absorbing plastic material;

an infrared light reducing film disposed on an exit surface of the infrared light absorbing lens element; and a lens carrier accommodating the lens elements and the infrared light reducing film;

a plate element, comprising:

a translucent portion; and a holder portion surrounding the paraxial path; and a low reflecting film disposed on at least one of an incident surface and an exit surface of the translucent portion; and an image sensor disposed on an image side of the lens carrier, the plate element disposed between the imaging lens assembly and the image sensor, the translucent portion and the image sensor correspondingly disposed, and the paraxial path passing the imaging lens assembly and then traveling to the image sensor;

wherein a specific distance between the translucent portion of the plate element and the image sensor is kept via the holder portion;

wherein an average reflectivity of a light at a wavelength range between 420 nm and 680 nm is less than 0.98% via the low reflecting film;

wherein a focal length of the imaging optical system is f, a distance between the infrared light reducing film and the low reflecting film along the paraxial path is L2", a thickness of the translucent portion is THI, and the following conditions are satisfied:

$$0.21 \leq L2''/f; \text{ and}$$

$$0.005 \leq THI/f \leq 0.35.$$

* * * * *